United States Patent
Oshino et al.

(10) Patent No.: US 6,289,136 B1
(45) Date of Patent: *Sep. 11, 2001

(54) IMAGE PROCESSING METHOD AND APPARATUS

(75) Inventors: Takahiro Oshino, Yokohama; Yoshihiro Ishida, Kawasaki; Shinichiro Koga, Utsunomiya; Osamu Morimoto, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,910

(22) Filed: Mar. 20, 1996

(30) Foreign Application Priority Data

| | | |
|---|---|---|
| Mar. 22, 1995 | (JP) | 7-062627 |
| Apr. 11, 1995 | (JP) | 7-085361 |
| Jun. 19, 1995 | (JP) | 7-151486 |
| Oct. 19, 1995 | (JP) | 7-271077 |
| Feb. 27, 1996 | (JP) | 8-039884 |

(51) Int. Cl.$^7$ ................. G06K 9/32; H04N 1/40
(52) U.S. Cl. ............ 382/298; 382/197; 382/199; 358/448; 358/455
(58) Field of Search .................. 382/197, 199, 382/264, 272, 298, 300; 358/448, 455

(56) References Cited

U.S. PATENT DOCUMENTS

| | | | |
|---|---|---|---|
| 4,189,711 | 2/1980 | Frank | 340/146.3 |
| 4,947,158 | * 8/1990 | Kanno | 340/747 |
| 5,201,032 | 4/1993 | Kurose | 395/150 |
| 5,245,445 | * 9/1993 | Fujisawa | 358/458 |
| 5,296,940 | * 3/1994 | Kawashima | 382/237 |
| 5,539,866 | * 7/1996 | Banton et al. | 395/117 |
| 5,566,003 | * 10/1996 | Hara et al. | 382/199 |
| 5,652,660 | * 7/1997 | Seto et al. | 382/254 |
| 5,694,486 | * 12/1997 | Shigeeda et al. | 382/199 |

FOREIGN PATENT DOCUMENTS

| | | | |
|---|---|---|---|
| 3917917 | 12/1989 | (DE) | G06F/15/20 |
| 0549351 | 6/1993 | (EP) | G06F/15/68 |

(List continued on next page.)

OTHER PUBLICATIONS

Tamura, H, "Introduction to Computer Image Processing" Souken Shuppan 1985, pp. 102–105 and 114–117.

Systems and Computers in Japan, vol. 16, No. 4, 1985, pp. 29–36, Nakajima et al., "A coding Method of Gray–Valued Pictures Using Density Contour Lines".

IEEE Transactions on Pattern Analysis and Machine Intelligence, vol. 12, No. 6, 1990, pp. 600–606, Namane et al., "Character Scaling by Contour Method".

*Primary Examiner*—Matthew C. Bella
(74) *Attorney, Agent, or Firm*—Fitzpatrick, Cella, Harper & Scinto

(57) ABSTRACT

In magnifying a multivalued image, binary images are generated by using the respective density levels of the multivalued image as thresholds. The contour of each binary image is equivalent to an equidensity curve corresponding to each density gradient of the original multivalued image. Outline vectors of each binary image are extracted and magnified/smoothed. The contour of each binary image represents an equidensity curve corresponding to each density gradient of the magnified multivalued image. In a binary image area corresponding to a black pixel of each binary image, a pixel having a density equal to the threshold used to generate the binary image is written. This processing is sequentially performed for all the binary images from a low-density binary image to a high-density binary image to generate a multivalued image. The objected multivalued image is subjected to density gradient smoothing processing. As a result, a magnified multivalued image is obtained.

57 Claims, 67 Drawing Sheets

FOREIGN PATENT DOCUMENTS

| | | | |
|---|---|---|---|
| 0649260 | 4/1995 | (EP) | H04N/7/24 |
| 62-145969 | 6/1987 | (JP) | H04N/1/41 |
| 62-191968 | 8/1987 | (JP) | G06F/15/62 |
| 4157578 | 5/1992 | (JP) | G06F/15/70 |
| 5-20467 | 1/1993 | (JP) | G06F/15/72 |
| 5-174140 | 7/1993 | (JP) | G06F/15/66 |
| 5174140 | 7/1993 | (JP) | G06F/15/70 |
| 6-4658 | 1/1994 | (JP) | G06F/15/66 |
| 6-261209 | 9/1994 | (JP) | H04N/1/40 |
| 7-210669 | 8/1995 | (JP) | G06T/3/40 |
| 8-138044 | 5/1996 | (JP) | G06T/5/00 |
| 8-289139 | 11/1996 | (JP) | H04N/1/393 |

\* cited by examiner

220 ORIGINAL IMAGE

Level = 3

Level = 2

Level = 1

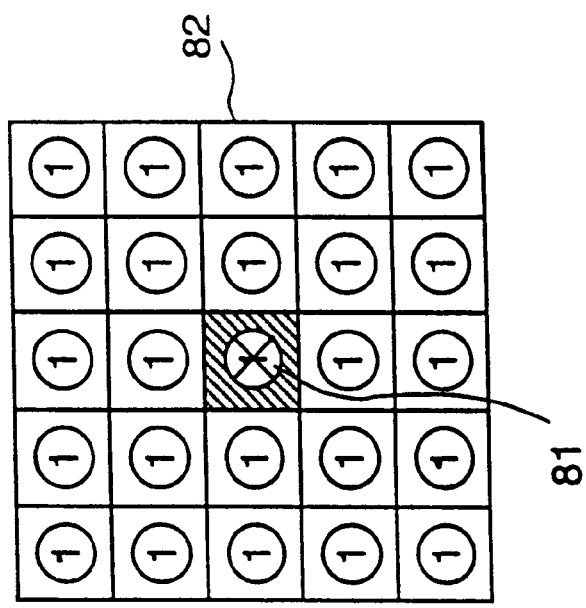
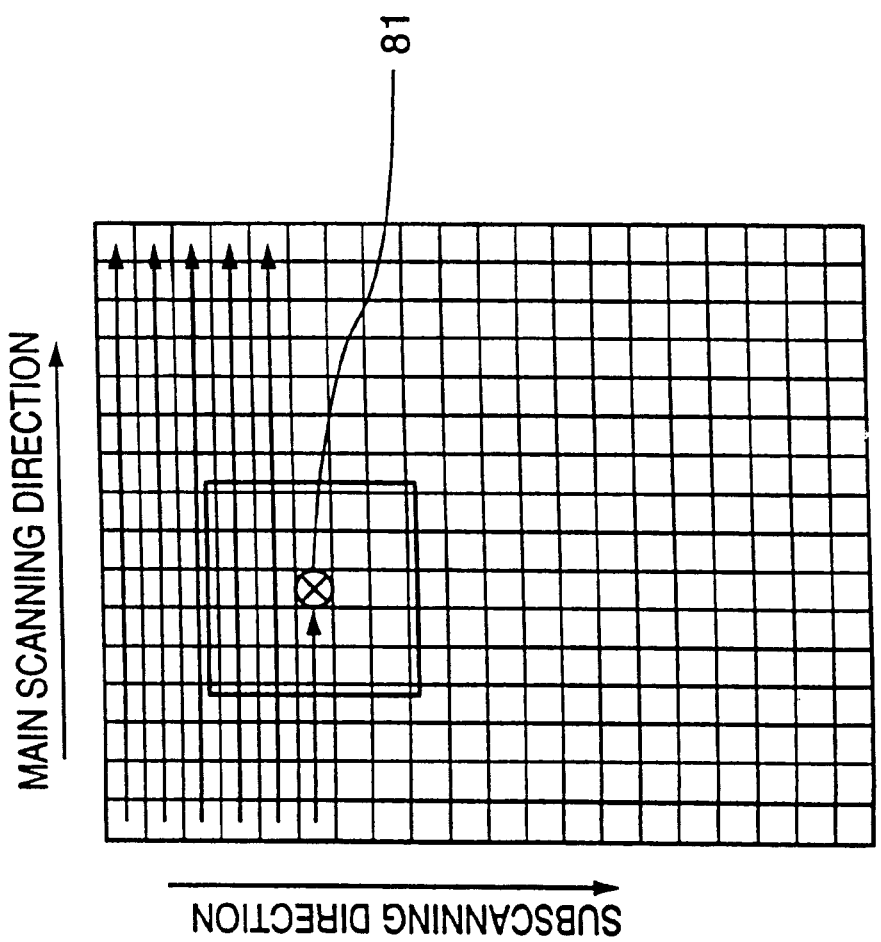

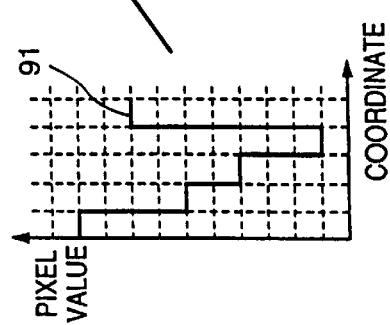
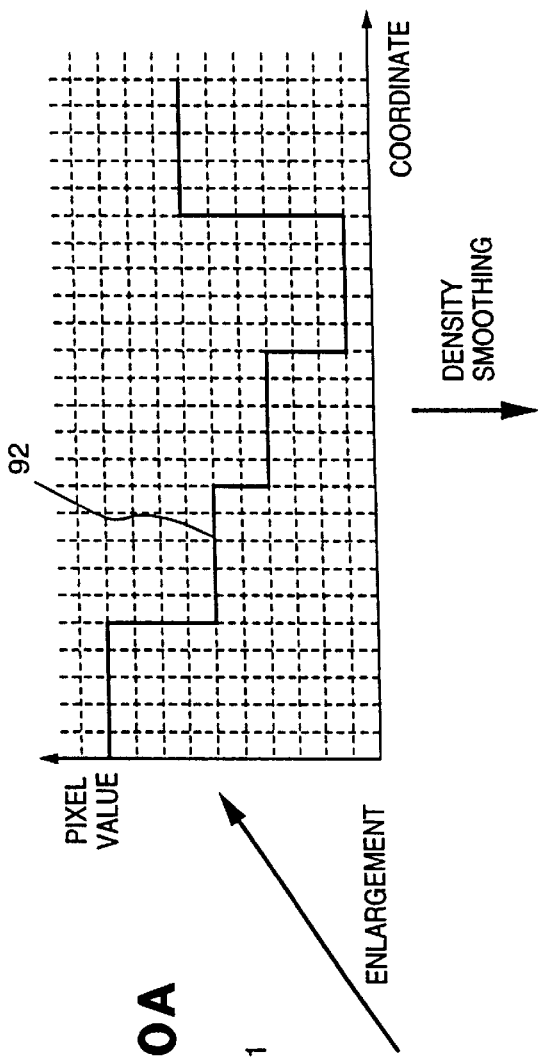
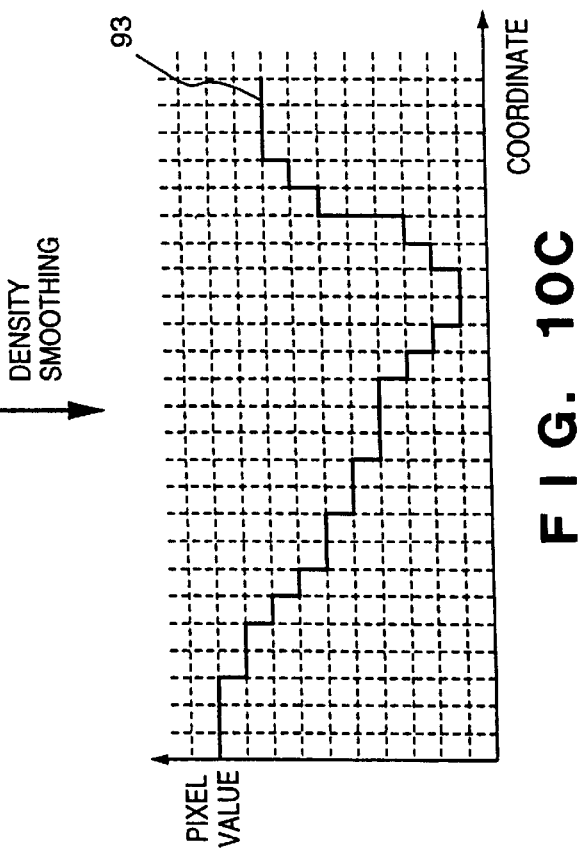

MULTIVALUED IMAGE BUFFER G

BINARY IMAGE BUFFER B

HORIZONTAL LINE
(HORIZONTAL VECTOR)

VERTICAL LINE
(VERTICAL VECTOR)

FIG. 65
(PRIOR ART)

| Label | Value | Description |
|---|---|---|
| NUMBER OF LOOPS IN IMAGE | N | NUMBER OF CLOSED LOOPS |
| TABLE OF NUMBER OF VERTEXES IN EACH LOOP | $L_1$ | NUMBER OF VERTEXES IN FIRST LOOP |
| | $L_2$ | NUMBER OF VERTEXES IN SECOND LOOP |
| | ⋮ | ⋮ |
| | $L_{i-1}$ | NUMBER OF VERTEXES IN (i-1)TH LOOP |
| | $L_i$ | NUMBER OF VERTEXES IN iTH LOOP |
| | $L_{i+1}$ | NUMBER OF VERTEXES IN (i+1)TH LOOP |
| | ⋮ | ⋮ |
| | $L_{N-1}$ | NUMBER OF VERTEXES IN (N-1)TH LOOP |
| | $L_N$ | NUMBER OF VERTEXES IN NTH LOOP |

VERTEX COORDINATE TABLE:

| Section | Value | Description |
|---|---|---|
| TABLE OF VERTEX COORDINATES IN FIRST LOOP | $x_{11}$, $y_{11}$ | COORDINATES OF FIRST VERTEX IN FIRST LOOP |
| | $x_{12}$, $y_{12}$ | COORDINATES OF FIRST VERTEX IN SECOND LOOP |
| | ⋮ | ⋮ |
| | $x_{1j-1}$, $y_{1j-1}$ | COORDINATES OF (j-1)TH VERTEX IN FIRST LOOP |
| | $x_{1j}$, $y_{1j}$ | COORDINATES OF jTH VERTEX IN FIRST LOOP |
| | $x_{1j+1}$, $y_{1j+1}$ | COORDINATES OF (j+1)TH VERTEX IN FIRST LOOP |
| | ⋮ | ⋮ |
| | $x_{1L_1-1}$, $y_{1L_1-1}$ | COORDINATES OF $(L_1-1)$TH VERTEX IN FIRST LOOP |
| | $x_{1L_1}$, $y_{1L_1}$ | COORDINATES OF $L_1$TH VERTEX IN FIRST LOOP |
| TABLE OF VERTEX COORDINATES IN SECOND LOOP | $x_{21}$, $y_{21}$ | COORDINATES OF FIRST VERTEX IN SECOND LOOP |
| | ⋮ | ⋮ |
| | $x_{2L_2}$, $y_{2L_2}$ | COORDINATES OF $L_2$TH VERTEX IN SECOND LOOP |
| | ⋮ | ⋮ |
| TABLE OF VERTEX COORDINATES IN NTH LOOP | $x_{N1}$, $y_{N1}$ | COORDINATES OF FIRST VERTEX IN NTH LOOP |
| | ⋮ | ⋮ |
| | $x_{NL_N}$, $y_{NL_N}$ | COORDINATES OF $L_N$TH VERTEX IN NTH LOOP | ated outline vector data. The smoothed outline vector
IMAGE PROCESSING METHOD AND APPARATUS

BACKGROUND OF THE INVENTION

1. Field of the Invention

The present invention relates to an image processing apparatus and method and, more particularly, to an image processing apparatus and method for magnifying a digital multivalued image.

2. Description of the Related Art

An apparatus of this type associated with digital binary images has already been disclosed in Japanese Patent Laid-Open No. 5-174140.

In this proposal, when a binary image is to be subjected to magnifying processing, the contour information of the character/line drawing components of the binary image is extracted, and a magnified image is generated on the basis of the extracted contour information instead of magnifying the binary image itself. It is an object of the proposal to obtain a binary image with high quality.

More specifically, in Japanese Patent Laid-Open No. 5-174140, outline vectors are extracted from a binary image, and smoothing processing is performed with respect to the extracted outline vector data. The smoothed outline vector data is magnified at a desired (arbitrary) magnification. Contours are then drawn and the areas defined by the contours are painted to reproduce a binary image. With this operation, a high-quality digital binary image magnified at the desired magnification (arbitrary) is obtained.

The main part of this proposal will be briefly described below. FIG. 56 is a block diagram best representing the characteristic features disclosed in Japanese Patent Laid-Open No. 5-174140. Referring to FIG. 56, a binary image acquisition unit 101 acquires a digital binary image to be subjected to magnifying processing, and outputs a raster scanning type binary image. An outline extraction unit 102 extracts coarse contour vectors (outline vectors before smoothing/magnifying processing) from the raster scanning type binary image. An outline smoothing/magnifying unit 103 performs smoothing/magnifying processing for the coarse contour vector data in the form of vector data. A binary image reproduction unit 104 reproduces raster scanning type binary image data from the outline vector data. A binary image output unit 105 is a printer or display device for displaying the raster scanning type binary image data, producing a hard copy, or outputting the data to a communication line or the like.

For example, the binary image acquisition unit 101 is constituted by a known binary image input device for reading an original image as a binary image and outputting the read image as binary data in the raster scanning form.

For example, the outline extraction unit 102 is constituted by a device disclosed in Japanese Patent Laid-Open No. 4-157578 previously proposed by the assignee of the present application. FIG. 57 shows a scanning form for raster scanning type binary image data output from the binary image acquisition unit 101, and also a scanning form for raster scanning type binary image data received by the outline extraction unit 102. In this form, the outline extraction unit 102 receives raster scanning type binary image data output from the binary image acquisition unit 101. Referring to FIG. 57, a pixel 111 is a given pixel of a binary image during a raster scanning operation, and an area 112 is a 9-pixel area including eight pixels adjacent to the pixel 111. The above outline extraction unit disclosed in Japanese Patent Laid-Open No. 4-157578 switches target pixels in the raster scanning order, and detects a contour side vector (horizontal or vertical vector) between each target pixel and each adjacent pixel in accordance with the state of each pixel (white or black pixel) in a 9-pixel area like the area 112. If a contour side vector is present, the outline extraction unit extracts the start coordinates and direction data of the side vector, and sequentially extracts coarse contour vectors while updating the relationship in connection between these side vectors.

FIG. 58 shows a state wherein contour side vectors between a target pixel and pixels adjacent to the target pixel are extracted. Referring to FIG. 58, a mark "Δ" represents the start point of a vertical vector (or the end point of a horizontal vector), and a mark "O" represents the start point of a horizontal vector (or the end point of a vertical vector).

FIG. 59 shows coarse contour vector loops extracted by the outline extraction unit described above. In this case, each square defined by the matrix indicates the pixel position of an input image; each blank square, a white pixel; and each hatched mark "●", a black pixel. Similar to FIG. 58, each mark "Δ" represents the start point of a vertical vector; and each mark "O", the start point of a horizontal vector.

As is apparent from the case shown in FIG. 59, the outline extraction unit 102 extracts areas where pixels are coupled to each other as coarse contour vector loops including horizontal and vertical vectors which always appear alternately and continuously, although the horizontal and vertical vectors differ in length. Note that in this case, extraction processing is performed such that a black pixel area is located on the right side with respect to the direction of the extraction processing. In addition, the start point coordinates of the coarse contour vectors are extracted as the middle positions between the respective pixels of the input image. That is, when the position of each pixel is expressed by integers (x,y), the start point of an extracted vector is expressed by values obtained by adding or subtracting 0.5 to or from the respective coordinate values. More specifically, one pixel in an original image is determined as a pixel (rectangle) having a significant area and extracted as a coarse contour loop.

The coarse contour vector group extracted in this manner is output from the outline extraction unit 102 in FIG. 56 according to a data format like the one shown in FIG. 60. That is, the coarse contour vector group is constituted by a total number n of coarse contour loops extracted from an image, and a group of coarse contour loop data of the first contour loop to the ath contour loop. Each coarse contour loop data is constituted by the total number of the start points of contour side vectors (equivalent to the total number of contour side vectors) present in the coarse contour loop, and a string of the values (the start points of horizontal and vertical vectors are alternately arranged) of the start point coordinates (x- and y-coordinate values) of the respective contour side vectors in the order of constituting the loop.

The outline smoothing/magnifying unit 103 shown in FIG. 56 receives the coarse contour vector data (see FIG. 60) output from the outline extraction unit 102. The unit 103 then performs smoothing processing and magnifies the data at a desired magnification in the form of outline vector data (coordinate values).

FIG. 61 shows the arrangement of the outline smoothing/magnifying unit 103 in more detail. Referring to FIG. 61, a first smoothing/magnifying unit 152 smoothes and magnifies input coarse contour data at a magnification set by a magnification setting unit 151. A second smoothing unit 153 further performs smoothing of the processing result to obtain a final output. The magnification setting unit 151 may supply a value set by a DIP switch, a dial switch, or the like in advance to the first smoothing/magnifying unit 152, or may supply a value externally provided via an I/F (interface) to the first smoothing/magnifying unit 152. The magnification setting unit 151 is a unit for providing information designating specific magnifications respectively in the main scanning (horizontal) direction and the subscanning (vertical) direction with respect to an image size supplied as input data.

The first smoothing/magnifying unit 152 receives magnification information from the magnification setting unit 151 and performs smoothing/magnifying processing.

FIG. 62 shows a hardware arrangement for realizing outline smoothing/magnifying processing. Referring to FIG. 62, a ROM 164 stores operation procedures and the like executed by a CPU 161.

An output from the outline extraction unit 102 in FIG. 56 is stored, as a file (coarse contour vector data), in a disk unit 162 according to the data format shown in FIG. 60.

The CPU 161 operates in accordance with the procedure shown in FIG. 63 to execute outline smoothing/magnifying processing.

Referring to FIG. 63, in step S170, the CPU 161 reads out coarse contour data from the disk unit 162 via a disk I/O 163, and loads it in a working memory area (not shown) of a RAM 166. In step S171, the CPU 161 performs first smoothing/magnifying processing.

The first smoothing processing is performed for each closed loop of the coarse contour data. Each contour side (horizontal or vertical vector) vector of each coarse contour data is sequentially set as a target vector, and at most three continuous side vectors before and after each target contour side vector (i.e., at most a total of seven side vectors, i.e., three sides before the target side, the target side itself, and three sides after the target side) are classified into a pattern according to a combination of the lengths and directions of the continuous side vectors. With respect to each pattern, the CPU 161 then outputs additive information (to be referred to as corner point information hereinafter) indicating the coordinate value of each contour point after the first smoothing processing and whether the contour point is a point at a corner. In this case, a "point at a corner" means a point located at a significant corner, i.e., a point which is not changed by smoothing processing. Points other than corner points are determined as points derived from noise and points derived from jagged portions and notches caused by other factors. A contour point after the first smoothing processing which is determined as a corner point is treated as a point which is not smoothed by the second smoothing processing, i.e., treated as a fixed point. In other words, a contour point (to be referred to as a non-corner point hereinafter) after the first smoothing processing which is not determined as a corner point is further smoothed by the second smoothing processing.

FIG. 64 shows this state, i.e., a target coarse contour side vector $D_i$, three side vectors $D_{i-1}$, $D_{i-2}$, and $D_{i-3}$ before the target coarse contour side vector, three side vectors $D_{i+1}$, $D_{i+2}$, and $D_{i+3}$ after the target coarse contour side vector, and a contour point after the first smoothing processing which is defined with respect to the target edge $D_i$. That is, a vector (an oblique vector is allowed) connecting contours redefined in this manner is generated.

The contents of the first smoothing processing have been described above. Data after the first smoothing processing are sequentially created on a predetermined area of the RAM 166. As a result, the vector data after the first smoothing processing allows oblique vectors with respect to the coarse contour vector data, and hence an image without any jagged portion can be generated. Upon completion of the processing in step S171 in FIG. 63, the CPU 161 performs the second smoothing processing in step S172.

In the second smoothing processing, data after the first smoothing processing is input and processed. That is, the CPU 161 receives data indicating the number of closed loops, data indicating the number of contour points of each closed loop, the coordinate value data string of contour points of each closed loop after the first smoothing processing, and the additive information data string of the contour points of each closed loop after the first smoothing processing, and outputs contour point data after the second smoothing processing.

As shown in FIG. 65, the contour data after the second smoothing processing is constituted by the number of closed loops, a contour point count table for each closed loop, and the coordinate value data string of the contour points of each closed loop after the second smoothing processing.

The second smoothing processing will be briefly described below with reference to FIG. 66. Similar to the first smoothing processing, in the second smoothing processing, processing is performed in units of contour loops, while processing is performed in units of contour points in each contour loop.

If a target contour point is a corner point, an input contour point coordinate value is used as contour point coordinate data which has undergone the second smoothing processing with respect to the target contour point. That is, no change is made.

If a target contour point is a non-corner point, a coordinate value obtained from the weighted mean of the coordinate values of contour points before and after the target contour point and the coordinate value of the target contour point is used as a contour point coordinate value which has undergone the second smoothing processing with respect to the target contour point. More specifically, letting $P_i$ ($x_i, y_i$) be the target input contour point as the non-corner point, $P_{i-1}(X_{i-1}, y_{i-1})$ be the contour point immediately before the target contour point $P_i$ in the input contour loop, $P_{i+1}(x_{i+1}, y_{i+1})$ be the contour point immediately after the target contour point $P_i$, and $Q_i(x'_i, y'_i)$ be the contour point which has undergone the second smoothing processing with respect to the target input contour point $P_i$, $$x'_i = k_{i-1} \cdot x_{i-1} + k_i \cdot x_i + k_{i+1} \cdot x_{i+1} \quad Y'_i = k_{i-1} \cdot Y_{i-1} + k_i \cdot y_i + k_{i+1} \cdot y_{i+1} \tag{1}$$

In this case, $k_{i-1} = k_{i+1} = \frac{1}{4}$ and $k_i = \frac{1}{2}$.

Referring to FIG. 66, points P0, P1, P2, P3, and P4 form a part of a series of continuous contour points, as input data, which have undergone the first smoothing processing, points P0 and P4 are corner points, and points P1, P2, and P3 are non-corner points. The processing results obtained at this time are respectively indicated by points Q0, Q1, Q2, Q3, and Q4. Since the points P0 and P4 are corner points, their coordinate values are used as the coordinate values of the points Q0 and Q4 without any change. The point Q1 has coordinate values calculated from the points P0, P1, and P2 according to the above equations. Similarly, the points Q2 and Q3 respectively have coordinate values calculated from the points P1, P2, and P3 and the points P2, P3, and P4 according to the above equations.

The CPU 161 performs the second smoothing processing with respect to the contour data in a predetermined area of the RAM 166, which has undergone the first smoothing processing, in the above-described manner. The second smoothing processing is sequentially performed for each loop in an order of the first loop, the second loop, the third loop . . . When processing with respect to all loops is completed, the second smoothing processing is ended. In each loop, processing is sequentially performed in an order of the first point, the second point, the third point . . . When the processing indicated by equations (1) is completed with respect all the contour points in one loop, the processing of this loop is ended, and the next loop is processed.

Assume that L contour points are present in a loop. In this case, a point before the first point is the Lth point. In other words, a point after the Lth point is the first point. The contour point data obtained by the second smoothing processing has the same total number of loops as that of the contour data after the first smoothing processing, with the number of contour points on each loop remaining the same. The CPU 161 outputs the above result to another area of the RAM 166 or the disk unit 162 according to the format shown in FIG. 65, and completes the second smoothing processing (step S172).

The flow then advances to step S173 to transfer the data obtained by the second smoothing processing to a binary image reproduction unit 104 via the I/O 163, thereby completing the series of operations shown in FIG. 56.

For example, the binary image reproduction unit 104 can be constituted by a device disclosed in Japanese Patent Laid-Open No. 5-20467 proposed by the assignee of the present application. This device can output a binary image in the raster scanning form, which image is generated by painting an area enclosed with a vector graphic pattern expressed by contour data, obtained by the second smoothing processing and transferred via an I/O, on the basis of the contour data. In addition, according to the description of this proposal, binary image data is visualized by using a binary image output unit such as a video printer. The proposal disclosed in Japanese Patent Laid-Open No. 6-12490 is an improvement on Japanese Patent Laid-Open No. 5-174140 described above. This proposal aims at preventing an image magnified at a low magnification from excessive thickening. More specifically, the outline extraction unit in Japanese Patent Laid-Open No. 5-174140 extracts a vector at a position located between white and black pixels and closer to the black pixel (i.e., a black pixel area is set to be smaller in width than a white pixel area), and outline smoothing is performed in accordance with this vector extraction.

According to Japanese Patent Laid-Open No. 5-174140 described above, good magnified images can be obtained even from binary images, such as characters, line drawings, tables, and graphic patterns, in particular.

In general, a multivalued digital image is magnified by performing interpolation processing using the pixel values of the multivalued image. This interpolation processing is performed by a known magnifying method such as a method of interpolating pixel values between the pixels of a sampled original image by using a bilinear function or a method of performing interpolation by approximating a sampling function with a cubic expression. For example, such methods are described in Tamura Hideyuki, "Introduction to Computer Image Processing" Souken Shuppan (1985).

In the above technique of magnifying a multivalued digital image by interpolating the pixel values of the image with attention being paid to only the pixel values of the original image, a deterioration in image quality, e.g., a jagged pattern or lattice-like distortion, may occur.

SUMMARY OF THE INVENTION

It is an object of the present invention to provide an image processing apparatus and method which prevent a jagged pattern or lattice-like distortion when magnifying a multivalued image.

In order to achieve the above object, according to the present invention, there is provided an image processing apparatus for executing magnifying processing for a multivalued image, comprising:

equidensity curve vector extraction means for extracting outline vectors for each density level of a multivalued image;

magnifying/smoothing means for magnifying/smoothing the extracted outline vectors for each density level; and multivalued image generating means for generating a multivalued image on the basis of the outline vectors corresponding to each density level and obtained by the magnifying/smoothing means.

In addition, according to the present invention, there is provided an image processing method of executing magnifying processing for a multivalued image, comprising:

the equidensity curve vector extraction step of extracting outline vectors for each density level of a multivalued image;

the magnifying/smoothing step of magnifying/smoothing the extracted outline vectors for each density level; and the multivalued image generation step of generating a multivalued image on the basis of the outline vectors corresponding to each density level and obtained in the magnifying/smoothing step.

Furthermore, according to the present invention, there is provided a computer memory storing a program for executing magnifying processing for a multivalued image, comprising:

a code for the equidensity curve vector extraction step of extracting outline vectors for each density level of a multivalued image;

a code for the magnifying/smoothing step of magnifying/smoothing the extracted outline vectors corresponding to each density level; and a code for the multivalued image generation step of generating a multivalued image on the basis of the outline vectors corresponding each density level and obtained in the magnifying/smoothing step.

With the above arrangement, a multivalued image can be magnified, while high image quality is maintained, without any jagged pattern or distortion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a schematic view showing uniform weight filtering processing;

FIG. 10 is a schematic view showing the principle of processing in the pixel value interpolation unit;

FIG. 65 is a view showing the format of smoothed vector data in the previously proposed technique;

DETAILED DESCRIPTION OF THE PREFERRED EMBODIMENTS

Embodiments of the present invention will be described in detail below with reference to the accompanying drawings.

First Embodiment

Figure 1:
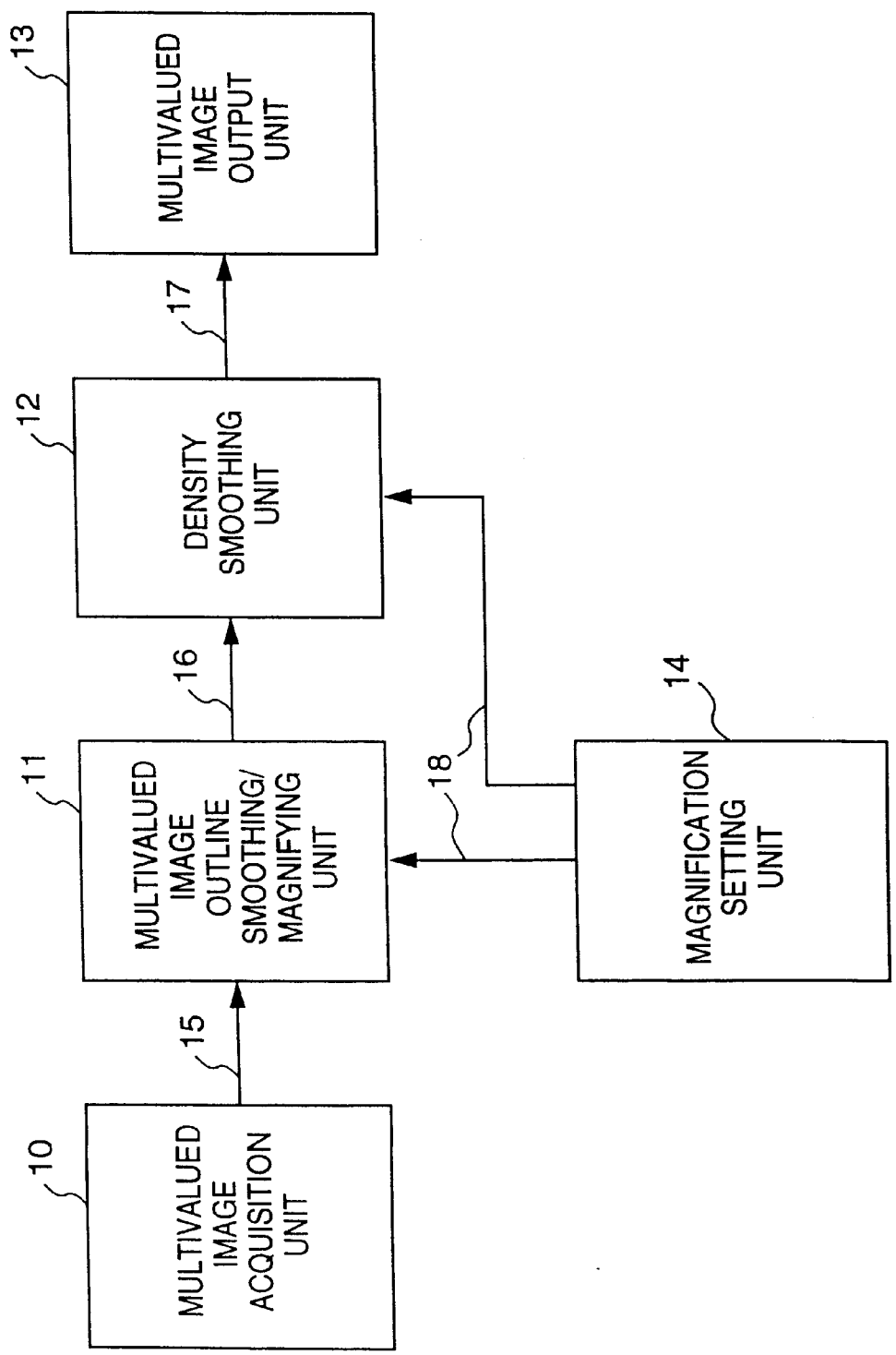
FIG. 1 is a block diagram showing the overall arrangement of an apparatus according to the first embodiment of the present invention.

FIG. 1 is a block diagram showing the arrangement of the first embodiment. Referring to FIG. 1, a multivalued image acquisition unit 10 acquires a digital multivalued image to be subjected to magnifying processing, and outputs a raster scanning type multivalued image. A multivalued image outline smoothing/magnifying unit 11 receives magnification designation data 18 set by a magnification setting unit 14 and raster scanning type multivalued image data 15 output from the multivalued image acquisition unit 10, and performs magnifying processing for the contour shape of the multivalued image data 15. A density smoothing unit 12 receives the magnification designation data 18 set by the magnification setting unit 14 and multivalued image data 16 magnified by the multivalued image outline smoothing/magnifying unit 11, and smoothes the density of the multivalued image data 16 by performing pixel value interpolation therefor. A multivalued image output unit 13 is a printer, a display device, or the like which displays the obtained magnified image, produces a hard copy, or outputs the data to a communication line or the like.

Figure 2:
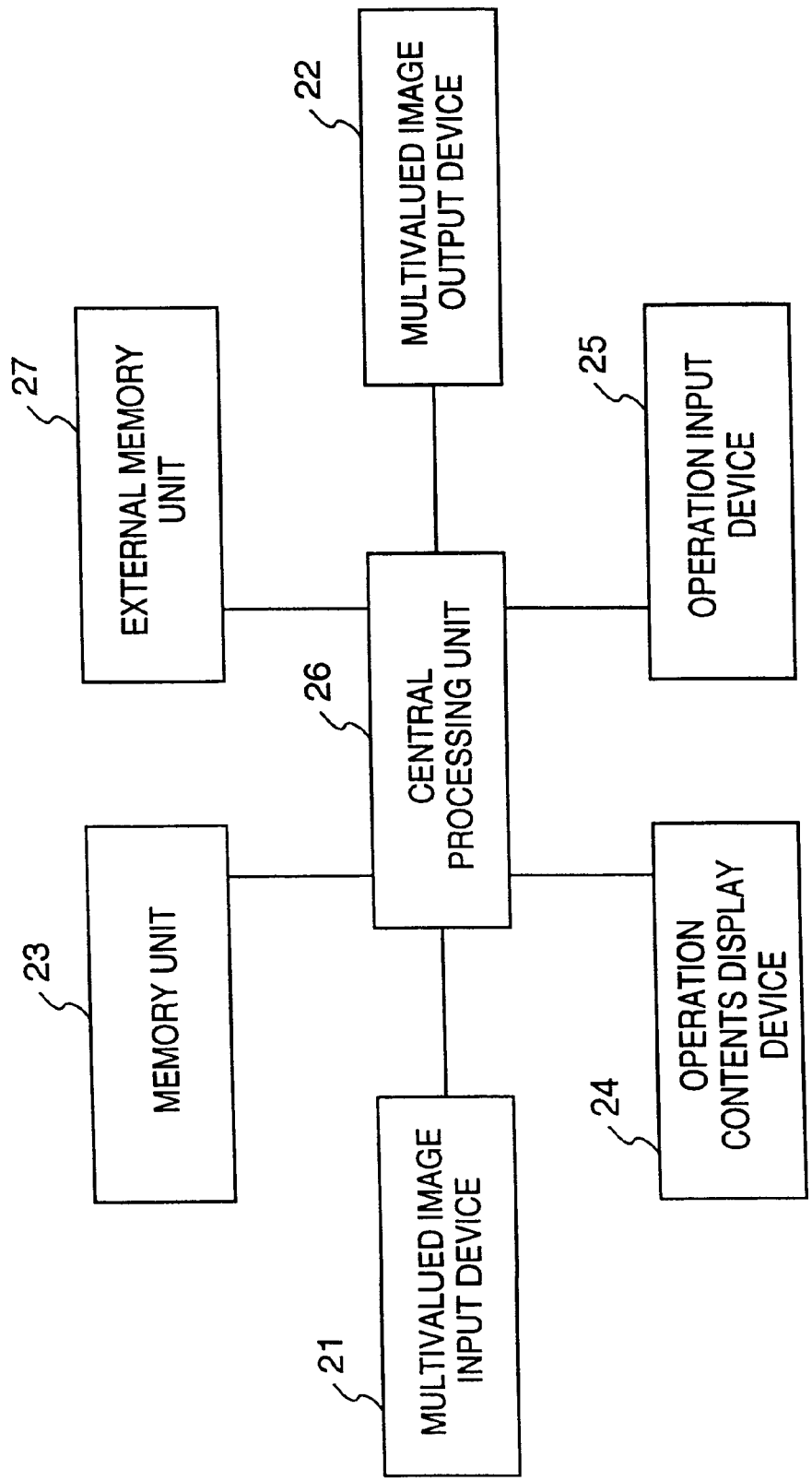
FIG. 2 is a block diagram showing the detailed arrangement of the present invention.

FIG. 2 shows the hardware arrangement of the image processing apparatus of the present invention. A multivalued image input device 21 reads an image by using, e.g., an image reader, and outputs image data in the raster scanning form. The multivalued image input device 21 corresponds to the multivalued image acquisition unit 10 described above. Note that multivalued image input device 21 may be a device for loading data from a storage medium in which multivalued image data is stored, or a device for inputting an image photographed by a still camera, or a device for inputting a video signal.

A multivalued image output device 22 is a printer, a display, or the like and corresponds to the multivalued image output unit 13. A memory unit 23 stores programs for controlling the whole image processing apparatus and executing image processing, image data, and the like. A display device 24 is a display or the like which displays operation contents. An operation input device 25 is a keyboard, a mouse, or the like. A central processing unit 26 controls the whole image processing apparatus and executes image processing. A multivalued image input from the multivalued image input device 21 or stored in an external memory unit 27 is stored in the memory unit 23. The display device 24 displays an image magnifying processing designation input from the operation input device 25. Upon reception of this designation, the central processing unit 26 executes the designated processing while accessing the memory unit 23, and outputs the processing result to the multivalued image output device 22 or stores it in the external memory unit 27. In the latter case, the external memory unit 27 also serves as the multivalued image output unit 13.

Note that each block in FIG. 1 may be a program module executed by the central processing unit 26. By executing such program modules using the system in FIG. 2, the apparatus of this embodiment can be realized. In addition, each module is stored in the external memory unit 27 and supplied to the system.

Figure 3:
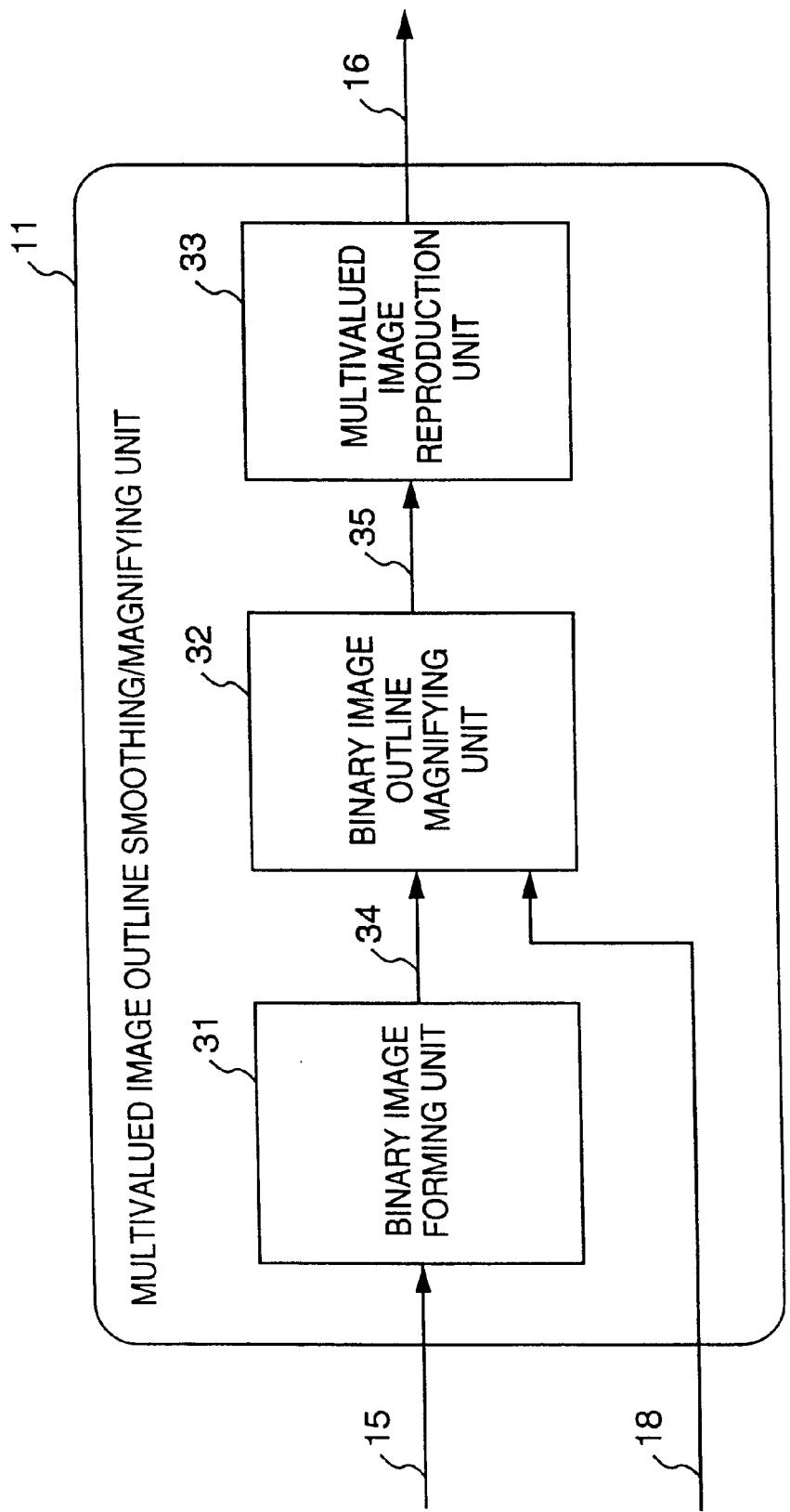
FIG. 3 is a block diagram showing the arrangement of a multivalued image outline smoothing/magnifying unit in the first embodiment.

FIG. 3 shows the detailed arrangement of the multivalued image outline smoothing/magnifying unit 11 in FIG. 1.

Referring to FIG. 3, a binary image generating unit 31 generates a raster scanning type binary image data group 34 for each gradation on the basis of the multivalued image data 15 output from the multivalued image acquisition unit 10 in FIG. 1. A binary image outline magnifying unit 32 receives the raster scanning type binary image data group 34 generated by the binary image generating unit 31 and the magnification designation data 18 set by the magnification setting unit 14 in FIG. 1, and extracts outline vectors. The binary image outline magnifying unit 32 then performs smoothing/magnifying processing in the form of the extracted outline vector data, and outputs a binary image data group 35 expressing the resultant smoothed/magnified outline data. A multivalued image reproduction unit 33 reproduces a magnified multivalued image 16 from the binary image data group 35 magnified by the binary image outline magnifying unit 32.

Figure 4:
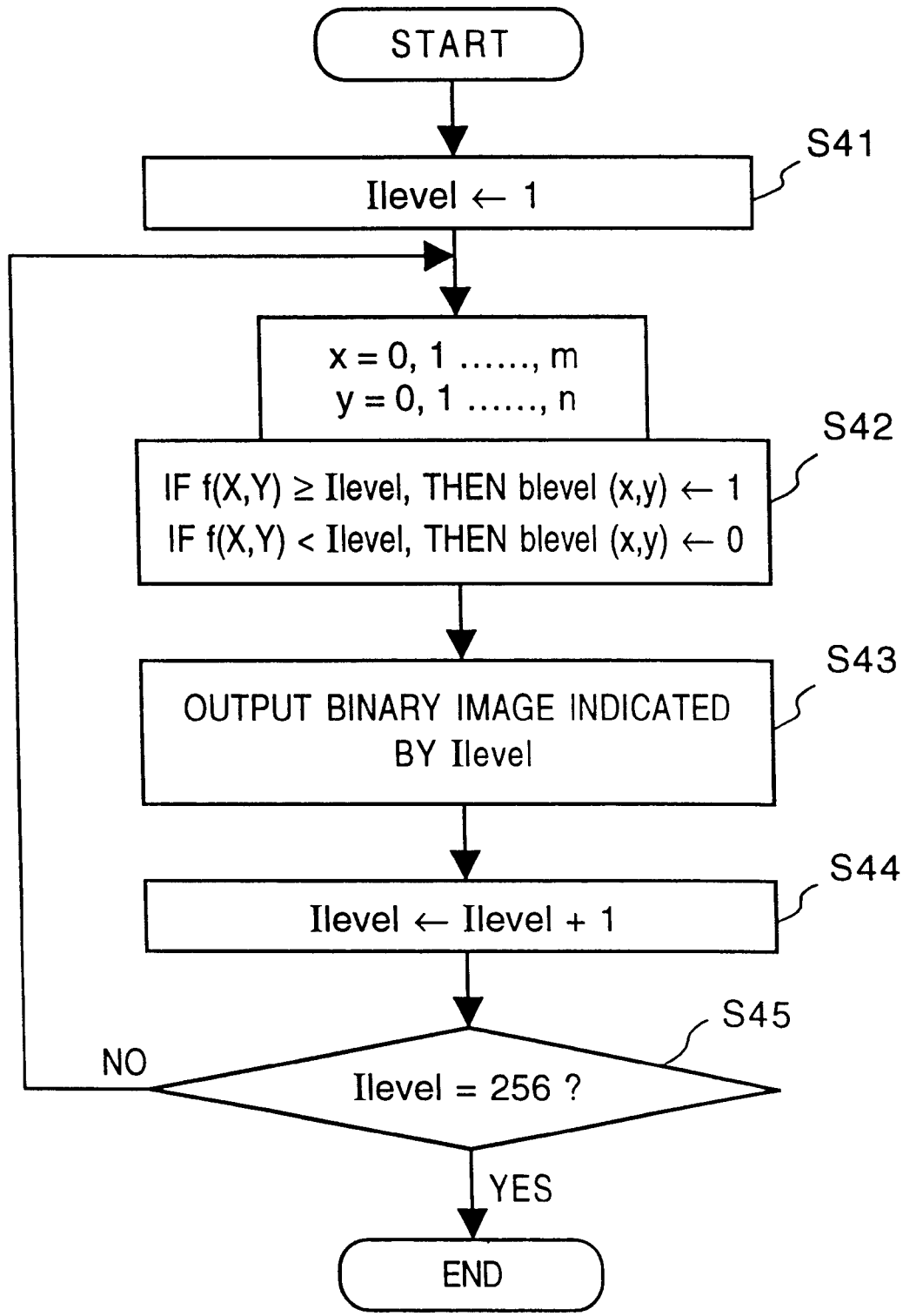
FIG. 4 is a flowchart showing the operation of a binary image generating unit in the first embodiment.

FIG. 4 shows the flow of processing in the binary image generating unit 31. The binary image generating unit 31 generates binary images each of which corresponds to each density level from the digital multivalued image data 15 input in the raster scanning form in accordance with the flow of the processing in FIG. 4. The input multivalued image has m+1 pixels (i.e., x=0 to m) in the main scanning direction and n+1 pixels (i.e., y=0 to n) in the subscanning direction. A pixel value at coordinates x and y in the main scanning and subscanning directions is written as f(x,y). The density level of a multivalued image is expressed by a variable Ilevel. A binary image of a density level indicated by the variable Ilevel is expressed by blevel(x,y).

In step S41, "1" is substituted as an initial value for the variable Ilevel to express the current density level.

The flow advances to step S42 to check an input image f(x,y) and determine the binary image blevel(x,y) depending on whether the pixel value is equal to or larger than the value held as the variable Ilevel, or less than that.

More specifically,

If f(x,y)≧Ilevel, then blevel(x,y)←"1".

If f(x,y)<Ilevel, then blevel(x,y)←"0".

This processing is performed in the range of x and y (x=0, 1, . . . , m, y=0, 1 . . . n) to obtain the binary image blevel corresponding to pixels having a density level being equal to or bigger than Ilevel with respect to the input image f.

When the binary image blevel corresponding to Ilevel is generated in this manner, the flow advances to step S43 to output the binary image blevel to the binary image outline magnifying unit 32 as the next processing unit in FIG. 3.

When the flow reaches step S44, the variable Ilevel is incremented by "1". In step S45, it is checked whether the variable Ilevel is equal to 256. If it is determined that the variable Ilevel is less than 256, the processing in step S42 and the subsequent steps is repeated.

The above processing will be described with reference to FIGS. 5A to 5D. Assume that an original image have four gradations, i.e., four densities of 0, 1, 2, and 3 as density values.

Figure 5A:
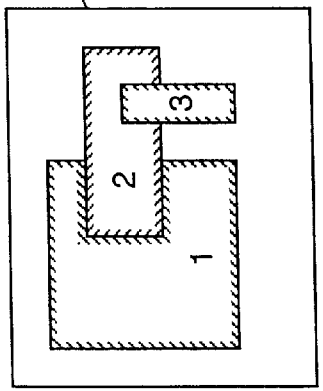
FIGS. 5A to 5D are views showing the principle of generation of a binary image corresponding to each gradation level from a multivalued image.
Figure 5D:
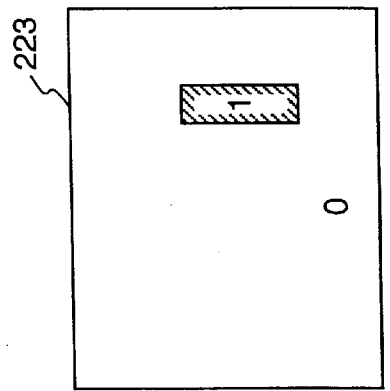
Figure 5C:
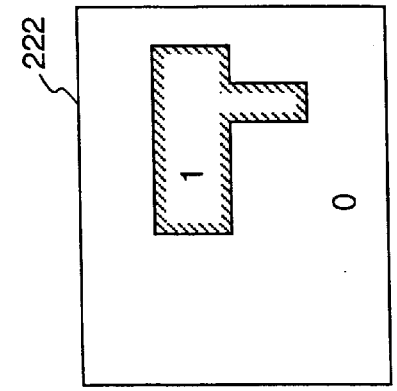

Assume that an original image 220 in FIG. 5A (the numbers 0, 1, 2, and 3 in the image respectively represent density values) is input.

Figure 5B:
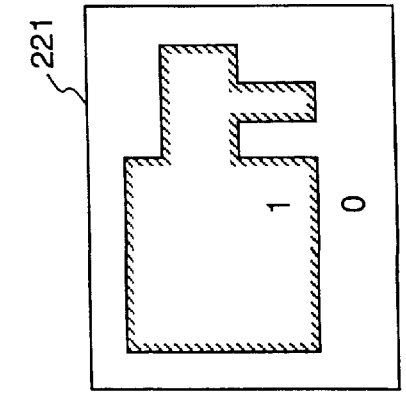

If variable Ilevel=1, a binary image (blevel) 221 in FIG. 5B is generated and output to the binary image outline magnifying unit 32. If Ilevel=2, a binary image 222 is generated. If Ilevel=3, a binary image 223 is generated.

In the above processing, when generation of a binary image corresponding to a given density level is completed, the resultant data is transferred to the lower-order processing, and processing for the next density level is started. However, after binary images corresponding to all density levels are generated, the resultant data may be transferred to the next step. In the latter case, since the binary images corresponding to all the density levels are generated at once, an increase in memory capacity is inevitable. This technique is efficient when the overall processing of the apparatus is performed by one CPU, because the overhead required to switch the respective tasks decreases.

In the former case, in which after a binary image corresponding to a given density level is generated, the resultant data is transferred to the lower-order processing, no problem is posed if the CPU has a satisfactory multitask function. This technique is especially suitable for a case wherein tasks are executed by different CPUs.

Figure 6:
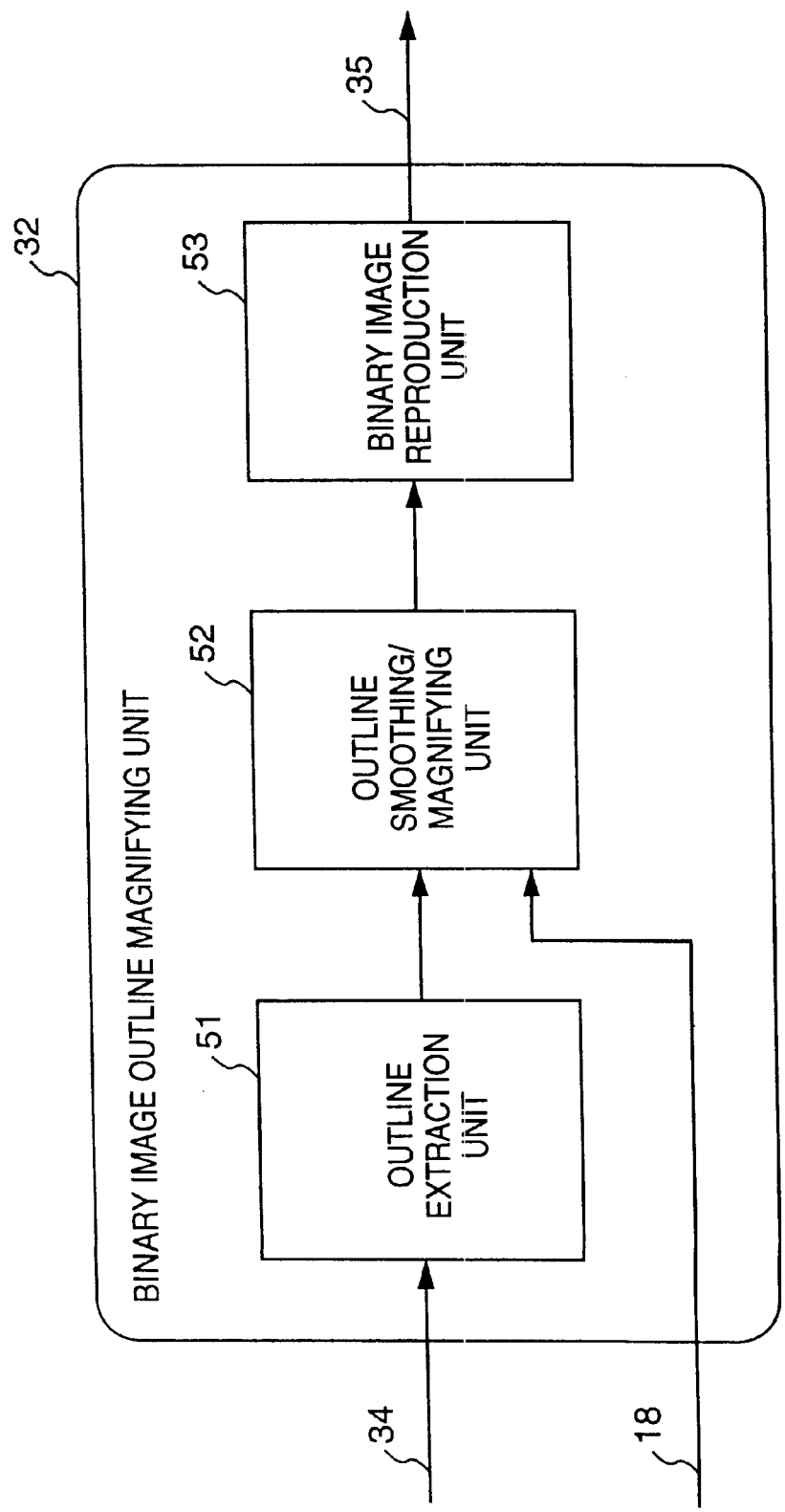
FIG. 6 is a block diagram showing the arrangement of a binary image outline magnifying unit.

The binary image outline magnifying unit 32 in FIG. 3 can be constituted, for example, by the device disclosed in Japanese Patent Laid-Open No. 5-174140 described above and filed by the assignee of the present application. As shown in FIG. 6, the binary image outline magnifying unit 32 comprises an outline extraction unit 51, an outline smoothing/magnifying unit 52, and a binary image reproduction unit 53. More specifically, the outline extraction unit 51 sequentially receives the binary image data group 34 generated by the binary image generating unit 31, and extracts outline vectors (coarse contour vectors) corresponding to the respective density levels. The outline smoothing/magnifying unit 52 generates outline vectors smoothly magnified at a desired (arbitrary) magnification designated by a magnification signal 18 in the form of the extracted outline vector expression. The binary image reproduction unit 53 then generates raster scanning type binary image data group 35 indicated by Ilevel from the smoothly magnified outline vectors corresponding to the respective density levels.

The flow of processing in the multivalued image reproduction unit 33 in FIG. 3 will be described with reference to FIG. 7. In this case, a magnified multivalued image F (size M in the main scanning direction; size N in the subscanning direction) by using a magnified binary image group B (size M in the main scanning direction; size N in the subscanning direction) magnified by the binary image outline magnifying unit 32.

Note that a binary image corresponding to each density level and generated by smoothing/magnifying processing is represented by Blevel, and the pixel value of coordinates x and y is represented by Blevel(x,y) (one pixel consisting of one bit). In addition, the image F is a final image as a target image, and the pixel value of the coordinates x and y is represented by F(x,y) (one pixel consisting of eight bits).

In step S61, "1" is substituted as an initial value for the variable Ilevel, and all the output image data F(x,y) (x=0, 1, ..., M, y=0, 1, ..., N) are cleared.

The flow advances to step S62 to perform vector smoothing processing and input the resultant binary image Blevel indicated by the variable Ilevel.

In step S64, when the input binary image Blevel(x,y) is "1", the corresponding value of the variable Ilevel is substituted for the output image F(x,y). When Blevel(x,y) is "0", no processing is performed. That is, the value of F(x,y) is not changed. This processing is performed with respect to all values x and y.

When the flow advances to step S65, the variable Ilevel is incremented by "1" to prepare for the input of image data corresponding to the next density level.

The processing in step S62 and the subsequent steps is repeated until it is determined in step S66 that the value of the variable Ilevel becomes "256".

With the above processing, values of 0 to 255 are stored as the respective pixels of the output image F in accordance with the binary images corresponding to the respective density levels. As a result, a halftone image having undergone magnifying processing is stored.

The multivalued image outline smoothing/magnifying unit 11 in FIG. 1 has been described above.

Figure 7:
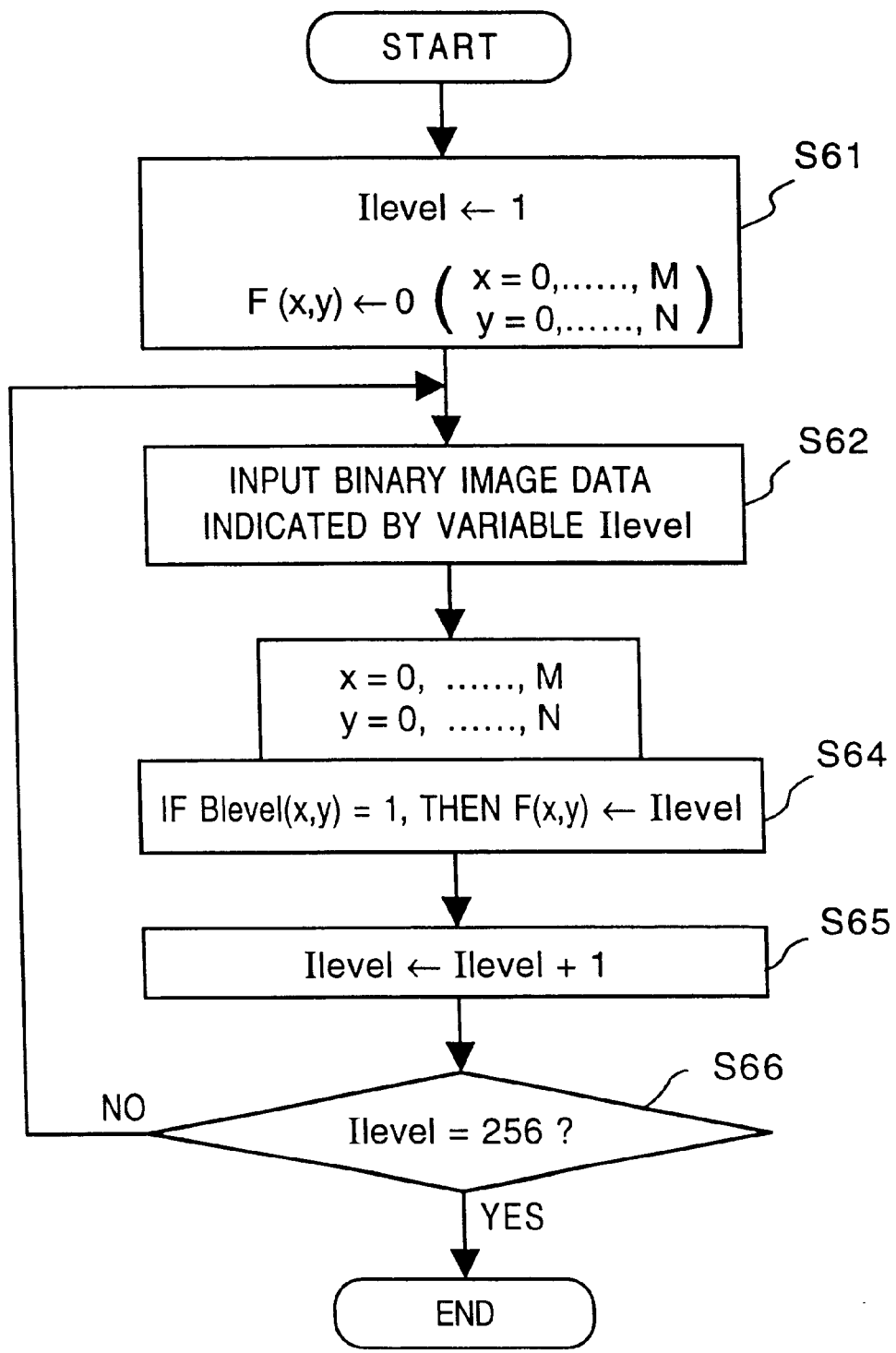
FIG. 7 is a flowchart showing processing in a multivalued image reproduction unit.

FIG. 7 shows the arrangement of the density smoothing unit 12 in FIG. 1.

The density smoothing unit 12 comprises a uniform weight filtering unit 71 and a filter size determining unit 72. The filter size determining unit 72 receives a magnification 18 obtained from the magnification setting unit 14 in FIG. 1, and outputs a filter size 73. The uniform weight filtering unit 71 receives an output 16 from the multivalued image outline smoothing/magnifying unit 11 and the filter size 73 output from the filter size determining unit 72, and outputs a multivalued image 17 having finally undergone pixel value interpolation processing.

The uniform weight filtering unit 71 performs filtering processing which is a known technique described in Tamura, "Introduction to Computer Image Processing" Souken Shuppan or the like and is generally used for removal of noise. FIG. 9 shows an outline of this processing. Referring to FIG. 9, a pixel 81 is a given pixel of a multivalued image during a raster scanning operation, and an area 82 is a 25-pixel area (5×5 area) including 24 pixels adjacent to the pixel 81.

In filtering processing, the value (density) of the target pixel 81 and the densities of the adjacent pixels are multiplied by a given weight, the arithmetic mean of the product is calculated, and the calculated value is set as the new pixel value of the target pixel. The uniform weight filtering unit 71 in this embodiment performs processing with a filter whose weighting factors are all set to "1", as shown in FIG. 9.

With the processing performed by the multivalued image outline smoothing/magnifying unit 11, the image data F is obtained. In this case as well, the target pixel value in the input image is represented by F(x,y), and the target pixel value after filtering processing is represented by D(x,y). The target pixel value D(x,y) is given as follows:

$$D(x,y)=\Sigma F(i,j)/K \quad (2)$$

for $x-2 \leq i \leq x+2$
$y-2 \leq j \leq y+2$
K=sum total of weight values in filter The filter size determining unit 72 determines the size of a filter used by the uniform weight filtering unit 71. This filter size is determined on the basis of the magnification 18 set by the magnification setting unit 14 in FIG. 1.

More specifically, letting G be the magnification in the main scanning direction, H be the magnification in the subscanning direction, g be the size of a rectangular filter (an area adjacent to the target pixel) in the main scanning direction, and h be the size of the filter in the subscanning direction, then g=min{[G], even ([G+1])}
h=min{[H], even ([H+1])}
where even(x) is a function for returning an odd number not less than x, [•••] is a Gauss' notation, and min{ } is a function for returning the minimum value in { }.

FIG. 10 shows the principle that pixel value interpolation can be performed by the uniform weight filtering unit 71. This principle will be described with reference to FIG. 10 by taking the case of a one-dimensional digital signal. Consider that an input digital signal 91 is enlarged five times (G=5 in equation (2)) in the coordinate direction. In this case, the input digital signal 91 is magnified into a signal 92 by the multivalued image outline smoothing/magnifying unit 11. The density smoothing unit 12 (g=5 in the filter size determining unit) performs uniform weight filtering processing. As a result, a density distribution 93 is obtained. It is therefore apparent that the amplitude value (pixel value in the case of an image) is interpolated such that the pixel value smoothly changes.

As described above, when the density smoothing unit 12 processes the magnifying processing result 16 obtained by smoothly magnifying the contour shape of image data using the multivalued image outline smoothing/magnifying unit 11, pixel value interpolation can also be performed such that the pixel value smoothly changes.

As described above, the multivalued image outline smoothing/magnifying unit 11 and the density smoothing unit 12 perform multivalued image magnifying processing to obtain a magnified multivalued image free from any jagged pattern or lattice-like distortion at contour portions during a multivalued image magnifying operation.

Modification of First Embodiment

Figure 8:
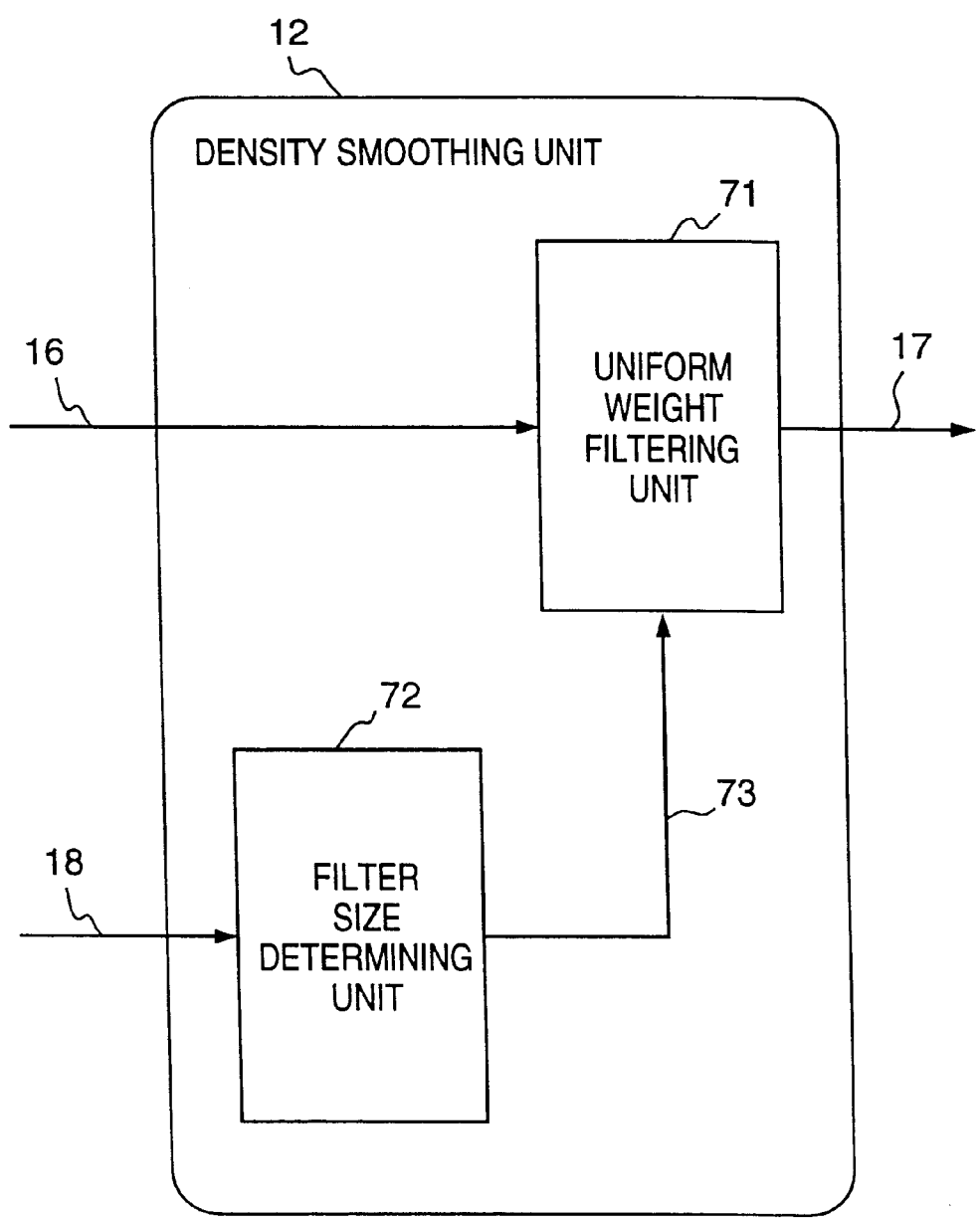
FIG. 8 is a block diagram showing the arrangement of a pixel value interpolation unit.

In the above arrangement, the uniform weight filtering unit 71 in FIG. 8 is designed to use a filter having a size determined by the filter size determining unit 72 in accordance with the magnification 18 set by the magnification setting unit 14. However, the uniform weight filtering unit 71 need not be designed in such a manner. That is, by repeatedly performing filtering processing a plurality of number of times using a small filter a basic filter, the same effect as that obtained by using the filter of the size determined by equation (3) can be obtained.

Assume that a magnification of ×5 is set in both the main scanning direction and the subscanning direction. In this case, the result obtained by performing filtering processing once using a 5×5 filter is approximately the same as that obtained by performing filtering processing twice using a 3×3 filter as a basic filter. That is, the working memory capacity can be reduced, and the filtering processing time can be shortened.

Figure 11:
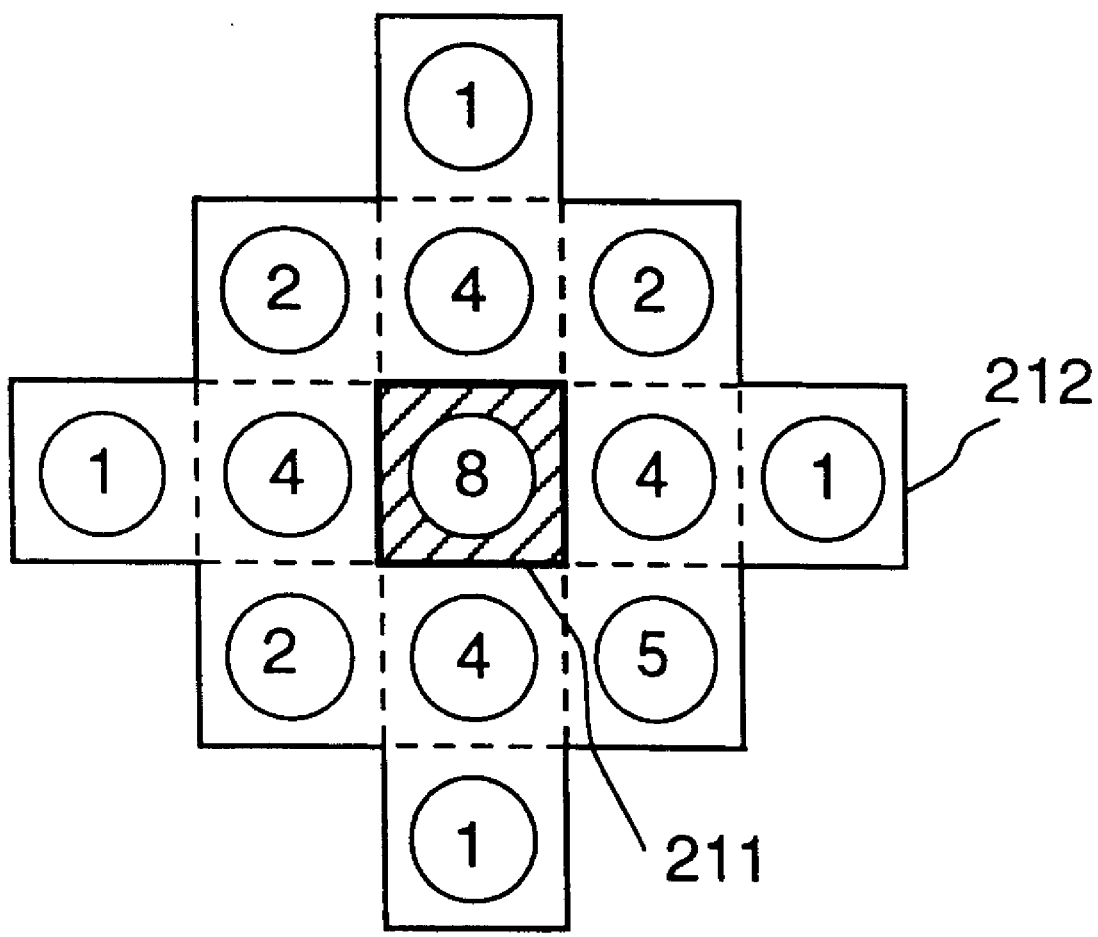
FIG. 11 is a view showing a filter unit in the third embodiment.

The uniform weight filtering unit in FIG. 8 is designed to use a square (rectangular) filter whose filtering factors are all set to "1". However, the filter is not limited to such an arrangement. As shown in FIG. 11, the uniform weight filtering unit may use a filter which is not square (rectangular) and in which the largest weighting factor is set for a target pixel 211, and smaller weighting factors are set as the distance from the target pixel increases. With such a filter, pixel value interpolation can be performed such that edge components in a multivalued image are retained more.

In this case, equation (2) is rewritten into $$D(x,y)=\Sigma kij \cdot F(i,j)/K$$

where kij is the weighting factor at a position (i,j) in the filter, and K=Σkij.

In the above apparatus, as indicated by the flowchart in FIG. 4, a binary image is generated and processed for each density level. However, such a procedure need not be used with respect to multivalued images with small numbers of gradations such as photographic images and multivalued document images. That is, instead of incrementing the variable Ilevel by "1" in step S44 in FIG. 4, the variable may be incremented by a value c larger than "1" to perform processing for every c gradation level. The processing in step S65 in FIG. 7 is changed to Ilevel=Ilevel+c, accordingly. As a result, the processing time required for multivalued image outline magnifying processing can be shortened.

More specifically, when, for example, the apparatus of this embodiment is to be applied to a copying machine, the machine may have a key for selecting an original image type between a document image and a photographic image, and a gradation interval c is set by the key. Alternatively, the gradation interval c may be arbitrarily set by a user.

As is apparent from the above description, the apparatus of this embodiment can be applied to various apparatuses as well as a copying machine.

In this embodiment, for example, each processing unit in FIG. 1 is realized by executing a corresponding program using the central processing unit. However, each processing unit may be constituted by an independent circuit.

Figure 12:
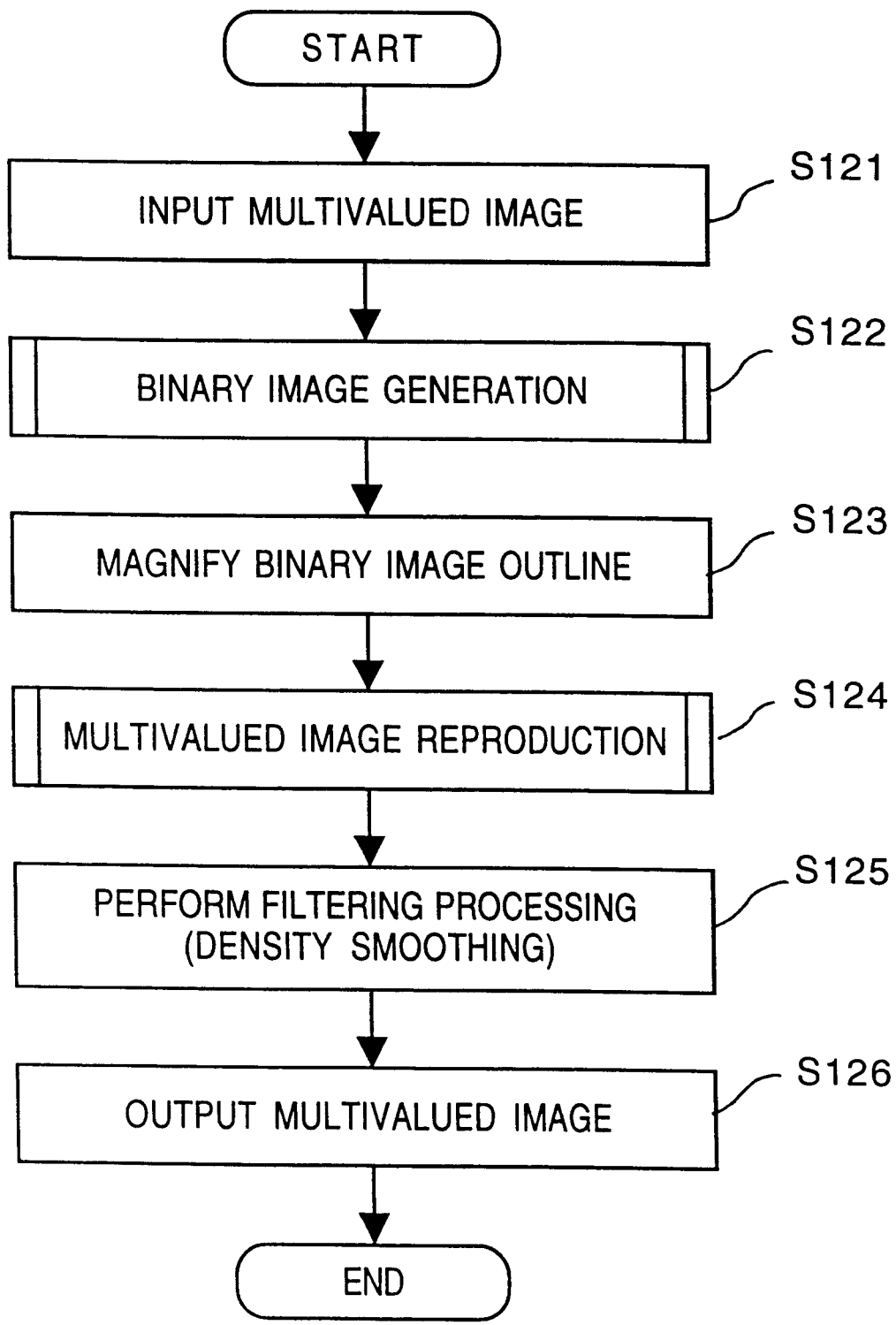
FIG. 12 is a flowchart showing programs for realizing the apparatuses of the first and second embodiments.

FIG. 12 is a flowchart showing programs executed by the central processing unit 26 in FIG. 2 to realize the arrangement shown in FIG. 1.

In multivalued image input step S121, the multivalued image input device 21 loads a multivalued image. In binary image generation step S122, a binary image corresponding to each density level of the multivalued image is generated in accordance with the procedure in FIG. 4.

In step S123, the binary image corresponding to each density level is magnified and smoothed in accordance with the procedure disclosed in Japanese Patent Laid-Open No. 5-174140.

In step S124, a multivalued image is reproduced on the basis of the binary images magnified and smoothed in step S123 in accordance with the procedure shown in FIG. 7.

In step S125, filtering processing is performed by using the filter in FIG. 9 according to equation (2) to smooth the densities.

Finally, in step S126, the multivalued image output device 22 outputs the reproduced image.

The programs are executed in the above manner to realize the image processing in this embodiment.

As described above, the image processing apparatus of this embodiment magnifies an image by performing proper magnifying processing for the contour shape of an input multivalued image, and performs pixel value interpolation for the magnified multivalued image, thereby obtaining a high-quality magnified image. That is, the apparatus includes the multivalued image outline magnifying unit for magnifying the contour shape of a multivalued image, and the density smoothing unit for performing pixel value interpolation for the multivalued image magnified by the multivalued image outline magnifying unit. With this arrangement, the apparatus can obtain a high-quality magnified multivalued image free from a deterioration in image quality such as a jagged pattern or lattice-like distortion.

Second Embodiment

Figure 13:
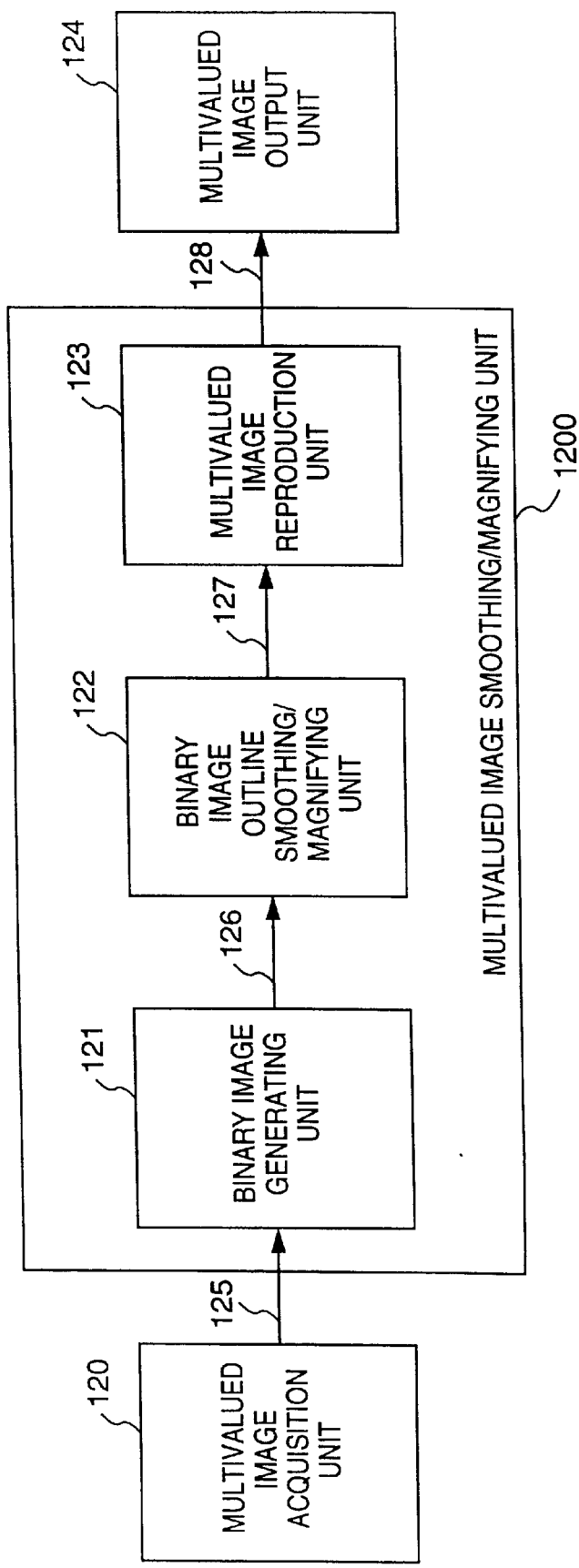
FIG. 13 is a block diagram showing the flow of outline smoothing/magnifying processing for a multivalued image according to the second embodiment.

The second embodiment of the present invention will be described below with reference to the accompanying drawings. FIG. 13 shows the flow of multivalued image outline smoothing/magnifying processing according to this embodiment. A multivalued image acquisition unit 120 acquires a digital multivalued image to be smoothed/magnified, and outputs the image as raster scanning type multivalued image data 125. A binary image generating unit 121 generates a raster scanning type binary image for each gradation of the raster scanning type multivalued image data 125, and outputs a binary image data group 126 as a set of such binary images. A binary image outline smoothing/magnifying unit 122 extracts outline vectors from the raster scanning type binary image data group 126, and performs smoothing/magnifying processing in the extracted outline vector data format. The binary image outline smoothing/magnifying unit 122 then reproduces binary images as raster scanning type binary image data from the smoothed/magnified outline data, and obtains magnified images, thereby outputting a magnified binary image group 127 as a set of magnified images corresponding to the respective density levels. A multivalued image reproduction unit 123 reproduces a magnified multivalued image 128 from the magnified binary image group 127. A multivalued image output unit 124 displays the obtained magnified image, generates a visual image, or transmits the image data to an external device via a communication path.

FIG. 2 shows an example of the hardware arrangement of this multivalued image outline smoothing/magnifying unit.

A multivalued image input from an image input device 21 or stored in an external memory unit 27 is loaded into a memory unit 23 (work memory) by a central processing unit 26, as needed. An operation contents display device 24 displays a designation (e.g., an instruction to start smoothing/magnifying processing) input through an operation input device 25. The central processing unit 26 recognizes the designation input through the operation input device 25, and executes the designated processing while properly accessing the memory unit 23 in accordance with the designation. The central processing unit 26 then outputs the processing result to an image output device 22 or stores it in the external memory unit 27.

The blocks shown in FIG. 13 may be program modules executed by the system in FIG. 2. Each module is stored in the external memory unit 27 and supplied to the system to be executed by the central processing unit 26.

Figure 14:
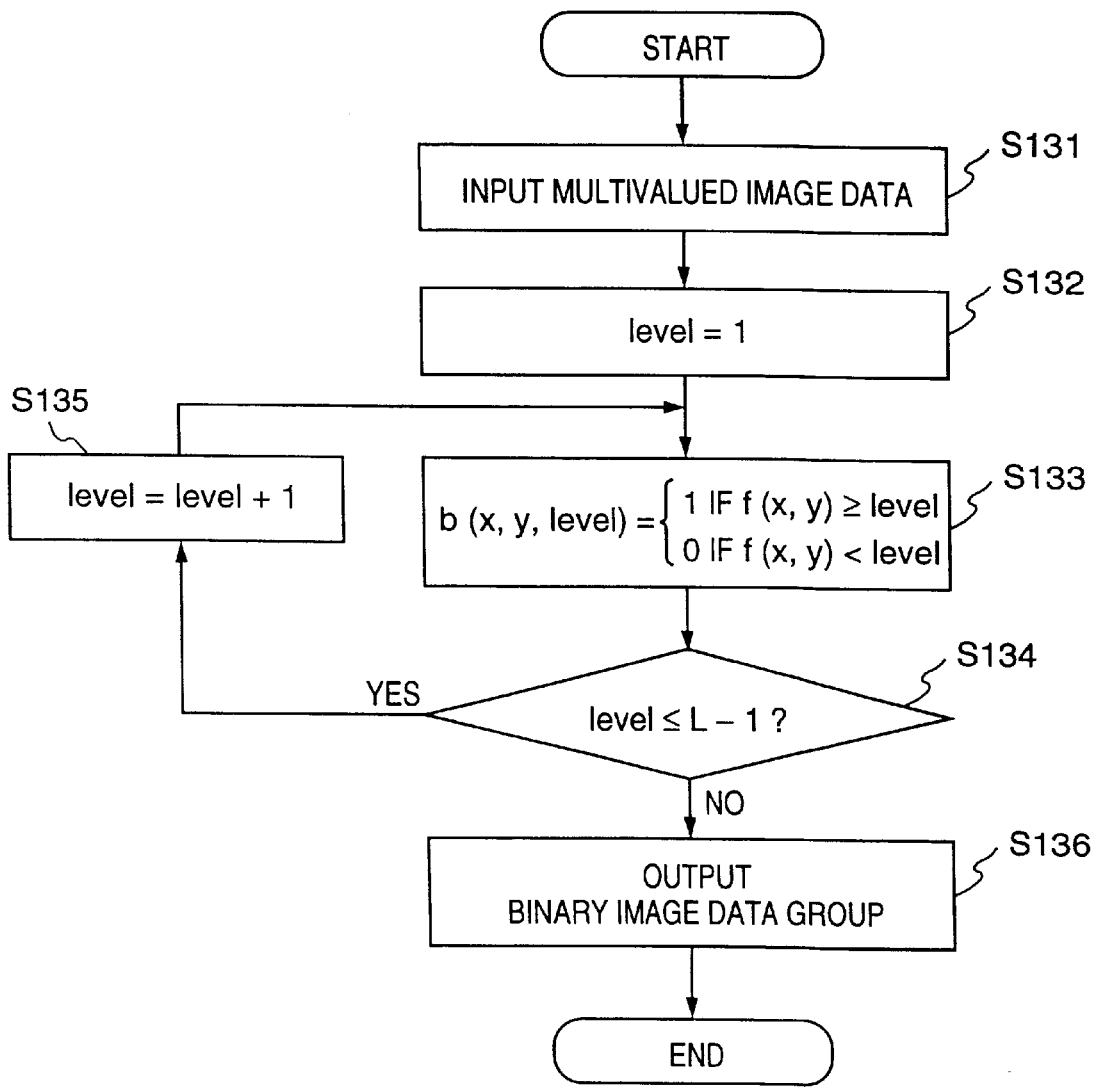
FIG. 14 is a flowchart showing the flow of processing in a binary image generating unit 121.

FIG. 14 is a flowchart showing the flow of processing in the binary image generating unit 121. The binary image generating unit 121 generates a binary image for each density level from the digital image data 125 input in the raster scanning form, and outputs the binary image data group 126.

In step S131, the multivalued image data 125 is input. In this case, the multivalued image represented by the multivalued image data 125 has a size n in the main scanning direction and a size m in the subscanning direction, and a pixel value at coordinates x and y in the main scanning and subscanning directions is defined as f(x,y). In addition, the number of gradation levels of the multivalued image is represented by L (e.g., number L of gradation levels=256 in the case of a multivalued image consisting of 8-bit pixels).

In step S132, a variable Ilevel representing a density level corresponding to a target image to be processed is initialized to "1". In step S133, a binary image b(x,y,Ilevel) (size n in the main scanning direction; size m in the subscanning direction) is generated such that if f(x,y)≧Ilevel, 1 (black pixel) is set, and if f(x,y)<Ilevel, 0 (white pixel) is set. In step S134, the value of Ilevel is checked. If Ilevel≦(L−1), the flow advances to step S135 to add "1" to Ilevel, and the flow returns to step S133. If Ilevel>(L−1), it is determined that generation of binary images corresponding to the all the density levels is completed, and the flow advances to step S136 to output the binary image data group 126.

Figure 15:
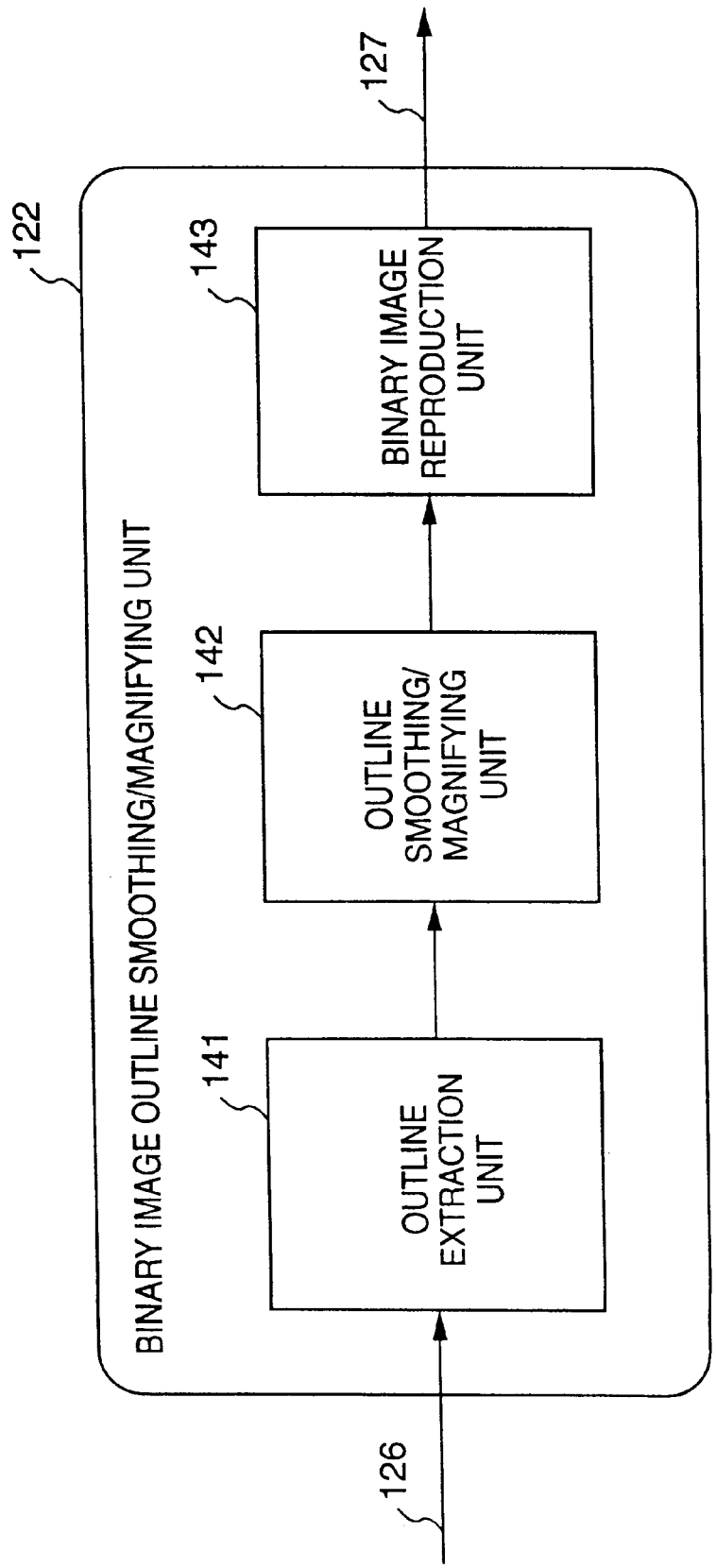
FIG. 15 is a block diagram showing the flow of processing in a binary image outline smoothing/magnifying unit 122.

FIG. 15 is a block diagram showing the flow of processing in the binary image outline smoothing/magnifying unit 122. For example, the binary image outline smoothing/magnifying unit 122 can be realized by using a technique associated with Japanese Patent Laid-Open No. 5-174140. The binary image outline smoothing/magnifying unit 122 comprises an outline extraction unit 141, an outline smoothing/magnifying unit 142, and a binary image reproduction unit 143. More specifically, the outline extraction unit 141 extracts outline vectors (coarse contour vectors) from the respective binary image data of the binary image data group 126 (given as b(x,y,Ilevel)) supplied from the binary image generating unit 121. The outline smoothing/magnifying unit 142 generates outline vectors which are smoothly magnified at a desired magnification in the state of the extracted outline vector expression. The binary image reproduction unit 143 reproduces binary images from these smoothly magnified outline vectors, thereby generating high-quality binary images magnified at the desired magnification. With this processing, the magnified binary image group 127 obtained by smoothing/magnifying the respective binary images of the binary image data group 126 given as b(x,y,Ilevel) by the binary image generating unit 121 is output. Note that b(x,y,Ilevel) after smoothing/magnifying processing is expressed as B(X,Y,Ilevel) (a size N in the main scanning direction; a size M in the subscanning direction).

Figure 16:
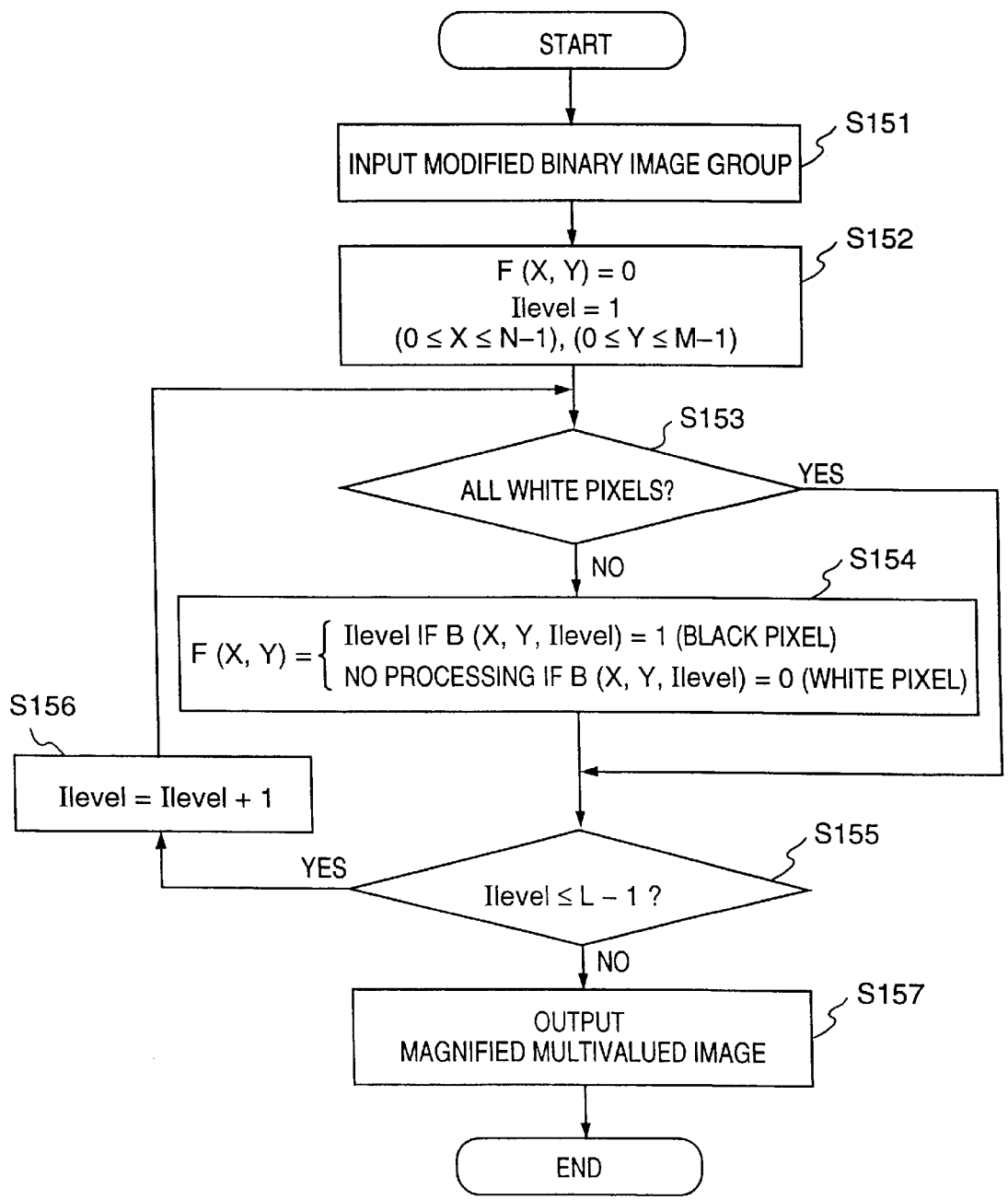
FIG. 16 is a flowchart showing the flow of processing in a multivalued image reproduction unit 123.

FIG. 16 is a flowchart showing the flow of processing in the multivalued image output unit 124. With this processing, a magnified multivalued image F (the size N in the main scanning direction; the size M in the subscanning direction) is reproduced by using a magnified binary image group B(X,Y,Ilevel).

In step S151, the magnified binary image group 127 given as B(X,Y,Ilevel) is loaded. In step S152, the magnified multivalued image F(x,y) is initialized to "0"; and a variable Ilevel representing a density level, to "1". In step S153, it is checked whether all the pixels of the magnified binary image group B(X,Y,Ilevel) are white pixels, i.e., there is no pixel whose density is equal to Ilevel. If it is determined that all the pixels are white pixels, the flow advances to step S155. If there is a black pixel, since it indicates that there is a pixel whose density is equal to Ilevel, the flow advances to step S154. In step S154, if B(X,Y,Ilevel)=1 (black pixel), the value of Ilevel is set as a pixel value F(X,Y) of the magnified multivalued image. If B(X,Y,Ilevel)=0 (white pixel), no processing is performed (the pixel value F(X,Y) remains the same). In step S155, the value of Ilevel is checked. If the value of Ilevel is (L−1) or less, i.e., if processing for all the density levels is not completed, the flow advances to step S156 to add "1" to Ilevel, and the flow returns to step S153 to repeat the above processing. If processing for all the density levels is completed, the flow advances to step S157 to output the magnified multivalued image 128 given as F(X,Y).

In this embodiment, in generating binary images from a multivalued image or reproducing a multivalued image from binary images, a variable (Ilevel) corresponding to each density level is used as a reference value. However, another reference value may be used.

As described above, a multivalued image is separated into binary images corresponding to the respective density levels, and outline vectors are extracted from the respective binary images. Thereafter, smoothing/magnifying processing is performed, and a multivalued image is reproduced from the processed binary images. With this processing, a magnified multivalued image can be obtained, in which a jagged pattern or lattice-like distortion at each contour portion during a multivalued image magnifying operation is suppressed.

In addition, in this embodiment, the presence of a pixel is checked for each density level. If there is no pixel corresponding to a given density level, the corresponding processing is skipped. The speed of reproduction processing for a multivalued image can therefore be increased.

Modification of Second Embodiment

In the second embodiment, binary images corresponding to all density levels are generated, and outline vector extraction, smoothing/magnifying, and multivalued image reproduction are performed. However, such a procedure need not be used with respect to a multivalued image having a small number of gradation levels, e.g., a multivalued document image. That is, "Ilevel=Ilevel+1" in step S135 (the binary image generation processing in FIG. 14) may be changed to "Ilevel=Ilevel+c (c is an arbitrary gradation interval)" to execute processing for every c gradation level. In this case, as is apparent, the processing in step S156 (the multivalued image reproduction processing in FIG. 5) is also changed to Ilevel=Ilevel+c.

If the gradation levels of an input multivalued image concentrate in a predetermined gradation range, processing may be performed with respect to only this range. If, for example, the gradation levels of pixels constituting an input image concentrate in the range of the 50th level to the 100th level, even though the input image has 256 gradation levels (0th to 255th levels), processing may be performed with respect to only the range of the 50th level to the 100th level.

As described above, if an input image is a multivalued image having a small number of gradation levels, or a deterioration in image quality is allowed, the time required for smoothing/magnifying processing can be shortened by thinning out gradation levels to be processed.

In this embodiment, the binary image generating unit 121 generates binary images corresponding to all density levels, and the binary image outline smoothing/magnifying unit 122 performs binary outline magnifying processing for all the binary images. The multivalued image reproduction unit 123 then reproduces a magnified multivalued image. In this case, however, since all data must be temporarily stored in the memory unit 23 or the external memory unit 27 for each processing, a large storage capacity is required.

In this modification, the above procedure is changed as follows to solve this problem. Binary image generation processing, outline smoothing/magnifying processing, and multivalued image reproduction processing are performed for each density level, and a multivalued image corresponding to each density level is reproduced. This series of operations is repeatedly executed for all the density levels (for example, it is checked, after multivalued image reproduction processing, whether processing for all the density levels is completed, and the series of operations is repeated from binary image generating processing if NO is obtained in this determination step) to reproduce a complete multivalued image. With this procedure, the capacity of the memory unit which is required for the above processing can be reduced to a capacity corresponding to a binary image corresponding to one gradation level.

The apparatus (FIG. 13) of the second embodiment can be realized by executing programs based on the procedure in FIG. 12 in the first embodiment using the central processing unit 26 with the arrangement in FIG. 2. However, this embodiment is different from the first embodiment in that processing based on the procedure in FIG. 14 is performed as the processing in step S122, and processing based on the procedure in FIG. 16 is performed as the processing in step S124.

Third Embodiment

In this embodiment, an input multivalued image is separated into an image to be subjected to outline smoothing/magnifying processing and an image to be subjected to magnifying processing based on pixel value interpolation, and magnified images having undergone the two types of magnifying processing are combined.

Figure 17:
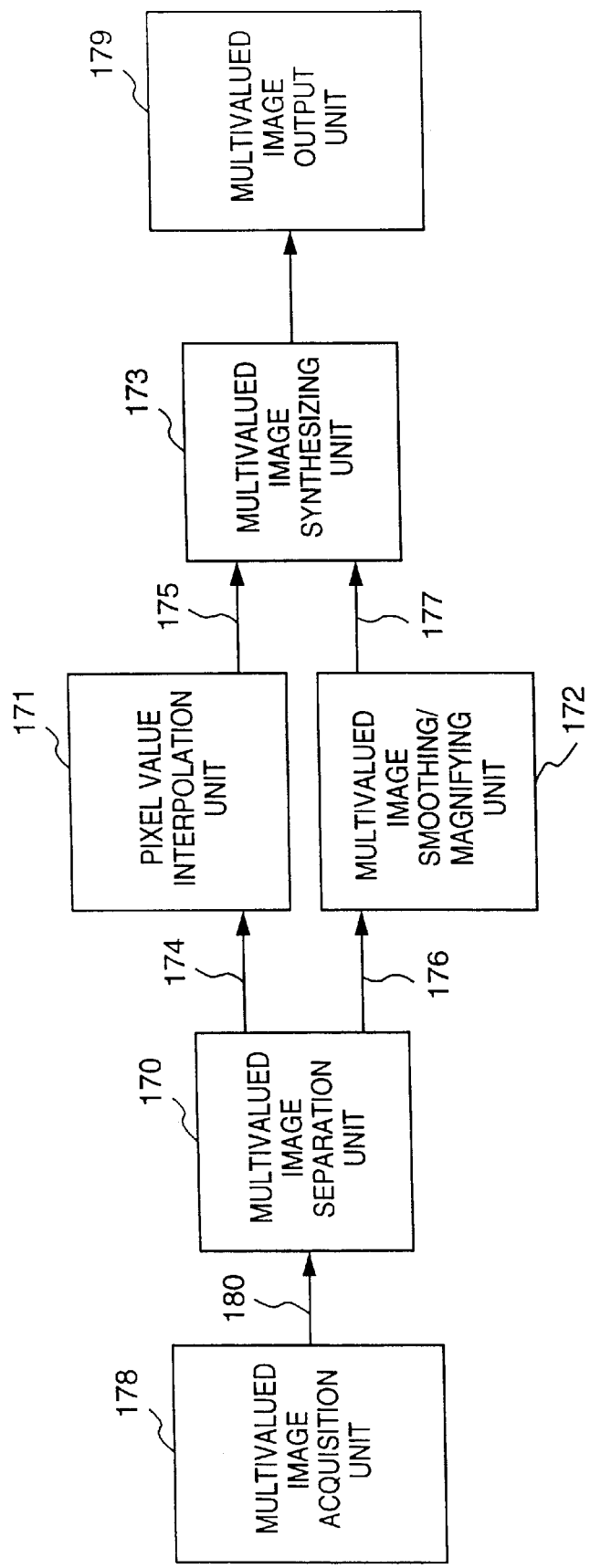
FIG. 17 is a block diagram showing the flow of multivalued image outline smoothing/magnifying processing according to the third embodiment.

FIG. 17 shows the flow of outline smoothing/magnifying processing for a multivalued image according to this embodiment. Referring to FIG. 17, a multivalued image acquisition unit 178 and a multivalued image output unit 179 respectively have the same functions as those of the multivalued image acquisition unit 120 and the multivalued image output unit 124 in the second embodiment. A multivalued image outline smoothing/magnifying unit 172 has the same function as the multivalued image acquisition unit 120 in the second embodiment. A pixel value interpolation unit 171 performs magnifying processing while interpolating a pixel value. A multivalued image separation unit 170 separates an input image to be magnified into multivalued images 174 and 176, and outputs them, as will be described later. A multivalued image synthesizing unit 173 synthesizes a magnified multivalued image 715 interpolated and magnified by the pixel value interpolation unit 171 and a magnified multivalued image magnified by the multivalued image outline smoothing/magnifying unit 172 to obtain a final magnified multivalued image.

Figure 18:
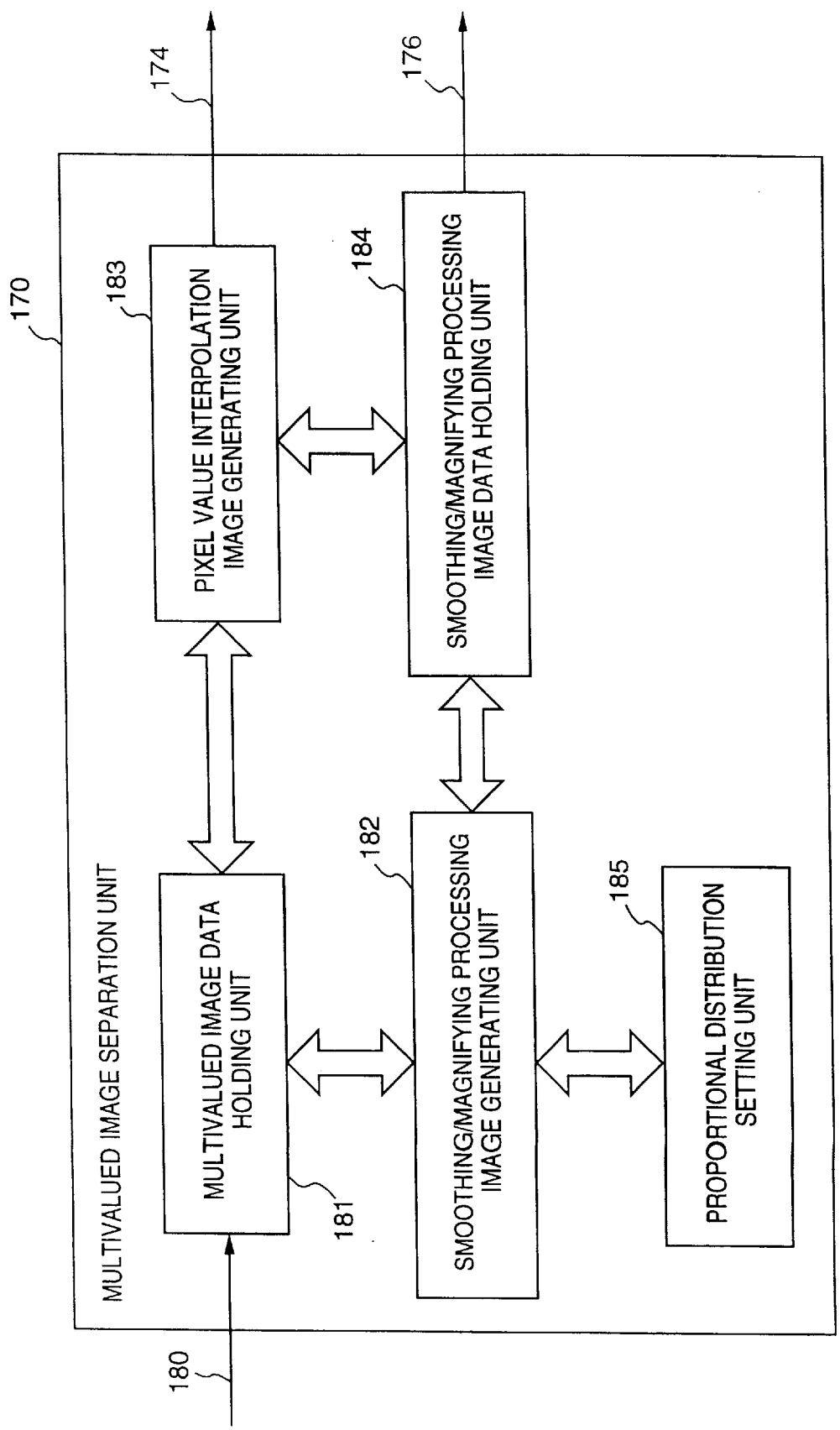
FIG. 18 is a block diagram showing an example of the arrangement of a multivalued image separation unit 170.

FIG. 18 is a block diagram showing an example of the arrangement of the multivalued image separation unit 170. A multivalued image data holding unit 181 temporarily holds multivalued image data supplied from the multivalued image acquisition unit 178. A smoothing/magnifying processing image generating unit 182 generates a multivalued image, which is to be supplied to the multivalued image outline magnifying unit 172 for executing outline smoothing/magnifying processing for a multivalued image, while referring to the data stored in the multivalued image data holding unit 181, and stores the resultant data in a smoothing/magnifying processing image data holding unit 184. A proportional distribution setting unit 185 sets a condition for separation of a multivalued image. A pixel value interpolation image generating unit 183 generates a pixel value interpolation image to be supplied to the pixel value interpolation unit 171 by referring to the data stored in the multivalued image data holding unit 181 and the smoothing/magnifying processing image data holding unit 184.

The smoothing/magnifying processing image generating unit 182 generates a smoothing/magnifying processing image f1(x,y) from input data f(x,y) (a size n in the main scanning direction; a size m in the subscanning direction) held in the multivalued image data holding unit 181 by referring to a variable s representing a proportional distribution ratio set by the proportional distribution setting unit 185 according to equation (4):

$$f1(x,y)=f(x,y)>>s \quad (4)$$

$$(0 \leq x \leq n-1, \ 0 \leq y \leq m-1)$$

where >> s represents a logical operation of shifting pixels to the right by s bits.

When an input multivalued image consists of S-bit pixels, the proportional distribution setting unit 185 sets a value s which does not exceed S. The smoothing/magnifying processing image data generated by the smoothing/magnifying processing image generating unit 182 is temporarily held in the smoothing/magnifying processing image data holding unit 184. An image f1 is an image expressed by dividing the number of gradation levels of an image f by $2^s$. If, for example, S=8 and s=4, the image f has 256 gradation levels. The number of gradation levels is divided by $2^4$=16, and hence the image f1 is expressed in 16 gradation levels.

The pixel value interpolation image generating unit 183 generates pixel value interpolation multivalued image data f2 by referring to the input image data f(x,y) held in the multivalued image data holding unit 181 and the smoothing/magnifying processing image data f1(x,y) held in the smoothing/magnifying processing image data holding unit 184 according to equation (5):

$$f2(x,y)=f(x,y)-f1(x,y) \quad (5)$$

$$(0 \leq x \leq n-1, \ 0 \leq y \leq m-1)$$

The smoothing/magnifying processing image data f1(x,y) and the pixel value interpolation image data f2(x,y) are used as input images to the multivalued image outline magnifying unit 172 and the pixel value interpolation unit 171.

As is apparent, separation of an input image is not limited to the above method, but may be performed by performing other arithmetic operations and the like.

The pixel value interpolation unit 171 receives pixel value interpolation image data 174 from the multivalued image separation unit 170, and performs magnifying processing at a desired magnification (the same magnification as that set for the multivalued image smoothing/magnifying unit 172), thereby outputting a pixel value interpolation image 175. Pixel value interpolation is basically a method of interpolating pixel values between the pixels of a sampled input multivalued image by using adjacent pixel values. Such methods include, for example, a method of performing interpolation by using a bilinear function and a method of performing interpolation by approximating a sampling function with a cubic expression, as described in Tamura, "Introduction to Computer Image Processing" Souken Shuppan.

The multivalued image smoothing/magnifying unit 172 magnifies multivalued image smoothing/magnifying processing image data 176 supplied from the multivalued image separation unit 170 at a desired magnification (the same magnification as that set for the pixel value interpolation unit 171). As described above, the multivalued image smoothing/magnifying unit 172 comprises units equivalent to the binary image generating unit 121, the binary image outline smoothing/magnifying unit 122, and the multivalued image reproduction unit 123 in the second embodiment. The multivalued image smoothing/magnifying unit 172 performs predetermined processing for the multivalued image smoothing/magnifying processing image data 176 and outputs a smoothed/magnified image 177.

That is, the multivalued image smoothing/magnifying unit 172 performs the same processing as that in the second embodiment with respect to a smoothed/magnified image obtained by dividing the number of gradation levels of the original image f by $2^s$.

The pixel value interpolation unit 171 performs density interpolation for the image f2 obtained by subtracting the value used as the smoothing/magnifying processing image from the original image f. Since the image f2 is given by f–f1, it considerably retains the characteristics of the original image. For this reason, the interpolated image is almost faithful to the original image even though the density of a high-density portion of the original image is decreased by an amount corresponding to the image f1.

Similar to the first embodiment, each unit in the block diagrams in FIGS. 16 and 17 is realized by executing a corresponding program stored in the memory unit 23 or the external memory unit 27 using the central processing unit 26 in FIG. 2. In this case, the multivalued image acquisition unit, the pixel value interpolation unit, the multivalued smoothing/magnifying unit, and the multivalued image output unit are the same as those in the first embodiment.

Each block in FIGS. 16 and 17 may be a program module executed by the central processing unit 26 in FIG. 2. In this case, each module is stored in the external memory unit 27 and supplied to the system.

The multivalued image synthesizing unit 173 adds the pixel value interpolation image 175 and the smoothing/magnifying processing image 177 to reproduce a magnified image. Since f=f1+f2 according to equation (5), the reproduced image is faithful to an input image 180.

As described above, an input multivalued image is separated, and the separated images are respectively supplied to the pixel value interpolation unit 171 and the multivalued image smoothing/magnifying unit 172. After the images are magnified by different methods, the magnified images are synthesized. With this processing, even if an image is enlarged at a high magnification, the contour portions are not excessively emphasized. In addition, in the resultant magnified image, a jagged pattern or lattice-like distortion is suppressed, which becomes conspicuous when magnifying processing based on pixel value interpolation is performed. This output result becomes an intermediate magnified image between a magnified image obtained by performing only outline smoothing/magnifying processing associated with the second embodiment and a magnified image obtained by performing only pixel value interpolation.

In addition, since the number of gradation levels of an image to be smoothed/magnified decreases to $\frac{1}{2^s}$, the amount of smoothing/magnifying processing also decreases to $\frac{1}{2^s}$ that in the first and second embodiments.

The processing time can therefore be shortened, as compared with the first embodiment, by changing the distribution ratio.

Figure 19:
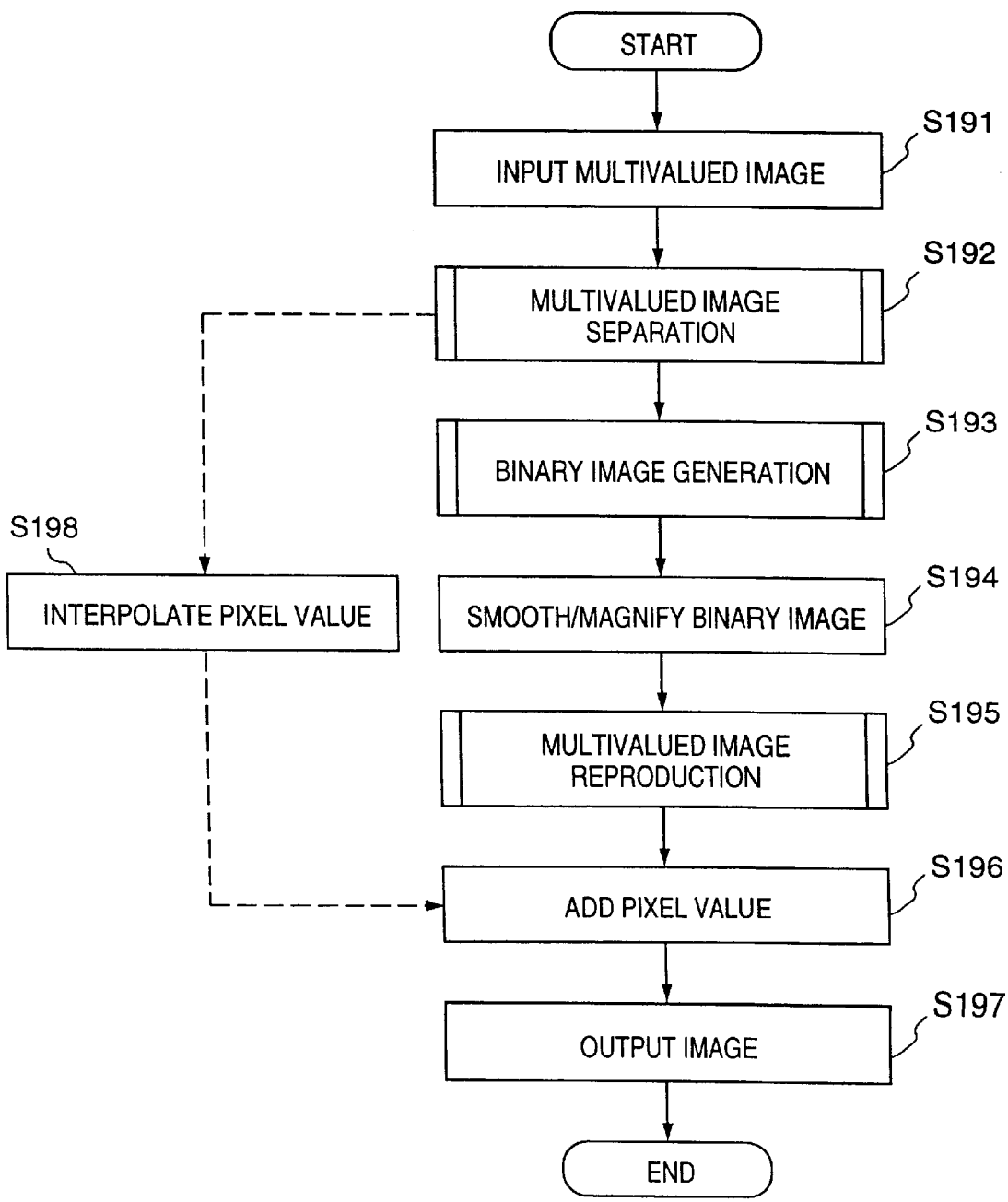
FIG. 19 is a flowchart showing programs for realizing the apparatus of the third embodiment.
Figure 20:
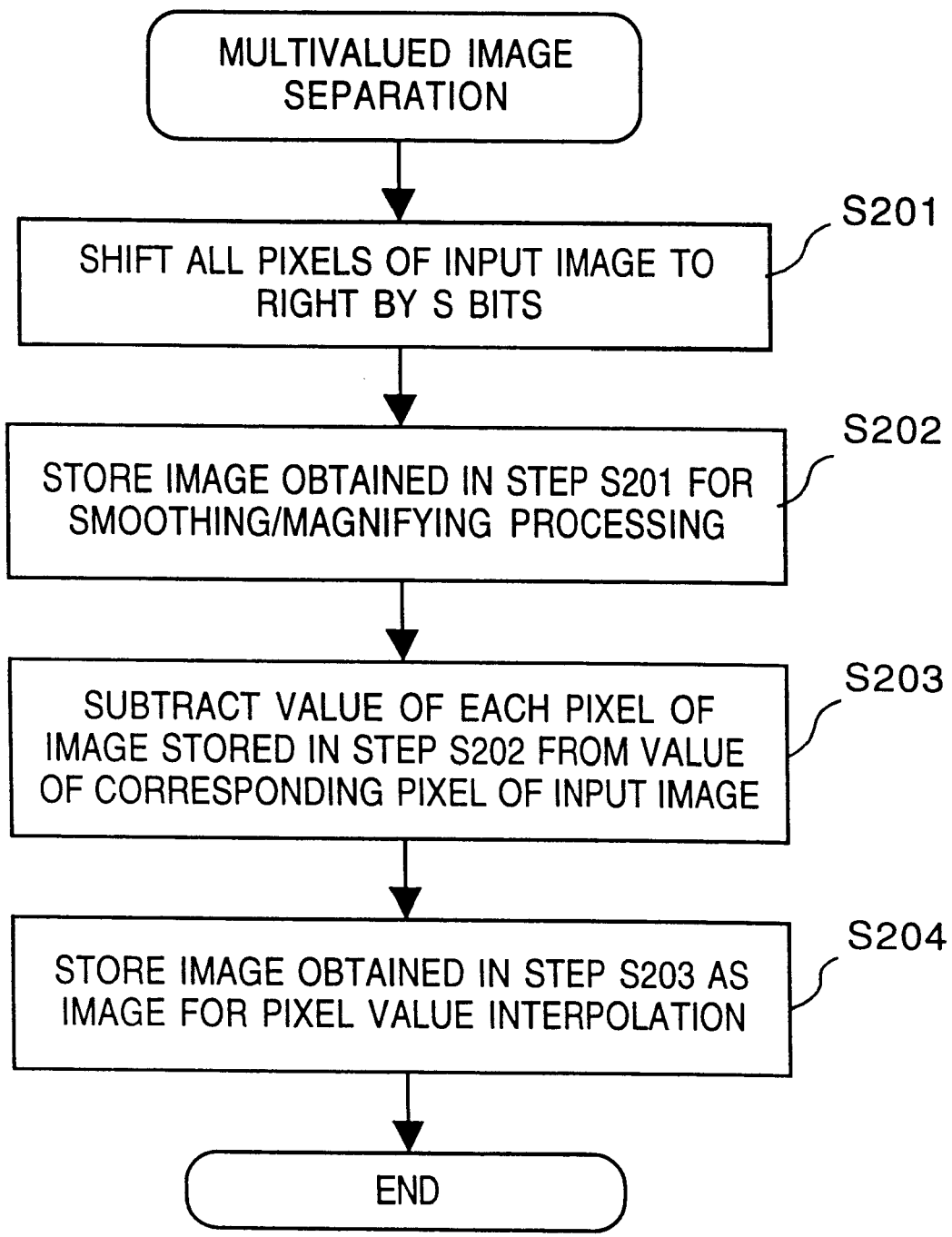
FIG. 20 is a flowchart showing the image separation step in the flowchart in FIG. 19.

FIGS. 19 and 20 are flowcharts showing programs executed by the central processing unit 26 in the system shown in FIG. 2 to realize the arrangement of the third embodiment.

In step S191, a multivalued image is input. In step S192, the image is separated into two images, as described above. The processing in steps S193 to S195 is the same as that in steps S122 to S124 in FIG. 12 in the second embodiment. Note that the image to be processed is the image obtained in steps S201 and S202 in the procedure shown in FIG. 20.

The processing in step S198 is the same as that in step S125 in FIG. 12. Note that the image to be processed is the image obtained in steps S203 and S204 in FIG. 20.

Once the image is separated into images, the processing in steps S193 to S195 and the processing in step S198 need not be performed in a predetermined order. That is, step S198 may be interposed between steps S192 and S193 or between steps S195 and S196. Alternatively, these steps may be executed in parallel.

In step S197, pixels corresponding to the two images obtained in this manner are added together.

With this processing, the apparatus in FIG. 13 can be realized.

According to this embodiment, a high-quality magnified multivalued image can be obtained, in which a deterioration in image quality such as a jagged pattern distortion, a moire pattern, or a lattice-like distortion is suppressed.

Fourth Embodiment

Figure 21:
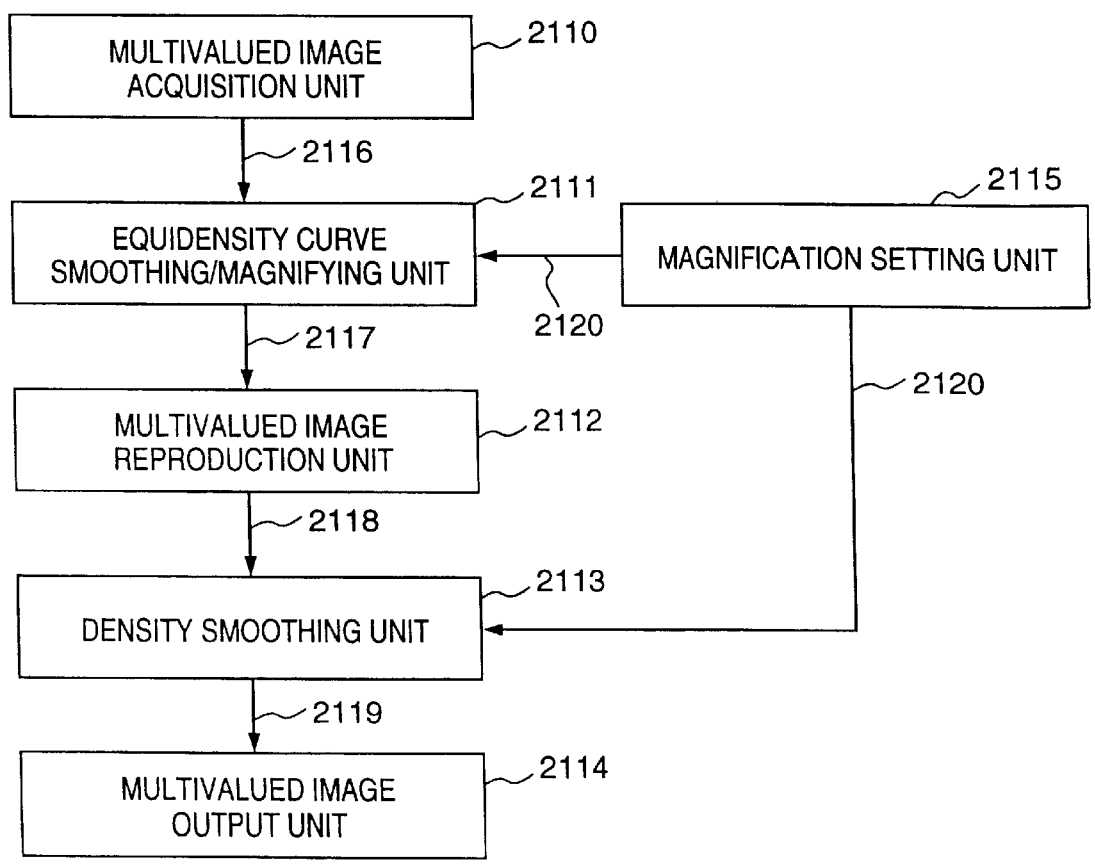
FIG. 21 is a block diagram showing the arrangement of the fourth embodiment.

FIG. 21 is a view best representing the arrangement of this embodiment. A multivalued image acquisition unit 2110 acquires a digital multivalued image to be subjected to magnifying processing, and outputs a raster scanning type multivalued image. An equidensity curve smoothing/magnifying unit 2111 receives a magnification 2120 set by a magnification setting unit 2115 and raster scanning type multivalued image data output from the multivalued image acquisition unit 2110, and performs smoothing/magnifying processing for equidensity-curve-like outline vector data (to be referred to as equidensity curve vector data hereinafter) of the multivalued image data 2116. A multivalued image reproduction unit 2112 receives equidensity curve vector data 2117 smoothed/magnified by the equidensity curve smoothing/magnifying unit 2111, and reproduces a raster scanning type magnified multivalued image 2118 from the equidensity curve vector data at a high speed. A density smoothing unit 2113 receives the raster scanning type multivalued image data 2118 reproduced by the multivalued image reproduction unit 2112 and the magnification 2120 set by the magnification setting unit 2115, and performs density smoothing processing for the magnified multivalued image data 2118. A multivalued image output unit 2114 displays the obtained multivalued image, produces a hard copy, or outputs the data to a communication path or the like.

FIG. 2 is a schematic view showing the hardware arrangement of the image processing system of this embodiment. The respective units are the same as those in the first embodiment.

Equidensity Curve Smoothing/Magnifying Processing

Figure 22:
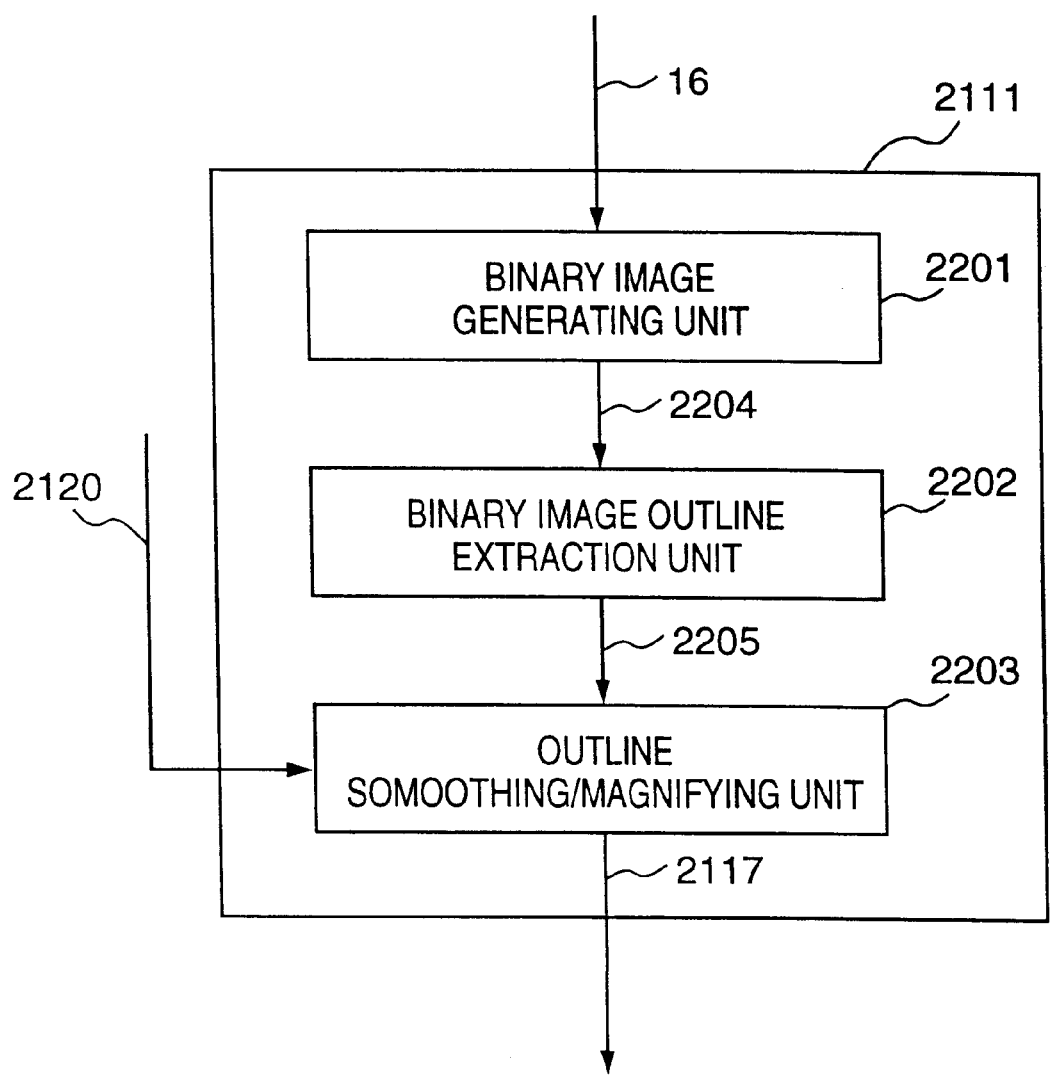
FIG. 22 is a block diagram showing the arrangement of an equidensity curve outline smoothing/magnifying unit in the fourth embodiment.

FIG. 22 shows the detailed arrangement of the equidensity curve smoothing/magnifying unit 2111 in FIG. 21. A binary image generating unit 2201 generates raster scanning type binary image data group 2204 corresponding to the respective density levels from the multivalued image data 2116 output from the multivalued image acquisition unit 2110 in FIG. 21. A binary image outline extraction unit 2202 extracts vector data in the contour form from the whole raster scanning type binary image data group 2204 generated by the binary image generating unit 2201, and generates a binary image outline vector data group 2205. An outline smoothing/magnifying unit 2203 receives the binary image outline vector data group 2205 extracted by the binary image outline extraction unit 2202 and the magnification 2120 set by the magnification setting unit 2115 in FIG. 21, and performs smoothing/magnifying processing for the binary image outline vector data group 2205 in the vector data form, thereby outputting a smoothed/modified binary image outline vector data group 2117. As described above, in the equidensity curve smoothing/magnifying unit 2111, a binary image is generated for each gradation level, the contour shapes of the respective images are extracted, and the extracted outline vectors are smoothed/magnified. This processing is equivalent to extracting equidensity curve vector data from a multivalued image, and smoothing/magnifying the extracted data.

Figure 23:
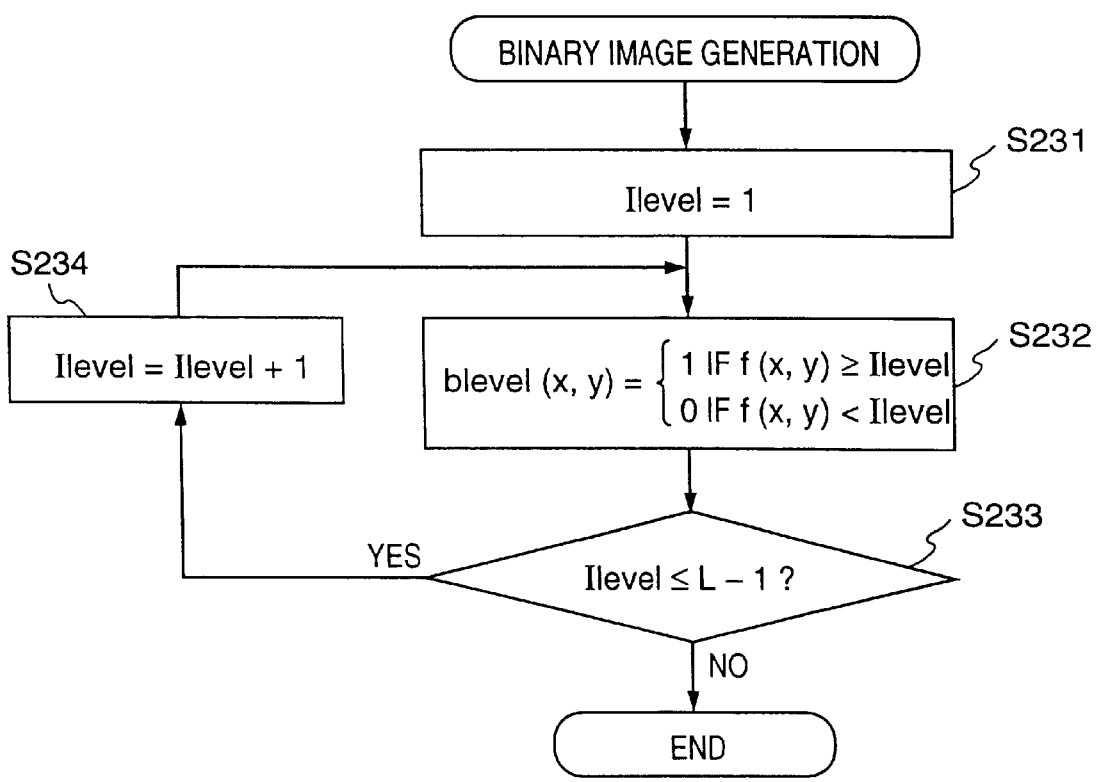
FIG. 23 is a flowchart showing processing in a binary image generating unit.

FIG. 23 shows the flow of processing in the binary image generating unit 2201. A binary image is generated for each density level with respect to digital multivalued image data 2116 input in the raster scanning form in accordance with the flow of processing in FIG. 23. Let f be the input multivalued image (a size n in the main scanning direction; a size m in the subscanning direction), f(x,y) be the pixel value at coordinates x and y in the main scanning and subscanning directions, and L be the number of gradation of the multivalued image (number L of gradations levels=256 in the case of a multivalued image consisting of 8-bit pixels).

In step S231, a variable Ilevel for expressing the current density level is initialized to "1". In step S232, a binary image blevel (the size n in the main scanning direction; the size m in the subscanning direction) is generated such that 1 (black pixel) is set if f(x,y)≧Ilevel, and 0 (white pixel) is set if f(x,y)<Ilevel. If it is determined in step S233 that the variable Ilevel is equal to or lower than (L−1), the flow advances to step S234 to add "1" to the variable Ilevel. The flow then returns to step S232. If the variable Ilevel is larger than (L−1), this processing is terminated. The binary image group 2204 corresponding to the respective density levels in FIG. 22 is output in accordance with this flow of processing.

The binary image outline extraction unit 2202 and the outline smoothing/magnifying unit 2203 in FIG. 22 can be constituted by the device disclosed in Japanese Patent Laid-Open No. 5-174140 filed by the assignee of the present application. More specifically, the binary image outline extraction unit 2202 receives the binary image group 2204 generated by the binary image generating unit 2201, and extracts a binary image outline vector data group (coarse contour vectors), i.e., the equidensity curve vector data 2205 of the multivalued image. The outline smoothing/magnifying unit 2203 then generates the extracted equidensity curve vector data 2205 into outline vectors which are smoothly magnified at a desired (arbitrary) magnification designated by a magnification signal 2120 in the form of the outline vector data expression, thereby outputting the smoothed/magnified equidensity curve vector data 2206.

Multivalued Image Reproduction

Figure 24:
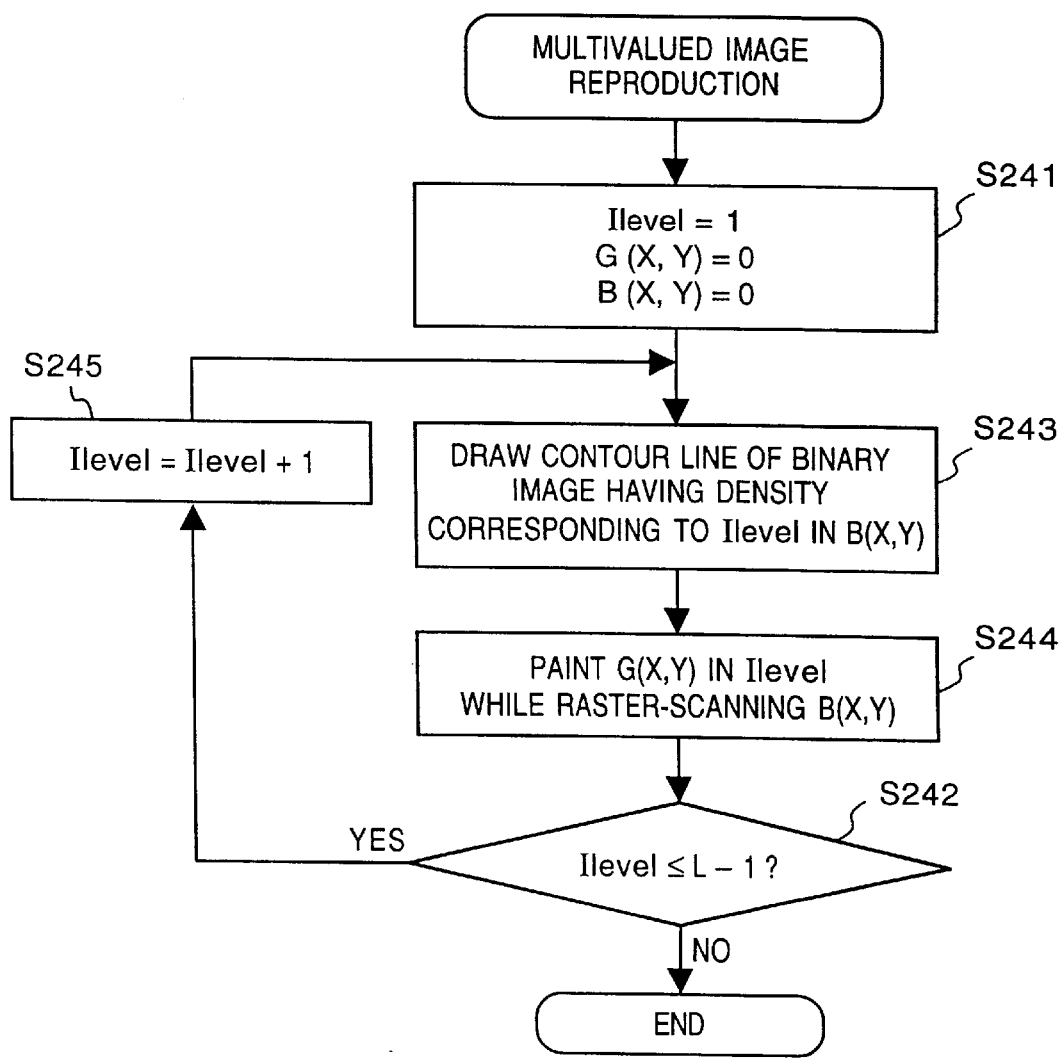
FIG. 24 is a flowchart showing processing in a multivalued image reproduction unit.

The multivalued image reproduction unit 2112 in FIG. 21 will be described next. This unit can be constituted by, e.g., the device disclosed in Japanese Patent Laid-Open No. 5-20467 filed by the assignee of the present application. FIG. 24 shows the flow of this processing.

In step S241, the variable Ilevel representing the current gradation is set to "1", and a binary image buffer B and a multivalued image buffer G (a size X in the main scanning direction; a size Y in the subscanning direction) are initialized. In step S243, an equidensity curve corresponding to a gradation Ilevel, i.e., a binary image contour having the density Ilevel, in the binary image buffer B. In step S244, a multivalued image is sequentially reproduced by using the drawn equidensity curve. More specifically, the binary image buffer B is raster-scanned. When the scanning line intersects the equidensity curve drawn in the buffer B an odd number of times, painting in the multivalued image buffer G is started from a pixel having the same coordinates as those of the intersection, in the gradation given by the variable Ilevel. Painting in the multivalued image buffer G is performed in the same order as the scanning order in the binary image buffer B. When the scanning line intersects the equidensity curve an even number of times, painting in the multivalued image buffer G is stopped at the coordinates of the intersection. If this processing is performed with respect to L binary images, the original multivalued image is reproduced in the multivalued image buffer G.

When the binary image buffer B is raster-scanned, pixels (black pixels) intersecting the equidensity curve are changed into white pixels. In this operation, the binary image buffer is initialized while being raster-scanned. That is, the binary image buffer B need not be initialized every time processing for a given density level is performed.

Figure 25B:
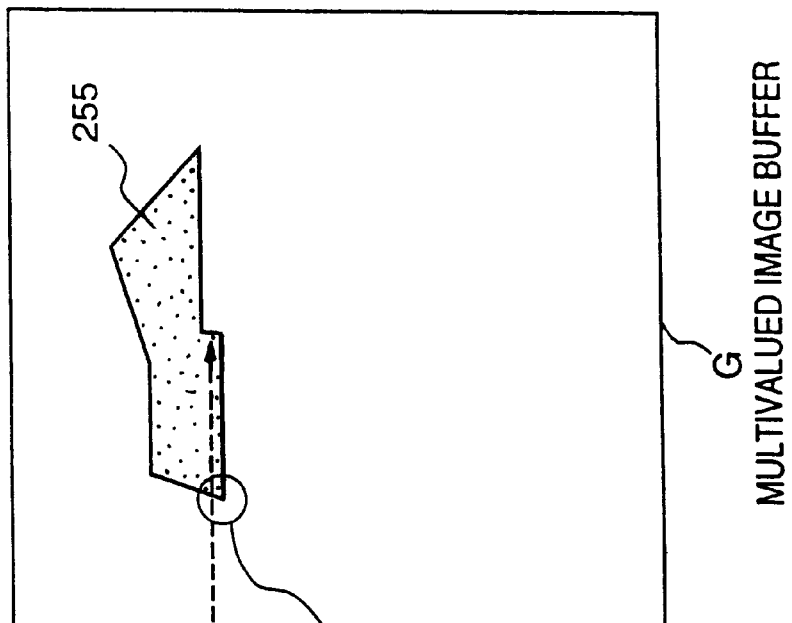
FIG. 25 is a schematic view showing the principle of processing in the multivalued image reproduction unit.
Figure 25A:
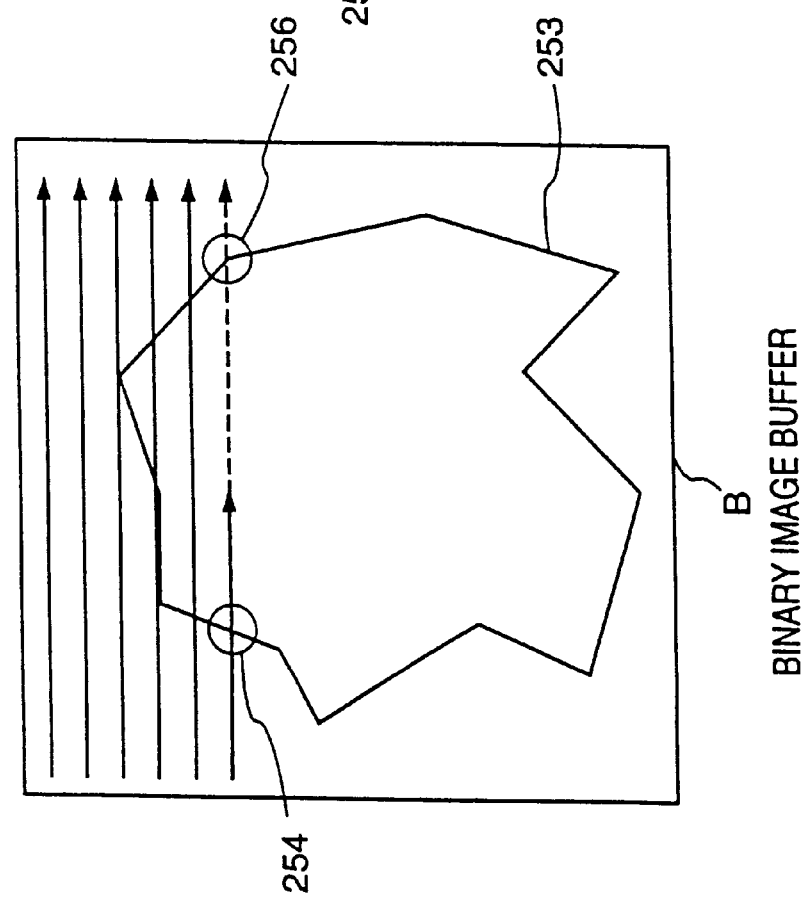

FIG. 25 shows the principle of this operation. First of all, an equidensity curve 253 is drawn in the binary image buffer B. Raster scanning in the binary image buffer B is then started. When the scanning line intersects the contour for the first time (an odd number of times) (at a pixel 254), painting in the multivalued image buffer G is started from the same coordinates as those in the binary image buffer B. When the scanning line intersects the contour an even number of times, i.e., for the next time (at a pixel 256), painting is terminated.

As described above, only an equidensity curve corresponding to a given gradation level is drawn into a binary image, and a multivalued image is reproduced by using this image. Therefore, a multivalued image can be reproduced at a higher speed than when a multivalued image is reproduced after the entire area enclosed with an equidensity curve drawn into a binary image is painted.

Density Smoothing

Figure 26:
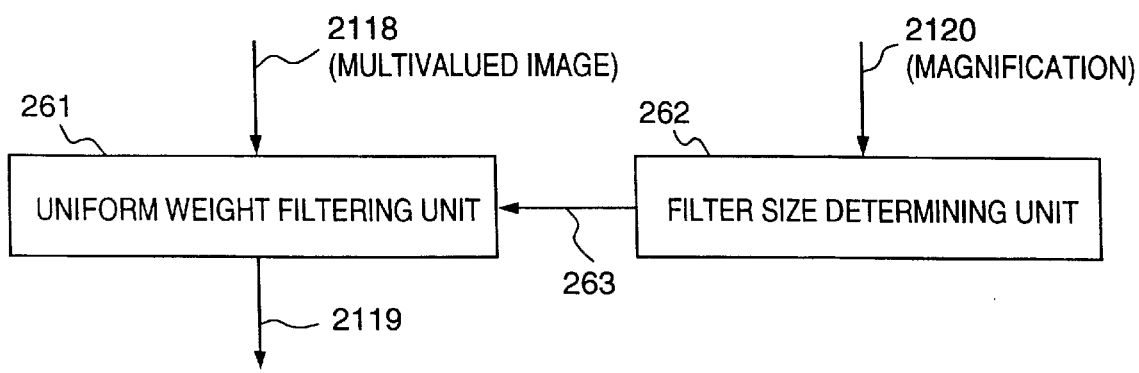
FIG. 26 is a block diagram showing the arrangement of a density smoothing unit.

FIG. 26 shows the arrangement of the density smoothing unit 2113 in FIG. 21. The density smoothing unit 2113 comprises a uniform weight filtering unit 261 and a filter size determining unit 262. The filter size determining unit 262 receives the magnification 2120 obtained from the magnification setting unit 2115 in FIG. 21, and outputs a filter size 263. The uniform weight filtering unit 261 receives the output 2118 from the multivalued image reproduction unit 2112 in FIG. 21 and the filter size 263 output from the filter size determining unit 262, and outputs a multivalued image 2119 which has finally undergone density smoothing processing. The uniform weight filtering unit 261 is a known technique described in, e.g., Tamura, "Introduction to Computer Image Processing" Souken Shuppan, and generally used to remove noise. This processing is the same as in the first embodiment and performed by using the filter in FIG. 9.

The filter size determining unit 262 can determine the size of a filter used by the uniform weight filtering unit 261 on the basis of the magnification 2120 set by the magnification setting unit 2115 in FIG. 21. Letting G be the magnification in the main scanning direction, H be the magnification in the subscanning direction, g be the size of a rectangular (square) filter (an area adjacent to the target pixel) in the main scanning direction, and h be the size of the filter in the subscanning direction, then $$g=\min\{[G], \text{even}([G+1])\} \quad h=\min\{[H], \text{even}([H+1])\} \quad (5)$$

where even(x) is a function for returning an odd number not less than x, [•••] is a Gauss' notation, and min{ } is a function for returning the minimum value in { }.

The principle of density smoothing performed by the uniform weight filtering unit 261 is the same as that in the first embodiment, as shown in FIG. 10.

According to the above description, changes in density can be smoothed by using the density smoothing unit 2113 for the reproduced multivalued image 2118 which is reproduced by the multivalued image reproduction unit 2112 in FIG. 21 upon smoothing/magnifying processing for equidensity curves.

As described above, when multivalued image magnifying processing incorporates equidensity curve smoothing/magnifying processing (the operation of the equidensity curve smoothing/magnifying unit 2111 in FIG. 21) and density smoothing processing (the operation of the density smoothing unit 2113 in FIG. 21), a magnified multivalued image can be obtained without any jagged pattern or lattice-like distortion at edge portions during a multivalued image magnifying operation. In addition, in the multivalued image reproduction unit, only an equidensity curve corresponding to a given density level is drawn into a binary image on the basis of equidensity curve vector data, and a multivalued image is reproduced by using this image. Therefore, a multivalued image can be reproduced at a higher speed than that in reproduction of a multivalued image after the entire area enclosed with an equidensity curve drawn into a binary image is painted.

In order to realize the arrangement in FIG. 21 by using programs, the programs in the flowchart in FIG. 12 are executed by the central processing unit 26 in FIG. 2. In this embodiment, however, the processing based on the procedure in FIG. 23 is executed as the processing in step S122, and the processing in FIG. 24 is executed as the processing in step S124. These programs are supplied to the system via the external memory unit 27 as a medium.

In this embodiment, as indicated by the arrangement of the binary image generating unit 2201 in FIG. 22, i.e., the flowchart in FIG. 23, a binary image is generated and processed for each gradation level. However, such a procedure may not be used with respect to multivalued images with small numbers of gradation levels such as photographic images and multivalued document images. That is, instead of setting "Ilevel=Ilevel+1" in step S234, "Ilevel=Ilevel+c may be set to execute processing for every c gradations. As a result, the processing time in the equidensity curve smoothing/magnifying unit 2111 and the multivalued image reproduction unit 2112 in FIG. 21 can be shortened.

In addition, in this embodiment, the binary image generating unit 2201 in FIG. 22 generates binary images corresponding to all density levels, the binary image outline extraction unit 2202 extracts outline vectors from the binary images corresponding to all the density levels, and the outline smoothing/magnifying unit 2203 smoothes/magnifies the outline vectors corresponding to all the density levels. However, such a procedure need not always be used. That is, binary image generation, binary image outline extraction, and outline smoothing/magnifying processing may be executed for each gradation level by using the memory unit 23 in FIG. 2 to reproduce a multivalued image (the multivalued image reproduction unit 2112 in FIG. 21). Such a series of operations may be repeated by the number of times corresponding to the number of gradation levels. With this processing, the access time for the memory unit 23 prolongs, and the overall processing time also prolongs. However, a considerable reduction in memory capacity can be attained because only a binary image memory corresponding to one frame (one gradation level) is required, unlike the above case wherein the binary image memory used by the binary image generating unit and the outline vector extraction unit needs to have a capacity corresponding to all the gradation levels.

Modification of Fourth Embodiment

Figure 27:
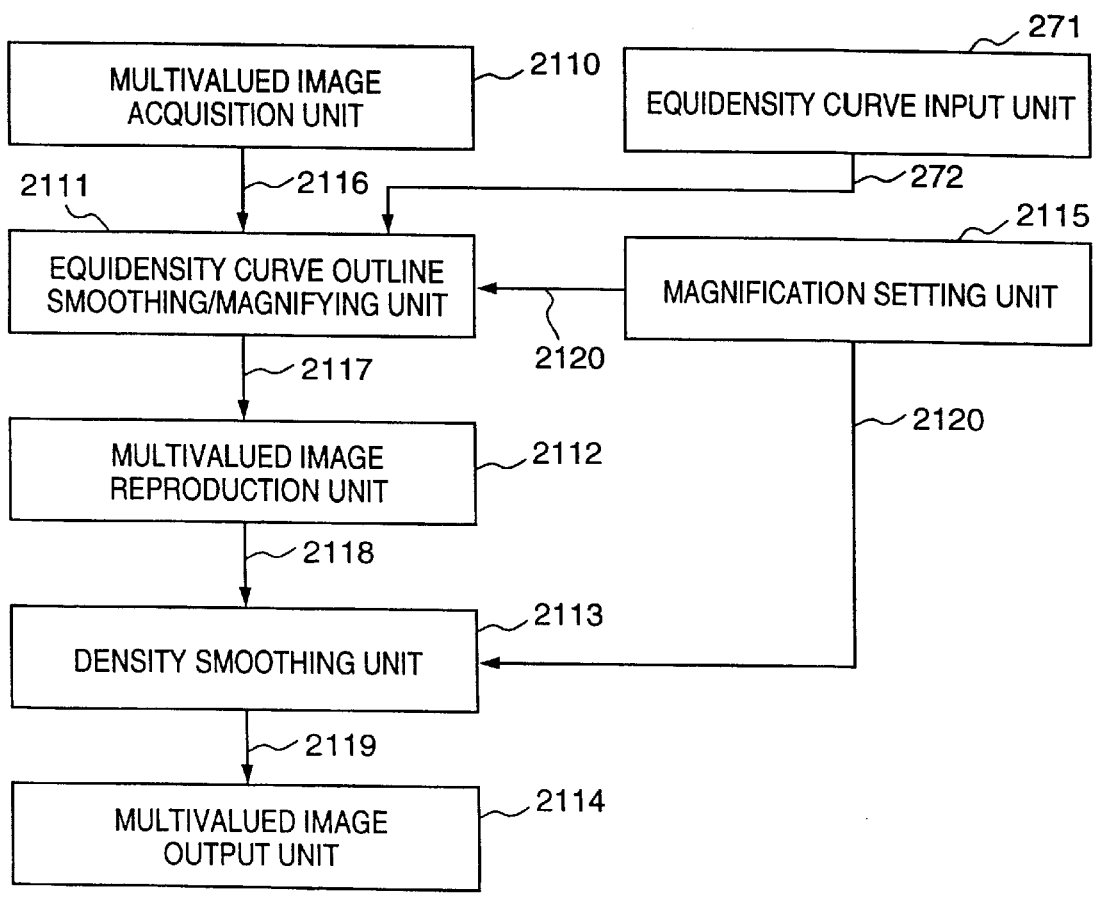
FIG. 27 is a block diagram showing a modification of the fourth embodiment.
Figure 28:
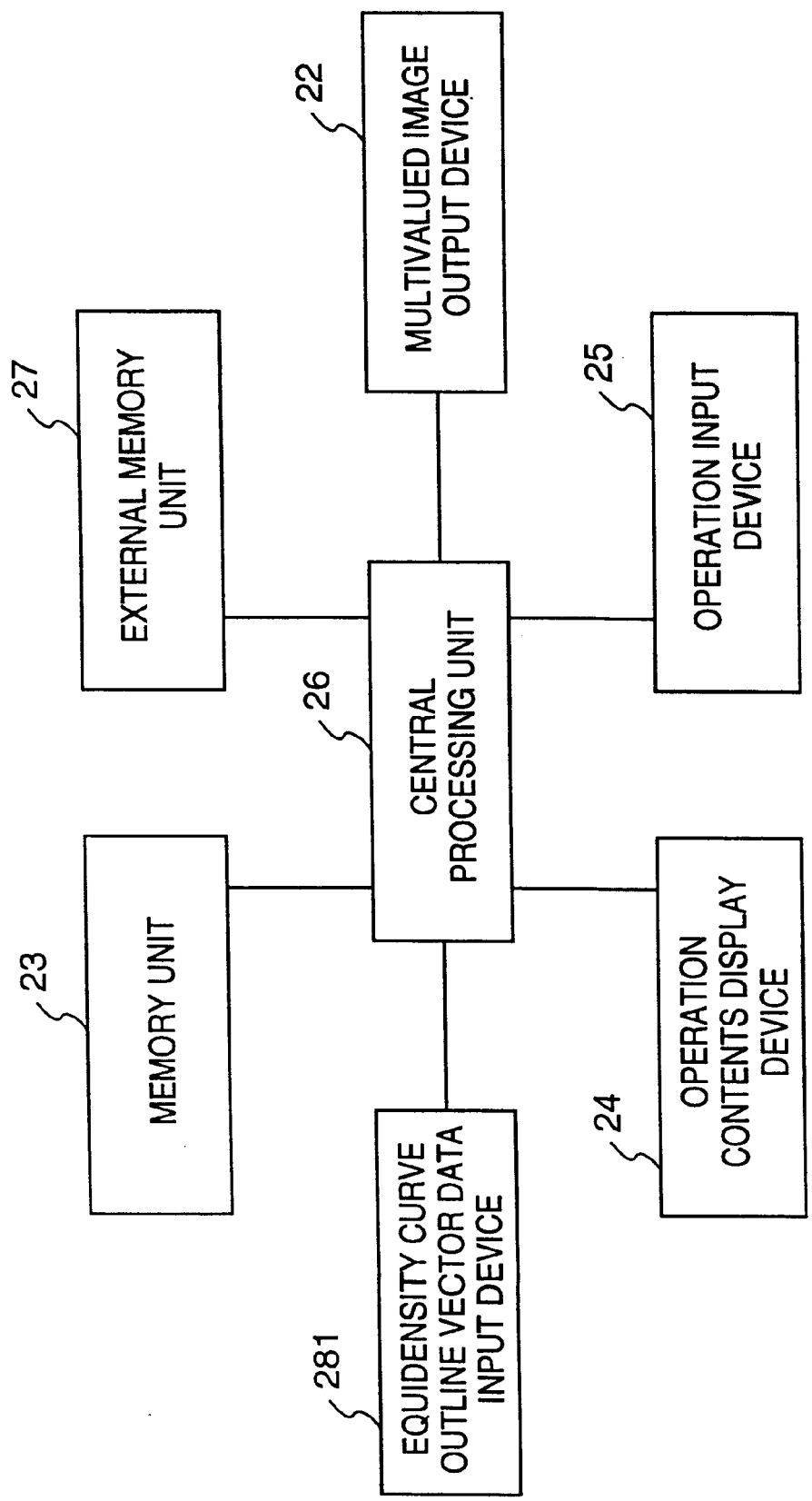
FIG. 28 is a block diagram showing the hardware arrangement of the modification of the fourth embodiment.
Figure 29:
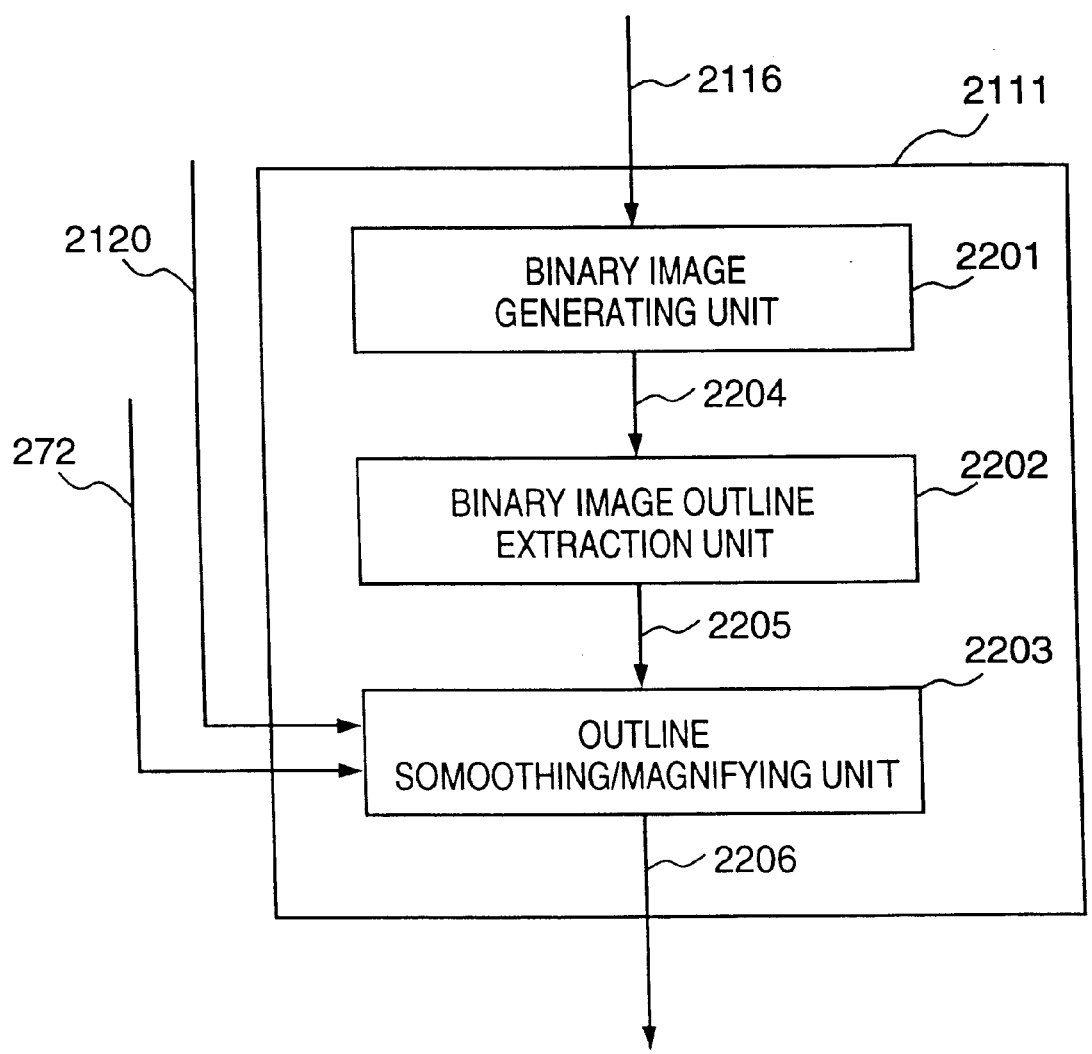
FIG. 29 is a block diagram showing the arrangement of an equidensity curve outline smoothing/magnifying unit in the modification of the fourth embodiment.

This embodiment includes the multivalued image acquisition unit, the multivalued image generating unit, and the binary image outline extraction unit, as shown in FIGS. 21 and 22. However, these units need not always be required. Instead of the above units, the embodiment may include a unit for externally inputting equidensity curve vector data generated for each density level of a multivalued image. FIG. 27 shows such an arrangement which corresponds to the arrangement in FIG. 21. FIG. 28 is a schematic view of a hardware arrangement corresponding to the arrangement in FIG. 2. FIG. 29 shows an arrangement corresponding to the arrangement in FIG. 22.

As indicated by the hardware arrangement in FIG. 28, instead of a multivalued image input device 21, this embodiment includes an input device 281 for an inputting equidensity curve vector data extracted by an external equidensity curve extraction unit for a multivalued image. With this arrangement, externally input equidensity curve vector data can be magnified. In addition, the equidensity curve vector data of a multivalued image which is stored in the memory unit 23 may be input. In this case, after smoothing/ magnifying processing for input equidensity vector data is executed as in the arrangement in FIG. 27, subsequent processing can be performed in accordance with the same procedure as that in the arrangement shown in FIGS. 21 and 22.

As described above, the image processing apparatus and method of this embodiment can obtain a high-quality magnified image, and a high-quality magnified multivalued image free from a deterioration in image quality such as a jagged pattern or lattice-like distortion.

In addition, a multivalued image is reproduced by using an equidensity curve corresponding to a given gradation level. Therefore, a multivalued image can be reproduced at a higher speed than that in reproduction of a multivalued image after the entire area enclosed with an equidensity curve drawn into a binary image is painted.

Fifth Embodiment

Figure 30:
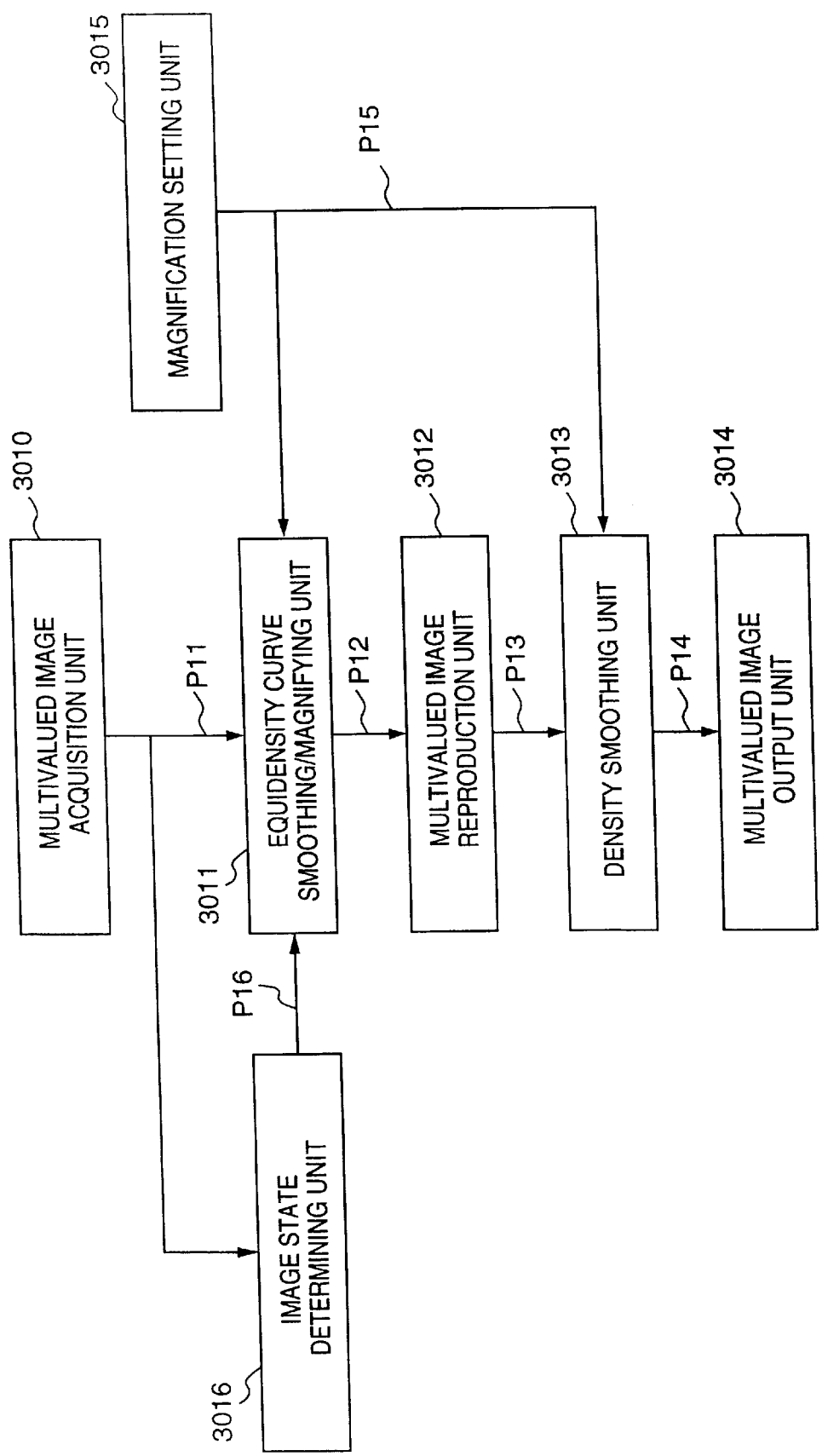
FIG. 30 is a block diagram showing the arrangement of the fifth and sixth embodiments.

FIG. 30 is a view best representing the arrangement of the present invention. Reference numeral 3010 denotes a multivalued image acquisition unit for acquiring a digital multivalued image to be subjected to magnifying processing, and outputting a raster scanning type multivalued image to a unit for executing the next step; 3011, an equidensity curve smoothing/magnifying unit for receiving a magnification P15 set by a magnification setting unit 3015, binary image generation condition data P16 set by a multivalued image state determining unit 3016, and raster scanning type multivalued image data P11 from the multivalued image acquisition unit 3010, and performing magnifying processing for the contour shape of an image of the multivalued image data P11 which corresponds to each density level; 3012, a multivalued image reproduction unit for receiving equidensity curve vector data P12 magnified by the equidensity curve smoothing/magnifying unit 3011, and reproducing a raster scanning type magnified multivalued image P13 from the equidensity curve vector data P12 form; 3013, a density smoothing unit for receiving the magnified multivalued image P13 set by the multivalued image reproduction unit 3012 and the magnification P15 set by the magnification setting unit 3015, and performing density smoothing with respect to the magnified multivalued image data P13; 3014, a multivalued image output unit for displaying an obtained magnified image, producing a hard copy, or outputting the data to a communication path or the like; and 3015, a magnification setting unit for setting a magnification. The multivalued image state determining unit 3016 receives the multivalued image data P11 output from the multivalued image acquisition unit 3010, and generates the binary image generation condition data P16.

Similar to the first embodiment, the hardware arrangement of the image processing apparatus of this embodiment is the same as that shown in FIG. 2.

Figure 31:
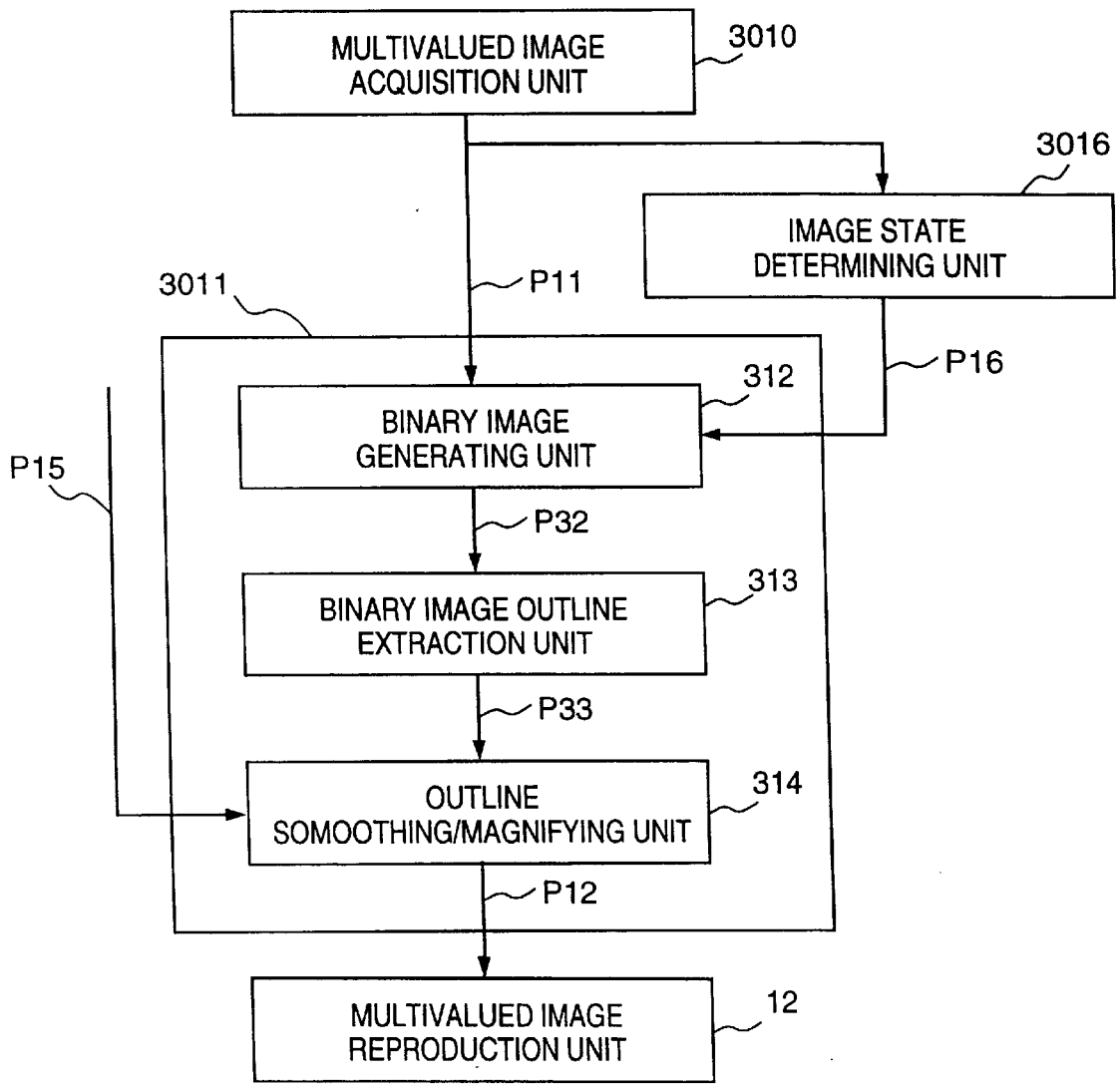
FIG. 31 is a block diagram showing the arrangement of an equidensity curve outline smoothing/magnifying unit in the fifth and sixth embodiments.

FIG. 31 shows the detailed arrangement of the equidensity curve smoothing/magnifying unit 3011 in FIG. 30. The multivalued image state determining unit 3016 receives the multivalued image data P11 output from the multivalued image acquisition unit 3010, and generates the binary image generation condition data P16. Reference numeral 312 denotes a binary image generating unit for generating the multivalued image data P11 output from the multivalued image acquisition unit 3010 in FIG. 30 into a raster scanning type binary image data group P32 for each density level on the basis of the binary image generation condition data P16 determined by the multivalued image state determining unit 3016; 313, a binary image outline extraction unit for receiving the raster scanning type binary image group P32 generated by the binary image generating unit 312, and extracting outline vector data P33; and 314, an outline smoothing/ magnifying unit for receiving the outline vector data P33 extracted by the binary image outline extraction unit 313 and the magnification P15 set by the magnification setting unit 3015 in FIG. 30, performing smoothing/magnifying processing, and outputting the smoothed/magnified outline data P12.

Figure 32:
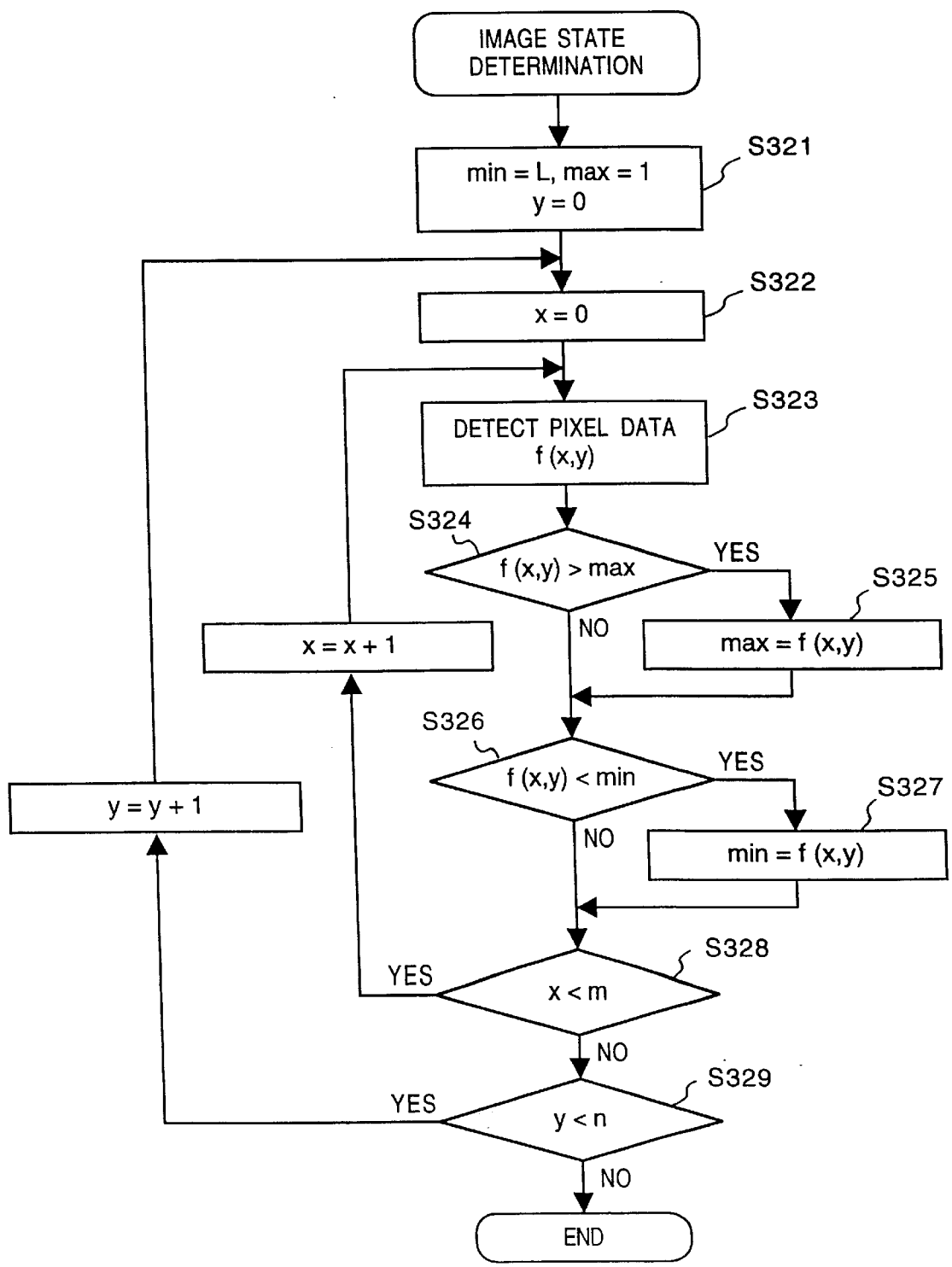
FIG. 32 is a flowchart showing processing in a multivalued image state determining unit in the fifth embodiment.

FIG. 32 shows the flow of processing in the multivalued image state determining unit 3016. Processing is performed in accordance with the procedure in FIG. 32 to generate the data P16 for providing a condition used to generate a binary image by using digital multivalued image data input in the raster scanning form. An input multivalued image is represented by f (a size n in the main scanning direction; a size m in the subscanning direction), and a pixel value at coordinates x and y in the main scanning and subscanning directions is represented by f(x,y). The number of density levels of a multivalued image is represented by L (number L of gradation levels=256 in the case of a multivalued image consisting of 8-bit pixels). In step S321, a variable max for representing the maximum pixel value of an input image is set to "1", and a variable min (=L) for representing the minimum pixel value of the input image is initialized. In addition, the value of a counter y for holding a coordinate in the subscanning direction during a scanning operation is initialized. In step S322, the value of a counter x for holding a coordinate in the main scanning direction during a scanning operation is initialized to "0". In step S323, the pixel value f(x,y) at a position during a scanning operation is read out from a memory area storing an input dynamic image. In step S324, the pixel value f(x,y) is compared with the maximum pixel value max. If f(x,y)>max, the value of f(x,y) is substituted for the maximum pixel value max in step S325. In step S326, the pixel value f(x,y) is compared with the minimum pixel value min. If f(x,y)<min, the value of f(x,y) is substituted for the minimum pixel value min in step S327. In step S328, the coordinate x is compared with the size m in the subscanning direction. If x<m, the value of x is incremented by one, and the flow returns to step S232. In step S329, the coordinate y is compared with the size n in the main scanning direction. If y<n, the value y is incremented by one, and the flow returns to step S322. If y≧n, it indicates that the scanning operation is completed. The processing is therefore terminated.

With the above steps, the maximum and minimum pixel values of the input image are respectively substituted for max and min. These values are output as the data P16 for providing a condition used to generate a binary image in the binary image generating unit 312.

Figure 33:
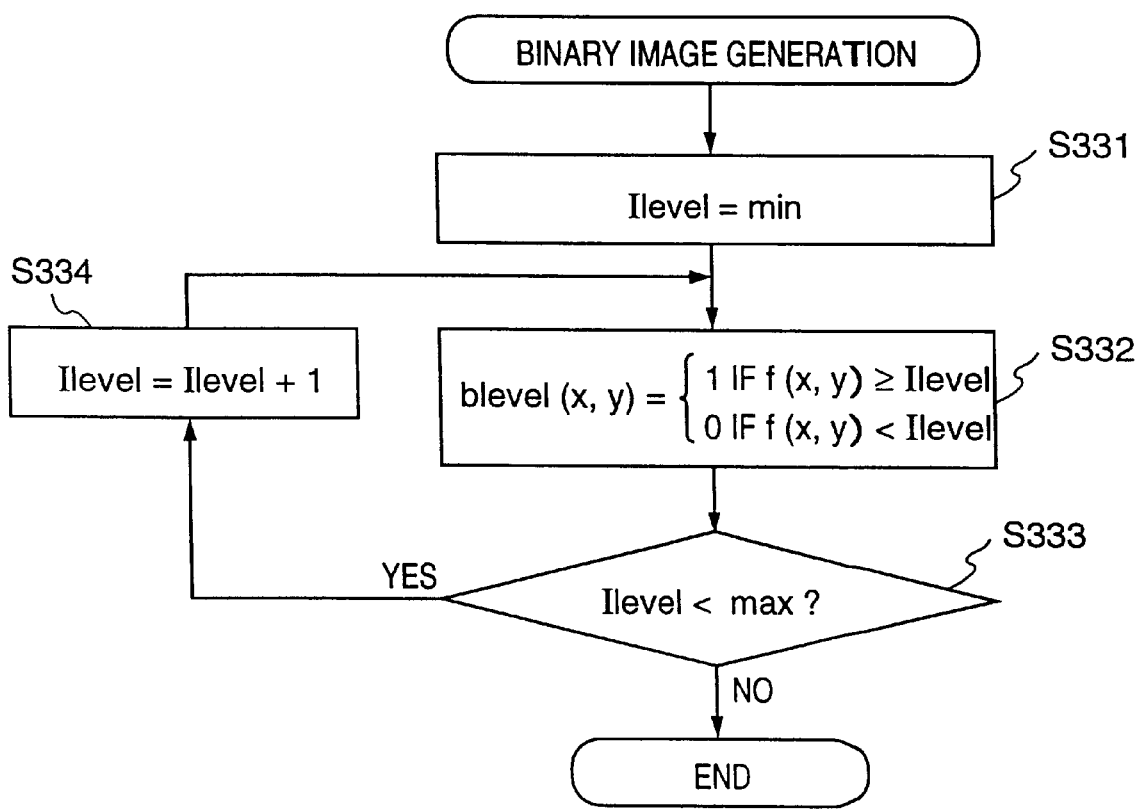
FIG. 33 is a flowchart showing processing in a binary image generating unit in the fifth embodiment.

FIG. 33 shows the flow of processing in the binary image generating unit 312. The binary image group P32 corresponding to the respective density levels is generated by using digital multivalued image data input in the raster scanning form in accordance with the procedure in FIG. 33. An input multivalued image is represented by f (a size n in the main scanning direction; size m in the subscanning direction) is represented by f, and a pixel value at coordinates x and y in the main scanning and subscanning directions is represented by f(x,y). The maximum and minimum pixel values of f(x,y) of the input image are respectively set to min and max in accordance with the binary image generation condition data P16 output from the multivalued image state determining unit 3016. In step S331, a variable Ilevel (=min) for expressing the current density level is initialized. In step S332, a binary image blevel (a size n in the main scanning direction; a size m in the subscanning direction) is generated such that 1 (black pixel) is set if f(x,y)≧Ilevel, and 0 (white pixel) is set if f(x,y)<Ilevel. If it is determined in step S333 that Ilevel is equal to or lower than max, the flow advances to step S334 to add "1" to Ilevel. The flow then returns to step S332. If it is determined that Ilevel is higher than max, this processing is terminated. The binary image group P32 corresponding to the respective density levels is output in accordance with this flow of processing.

As described above, since the binary image generating unit 312 performs the processing in accordance with the procedure in FIG. 33, no binary image needs to be generated in a low- or high-gradation area where no pixel is present, and a necessary binary image group can be output by performing a scanning operation (max−min) times. An increase in processing speed and a reduction in work memory capacity can therefore be attained.

The binary image outline extraction unit 313 and the outline smoothing/magnifying unit 314 in FIG. 31 can be constituted by the device disclosed in, e.g., Japanese Patent Laid-Open No. 5-174140 filed by the assignee of the present application. More specifically, the binary image outline extraction unit 313 receives the binary image group P32 generated by the binary image generating unit 312, and extracts the outline vector data (coarse contour vector data) P33. The outline smoothing/magnifying unit 314 generates outline vectors smoothly magnified at a desired (arbitrary) magnification designated by the magnification signal P15 in the form of the extracted outline vector expression, and generates the raster scanning type magnified binary image group P12 from the smoothly magnified outline vectors.

The equidensity curve smoothing/magnifying unit 3011 in the FIG. 30 has been described above.

Figure 34:
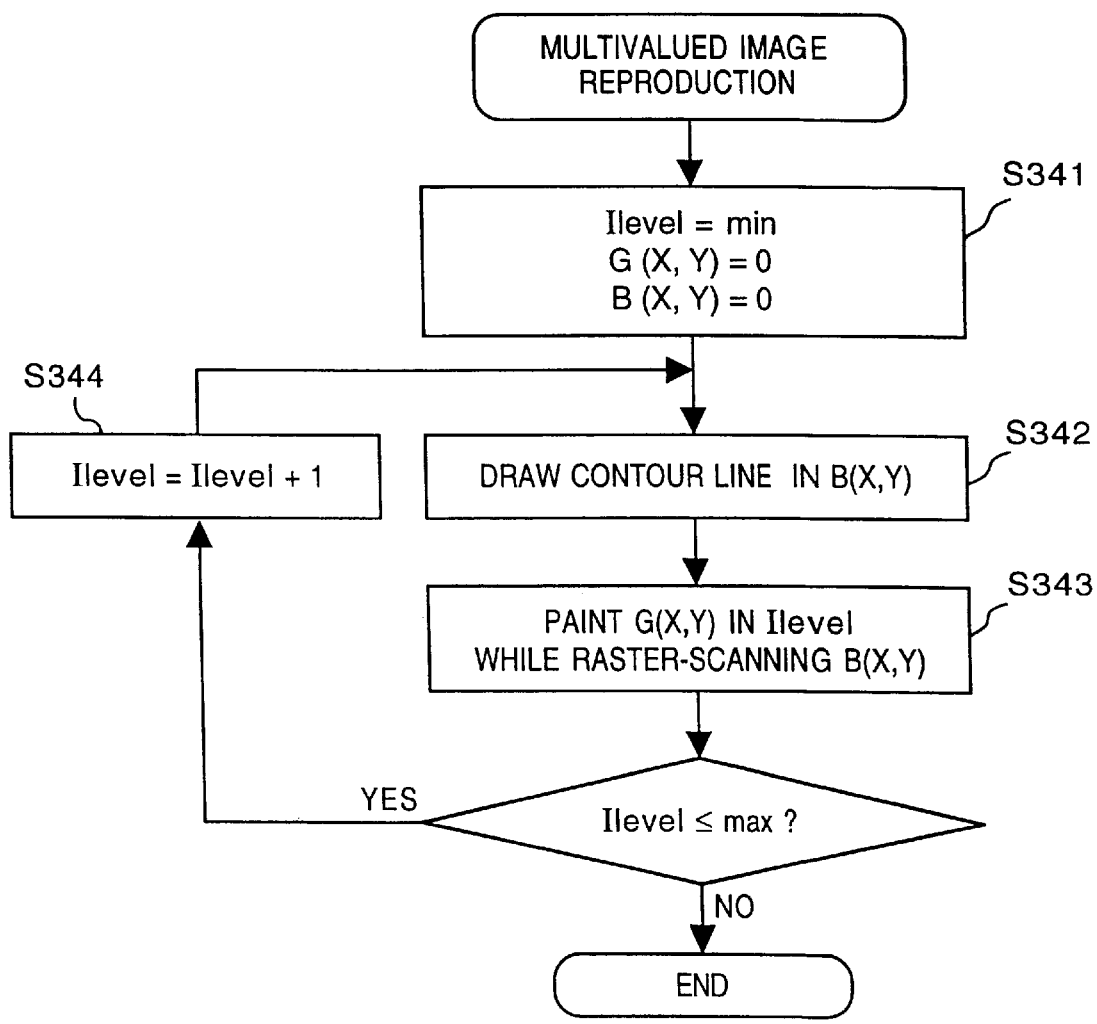
FIG. 34 is a flowchart showing processing in a multivalued image reproduction unit in the fifth embodiment.

The flow of processing in the multivalued image reproduction unit 3012 in FIG. 30 will be described next. This unit can be constituted by the device disclosed in, e.g., Japanese Patent Laid-Open No. 5-20467 filed by the assignee of the present application. FIG. 34 shows the flow of this processing. In step S341, a variable Ilevel (=min) representing a density level, a binary image buffer B, and a multivalued image buffer G (a size X in the main scanning direction; a size Y in the subscanning direction) are initialized to "0". In step S342, an equidensity curve corresponding to the density level indicated by Ilevel is drawn in the binary image buffer B. In step S343, a multivalued image is reproduced by using the drawn equidensity curve. More specifically, the binary image buffer B is raster-scanned. When the scanning line intersects an equidensity curve an odd number of times, painting in the multivalued image buffer G is started from the same coordinates as those in the binary image buffer B in the density indicated by variable Ilevel. When the scanning line intersects the equidensity curve an even number of times, painting is stopped at the same coordinates as those in the binary image buffer B. When the binary image buffer B is raster-scanned, pixels (black pixels) intersecting the equidensity curve are changed into white pixels. In this operation, the binary image buffer is initialized while being raster-scanned. In addition, in the multivalued image reproduction unit, only an equidensity curve corresponding to a given density level is drawn into a binary image on the basis of equidensity curve vector data, and processing for a portion corresponding to each density level is sequentially performed to reproduce a multivalued image.

The density smoothing unit 3013 in FIG. 30 can be constituted by the device of the fourth embodiment described above. More specifically, this device receives the multivalued image P13 reproduced by the multivalued image reproduction unit 3012 and the magnification P15 set by the magnification setting unit 3015 in FIG. 30, determines a filter size on the basis of the magnification P15, and obtains a multivalued image P14 whose density is smoothed by uniform filtering processing.

As described above, in generating a binary image corresponding to each density level from an input multivalued image, since no binary image is generated in a low- or high-density area where no pixel having the corresponding density level is present, the processing speed can be increased, and a work memory capacity can be saved.

Sixth Embodiment

Figure 35:
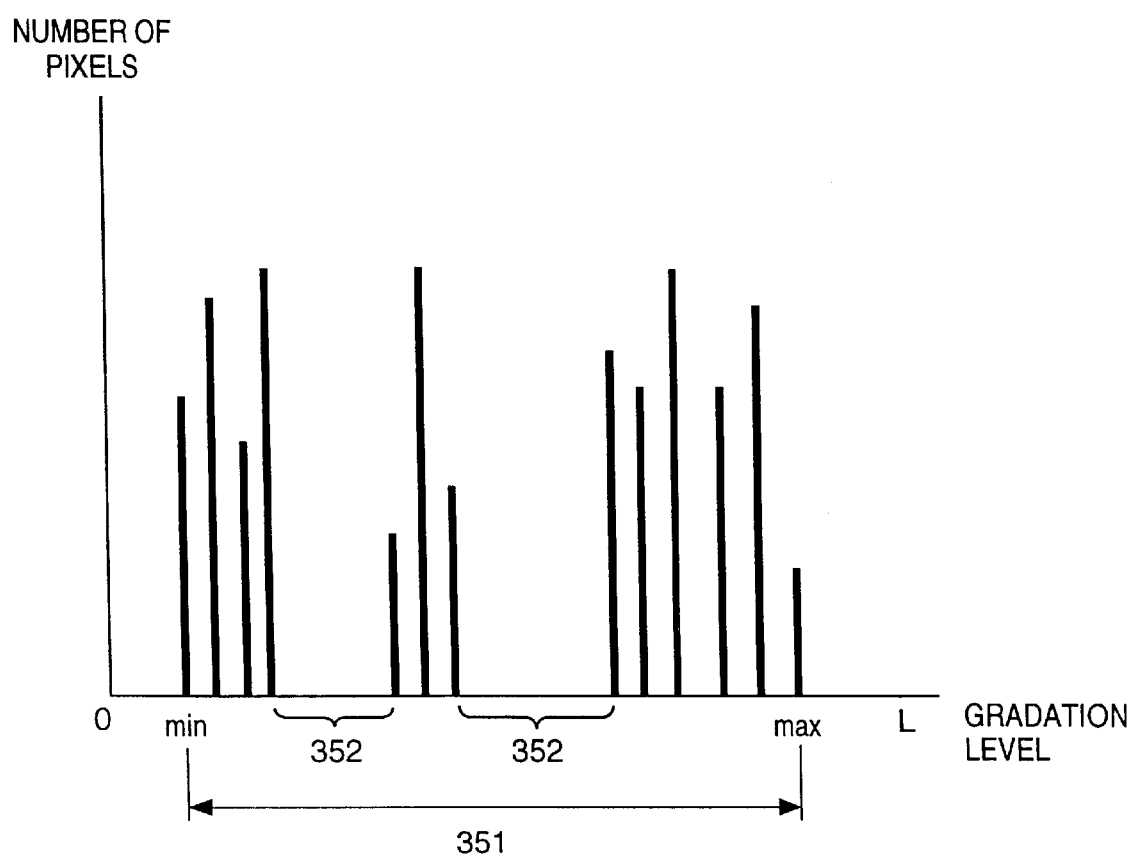
FIG. 35 is a graph for explaining the sixth embodiment.

FIG. 35 is a histogram showing the number of pixels in each density level. The abscissa represents the density level; and the ordinate, the number of pixels in each density level. In the equidensity curve smoothing/magnifying unit 3011 in the fifth embodiment shown in FIG. 30, processing for generating binary images is performed within a density level range 351 from "min" to "max", as shown in FIG. 35. However, as shown in FIG. 35, this input multivalued image has density level ranges 352, in the density level range from "min" to "max", in which there are no pixels having the corresponding density values. The above processing is performed even in the density values ranges 352 in which there are not pixels having the corresponding density values.

As shown in FIG. 35, pixels corresponding to each density value at each density level is counted, and no binary image is generated with respect to a density level in which the number of black pixels is 0. Therefore, processing can be performed at a higher speed in this embodiment than in the fourth embodiment, and a working memory capacity can be saved. More specifically, the flow of processing in the multivalued image state determining unit 3016 in the fourth embodiment in FIG. 31 is replaced with the flow of processing shown in FIG. 36, and the flow of processing in the multivalued image reproduction unit 3012 in FIG. 34 is replaced with the flow of processing in FIG. 38. Other portions are the same as those in the fourth embodiment.

Figure 36:
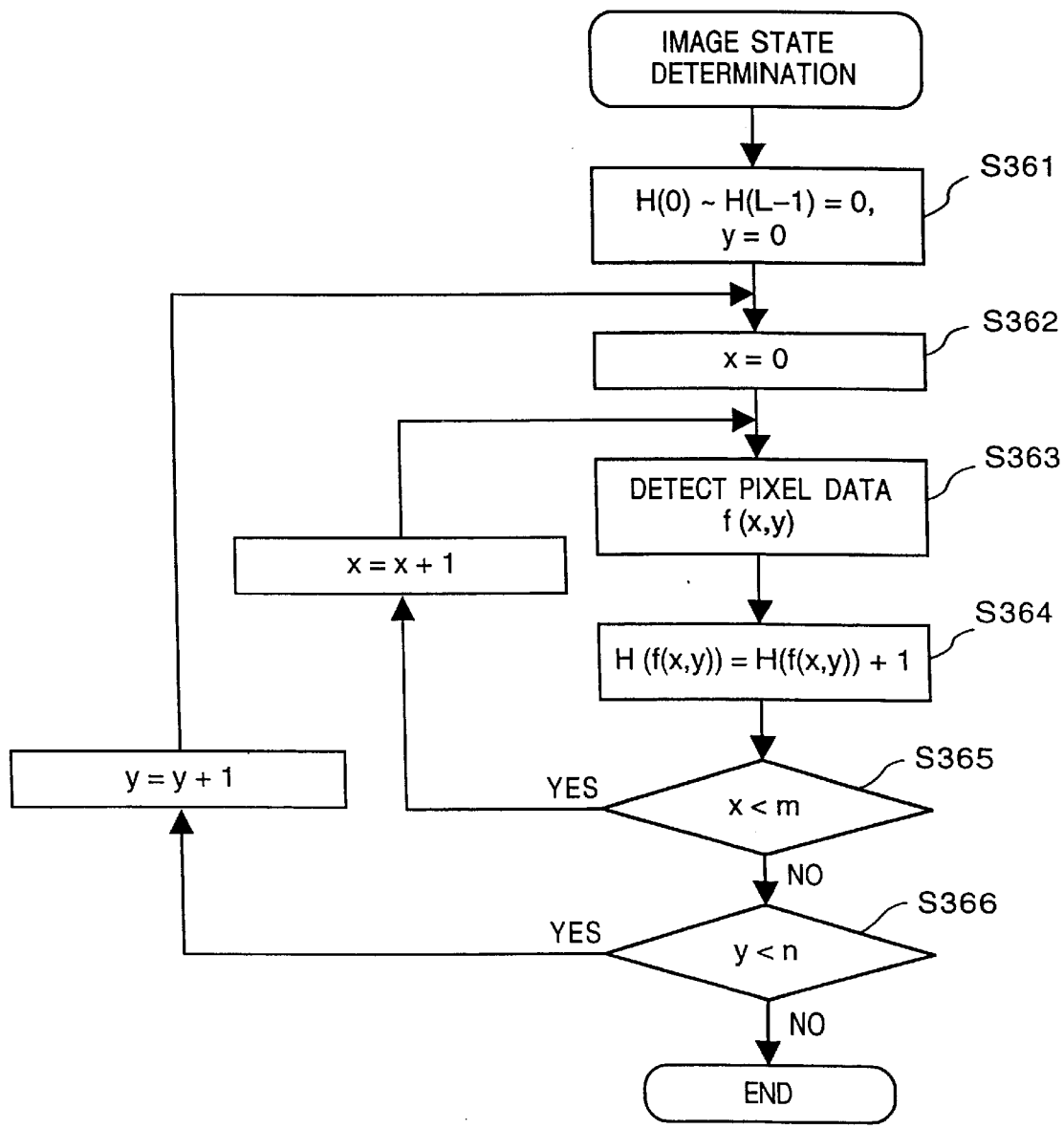
FIG. 36 is a flowchart showing processing in a multivalued image state determining unit in the sixth embodiment.

The processing in FIG. 36 will be described. The memory unit 23 is used to ensure a data area H(n) (n=0 to L−1) in which the number of pixels corresponding to each density level is stored. In step S361, all these values are initialized, and the value of the counter y holding coordinates in the subscanning direction during a scanning operation is initialized to 0. In step S362, the value of the counter x holding coordinates in the main scanning direction is initialized to 0. In step S363, a pixel value f(x,y) at a position during a scanning operation is read out from the memory area holding an input dynamic image. In step S364, the value of H(f(x,y)) is incremented by one with respect to the pixel value f(x,y) of the input multivalued image. In step S365, x is compared with the size m in the subscanning direction. If x<m, the value of x is incremented by one, and the flow returns to step S363. In step S366, y is compared with the size n in the main scanning direction. If y<n, the value of y is incremented by one, and the flow returns to step S362. If y≧n, the scanning operation is terminated. When the above processing is performed for all the pixels of the input image, the numbers of black pixels present in the respective density levels are stored at H(0) to H(L−1). These values are output as data P16 for providing a condition used to generate a binary image in a binary image generating unit 312.

Figure 37:
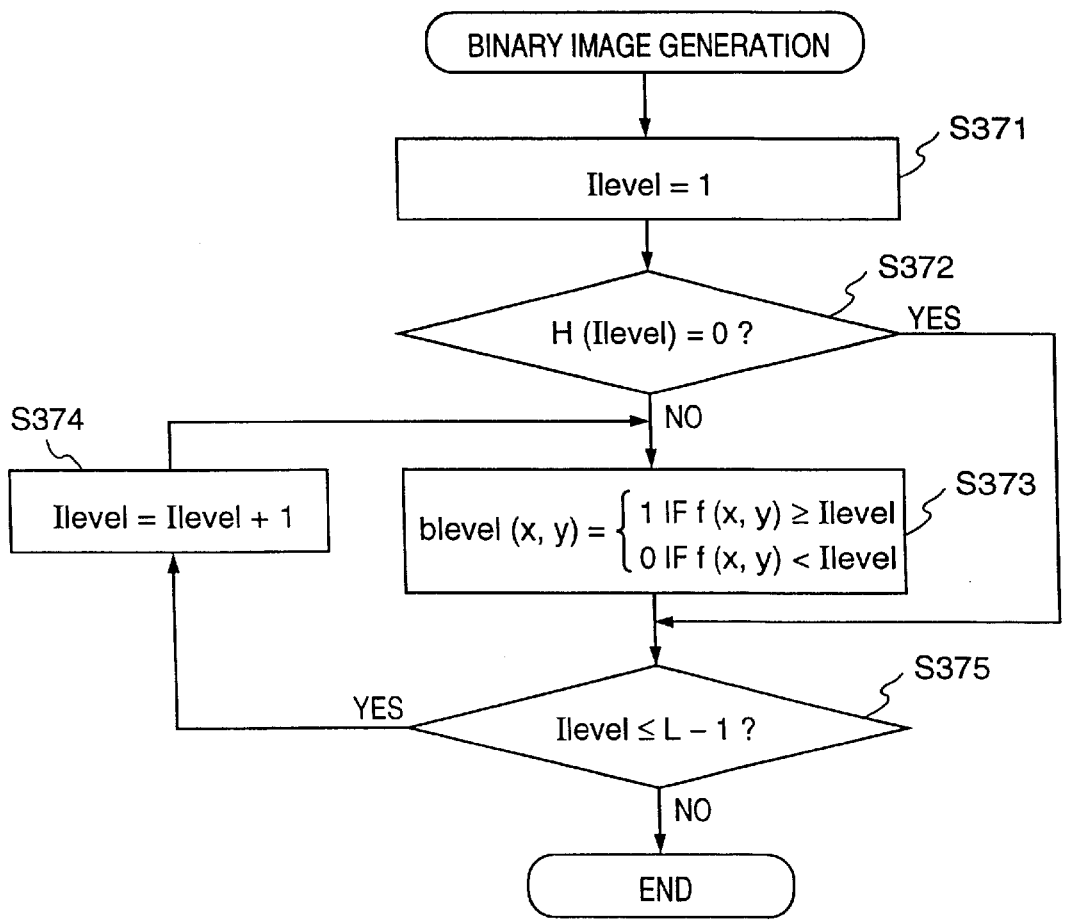
FIG. 37 is a flowchart showing processing in a binary image generating unit in the sixth embodiment.

The processing in FIG. 37 will be described below. In step S371, a variable Ilevel representing the current density level is set to "1", and the numbers of pixels having densities corresponding to the respective density levels are set to H(0) to H(L−1). If it is determined in step S372 that H(Ilevel)=0, the flow advances to step S375 without performing processing for binary image generation. If H(Ilevel)>0, the flow advances to step S373 to generate a binary image blevel. In step S374, if Ilevel is equal to or lower than (L−1), the flow advances to step S375 to add "1" to Ilevel. The flow then returns to step S372. If Ilevel is higher than (L−1), this processing is terminated.

With the above processing, binary images can be generated only in density levels in which pixels having the corresponding densities are present, throughout the entire density range.

Figure 38:
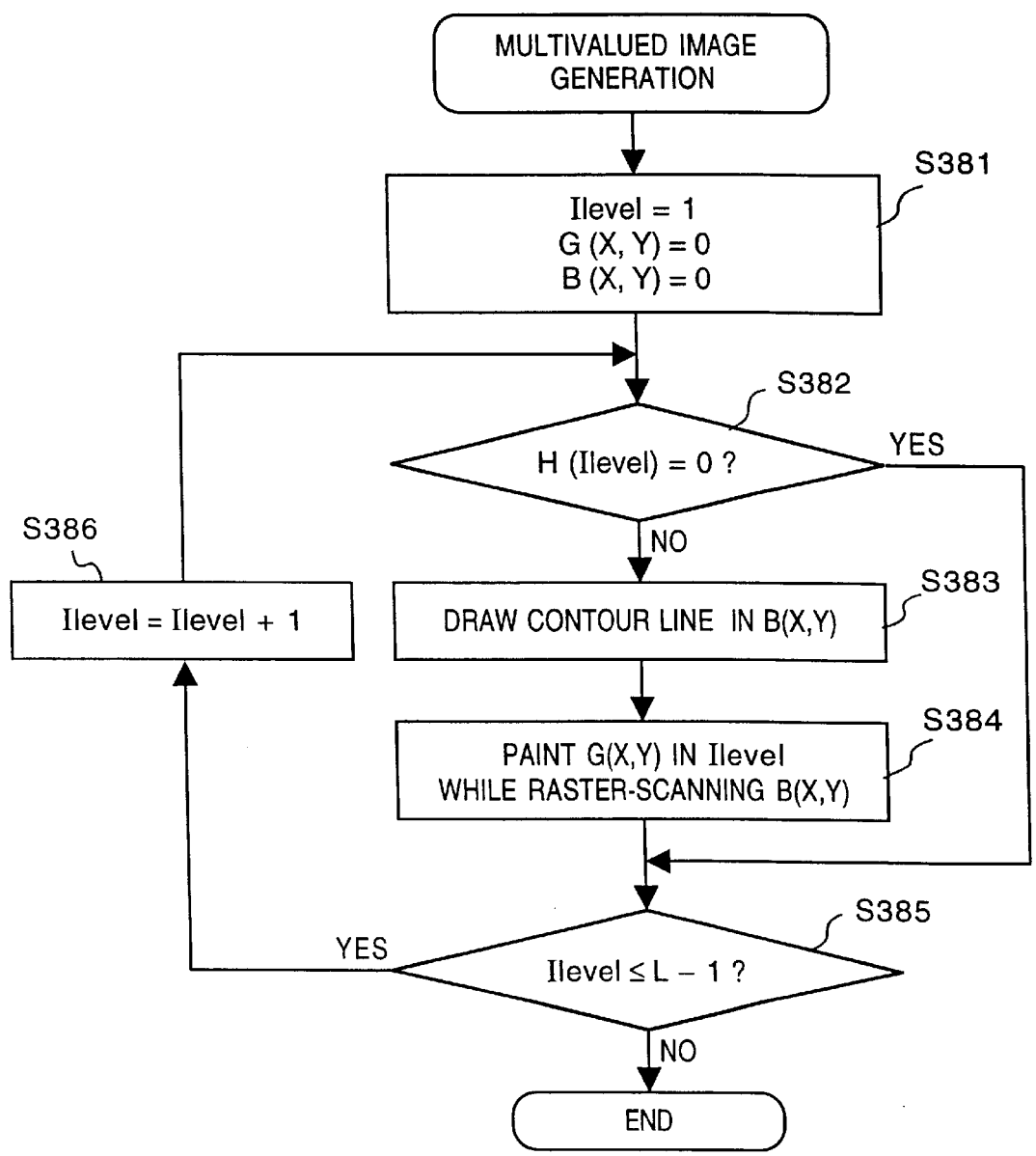
FIG. 38 is a flowchart showing processing in a multivalued image reproduction unit in the sixth embodiment.

The flow of processing in the multivalued image reproduction unit 3012 will be described with reference to FIG. 38. First of all, in step S381, a variable Ilevel representing a gradation level is set to "1", and a binary image buffer B and a multivalued image buffer G (a size X in the main scanning direction; a size Y in the subscanning direction) are initialized. If it is determined in step S382 that the value of binary image generation condition data H(Ilevel) input from the image state determining unit 3016 is "0", the flow advances to step S385 without performing a contour drawing operation. If the value of H(Ilevel) is not "0", the flow advances to step S383. In step S383, an equidensity curve corresponding to the density value indicated by variable Ilevel is drawn in the binary image buffer B. In step S384, a magnification is reproduced by using the drawn equidensity curve. More specifically, the binary image buffer G is raster-scanned. When the scanning line intersects the equidensity curve an odd number of times, painting of a multivalued image corresponding to the density Ilevel in the multivalued image buffer G is started from the same coordinates as those in the binary image buffer B. When the scanning line intersects the equidensity curve an even number of times, painting is stopped at the same coordinates as those in the binary image buffer B. In addition, in raster-scanning the binary image buffer B, pixels (black pixels) which intersect the equidensity curve are changed into white pixels. With this operation, the binary image buffer B is initialized while being raster-scanned. If it is determined in step S385 that Ilevel>L−1, the processing is terminated. If Ilevel≦L−1, the flow advances to step S386 to increment the value of Ilevel by one, and the flow returns to step S382. With the above processing, only an equidensity curve corresponding to a given density level is drawn into a binary image, and a portion corresponding to each density value is processed by using this binary image, thereby reproducing a multivalued image.

In the sixth embodiment, black pixels are counted in each density level. However, black pixels need not always be counted, and it suffices to set only a memory area for storing information indicating whether any black pixel is present in each density level. More specifically, the processing in step S364 in FIG. 36 in the sixth embodiment may be replaced with processing of substituting "1" for H(f(x,y)). With this processing, the value of H(n) is set to "0" for a density level in which no pixel having the corresponding density value is present, and the value of H(n) is set to "1" when a pixel having the corresponding density value is present. If, therefore, this value of H(n) is output as the data P16 for providing a condition used to generate a binary image, the binary image reproduction unit 3012 can generate binary images in only density levels in which pixels having the corresponding density values are present, throughout the entire density range, in accordance with the flow of processing in FIG. 37. With the above processing, arithmetic operations can be performed at a higher speed than in the sixth embodiment.

In the fifth and sixth embodiments, the binary image generating unit 312 in FIG. 31 generates binary all necessary images corresponding to the number of density levels, the binary image outline extraction unit 313 extracts outline data from all the necessary binary images, and the outline smoothing/magnifying unit 314 performs smoothing/magnifying processing. However, such a flow of processing need not always be used. More specifically, a binary image corresponding to a given density value may be generated, and smoothing/magnifying processing for this binary image is performed. A multivalued image is then reproduced in accordance with the processing in step S343 in FIG. 34. This processing may be repeated the number of times corresponding to the number of density levels.

Figure 39:
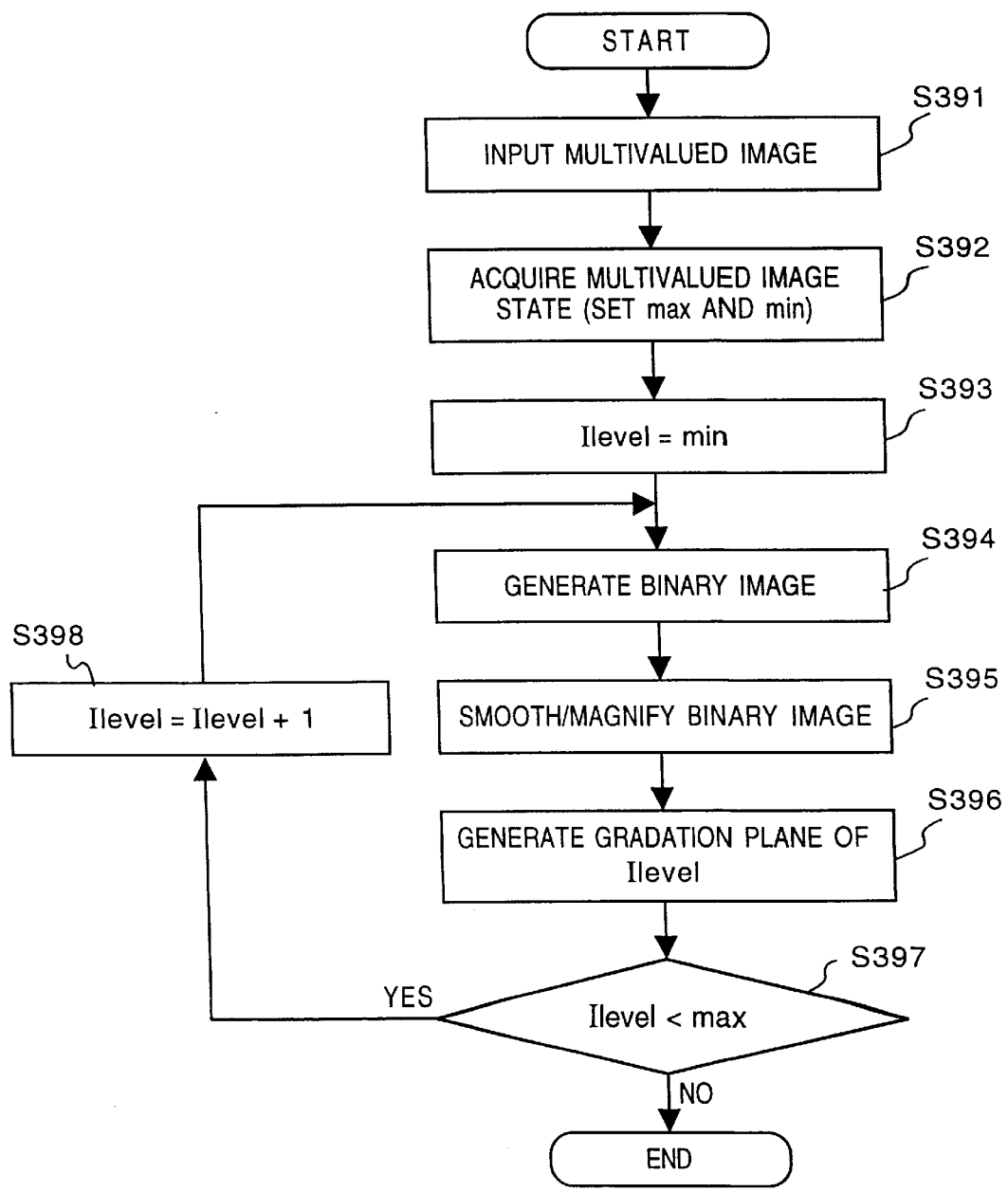
FIG. 39 is a flowchart for realizing the fifth embodiment.

For example, the flow of processing in the fifth embodiment may be replaced with the flow of processing shown in FIG. 39. This flowchart shows a procedure for programs to be executed by the central processing unit 26 in FIG. 2. FIG. 39 will be described below. In step S391, a multivalued image is input by the same processing as that performed by the multivalued image acquisition unit 3010 in FIG. 30. In step S392, binary image generation condition data min and max are set from the state of the input multivalued image by the same processing as that performed by the image state determining unit 3016 in FIG. 30. In step S393, a variable Ilevel representing the current density level is initialized to "min". In step S394, a binary image having a density level higher than Ilevel is generated. In step S395, outline smoothing/magnifying processing for the binary image is performed. In step S396, a multivalued image stored in a predetermined area is reproduced in accordance with the processing in step S343 in FIG. 34. If it is determined in step S397 that Ilevel≦max, the flow advances to step S398 to add "1" to Ilevel. The flow then returns to step S394. If Ilevel>max, the processing is terminated.

Figure 40:
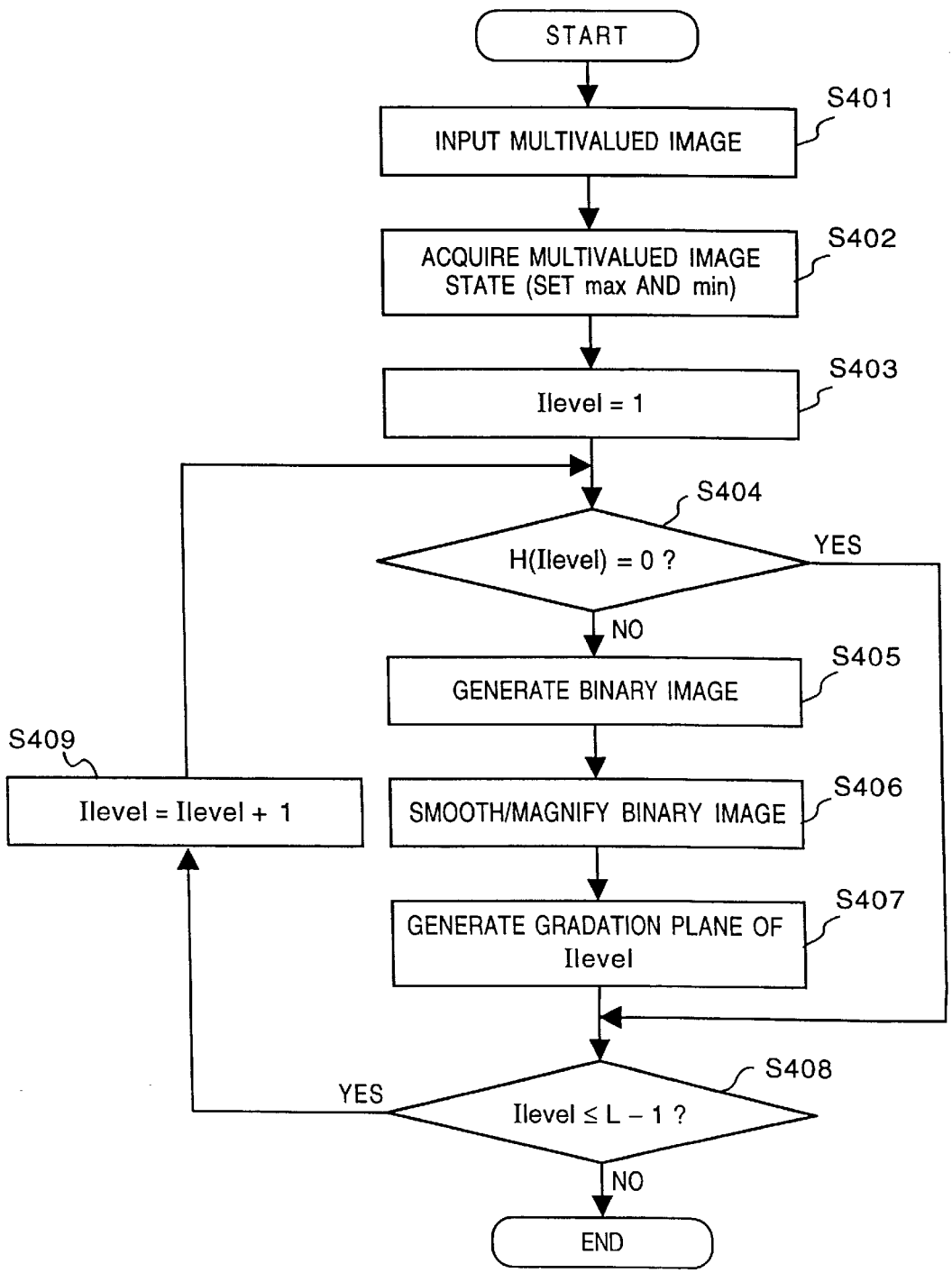
FIG. 40 is a flowchart for realizing the sixth embodiment.

The flow of processing in the sixth embodiment may be replaced with the flow of processing in FIG. 40. This processing is also executed by the central processing unit 26. FIG. 40 will be described below. In step S401, a multivalued image is input by the same processing as that performed by the multivalued image acquisition unit 3010 in FIG. 30. In step S402, binary image generation condition data H(n) is set from the state of the input multivalued image by the same processing as that performed by the image state determining unit 3016 in FIG. 30. In step S403, a variable Ilevel representing the current density level is initialized to "1". If it is determined in step S404 that H(Ilevel)=0, the flow advances to step S408. If NO in step S404, the processing in step S405 and the subsequent steps is performed. In step S405, a binary image in an area corresponding to a density level equal to or higher than Ilevel is generated. In step S406, outline smoothing/magnifying processing for this binary image is performed. In step S407, a magnified multivalued image stored in a predetermined area is reproduced in accordance with the processing in step S384 in FIG. 38. If it is determined in step S408 that Ilevel≦L−1, the flow advances to step S409 to add "1" to Ilevel. The flow then return to step S404 to repeat the above processing. If Ilevel>L−1, the processing is terminated.

With the above processing, since a series of operations is performed in units of gradation levels, the necessary storage area can be considerably reduced.

As described above, according to the image processing apparatus and method of the fifth and sixth embodiments, a high-quality magnified image can be obtained, and an excellent magnified multivalued image can be obtained without causing any deterioration in image quality, e.g., a jagged pattern or lattice-like distortion.

In addition, the distributed state of pixels in the respective density levels of an input multivalued image is acquired, and no binary image group is generated in density levels in which no black pixels are present. For this reason, a work memory required to generate a binary image group can be saved. In addition, since no processing is performed in unnecessary density levels, high-speed arithmetic operations can be performed.

Seventh Embodiment

Figure 41:
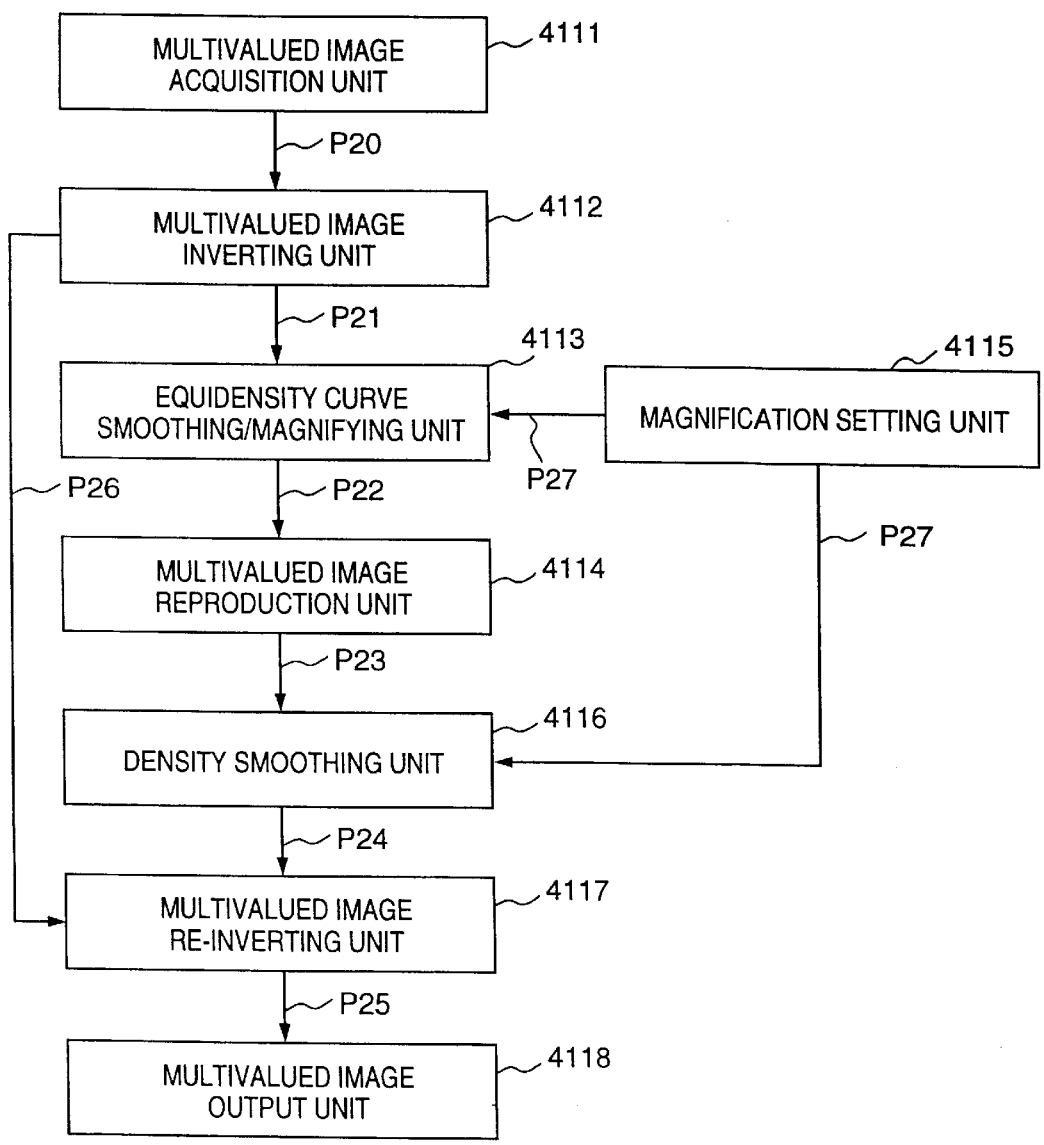
FIG. 41 is a block diagram showing the arrangement of the seventh embodiment.

FIG. 41 is a view best representing the arrangement of an apparatus of the seventh embodiment. Reference numeral 4111 denotes a multivalued image acquisition unit for acquiring a digital multivalued image to be subjected to magnifying processing, and outputting a raster scanning type multivalued image P20; 4112, a multivalued image inverting unit for inverting and outputting the input multivalued image upon determining on the basis of the characteristics of the input multivalued image P20 that the image should be inverted, and outputting the input image without any modification upon determining otherwise, together with an inversion flag P26 representing whether the input image P20 is inverted; 4113, an equidensity curve smoothing/magnifying unit for receiving a multivalued image data P21 from the multivalued image inverting unit 4112 and a magnification P27 set by a magnification setting unit 4115, and performing smoothing/magnifying processing for the outline vector data, in the form of an equidensity curve, of the multivalued image data P21; 4114, a multivalued image reproduction unit for receiving equidensity curve vector data P22 smoothed/magnified by the equidensity curve smoothing/magnifying unit 4113, and reproducing a raster scanning type magnified multivalued image P23 from the equidensity curve vector data form; 4116, a density smoothing unit for receiving the magnification P27 set by the magnification setting unit 4115, and performing density smoothing for the magnified multivalued image data P23; and 4117, a multivalued image re-inverting unit for checking on the basis of the inversion flag P26 output from the multivalued image inverting unit 4112 whether a multivalued image output from the density smoothing unit 4116 is to be inverted. If the inversion flag is ON, the magnified multivalued image P24 is inverted. If the inversion flag is OFF, the multivalued image is output without any modification. Reference numeral 4118 denotes a multivalued image output unit for displaying the magnified multivalued image, reproducing a hard copy, and outputs the data to a communication path or the like.

Similar to the first embodiment, FIG. 2 shows the hardware arrangement of the image processing apparatus which realizes the arrangement in FIG. 41. A multivalued image input from an image input device 21 or stored in an external memory unit 27 such as a hard disk, a floppy disk, or a CD-ROM is stored in a memory unit 23. An operation contents display device 24 displays an image magnifying processing designation input through an operation input device 25. Upon reception of this designation, a central processing unit 26 executes the designated processing while accessing the memory unit 23, and outputs the processing result to an image output device 22 or stores it in the external memory unit 27. The overall apparatus in FIG. 2 is controlled by the central processing unit 26 in this manner to realize the arrangement in FIG. 41.

The processing executed by the central processing unit 26 in this case includes procedures indicated by flowcharts to be described later. These procedures are stored in the external memory unit 27 and loaded into the memory unit 23 to be executed by the central processing unit 26.

Image Inversion

The flow of processing in the multivalued image inverting unit 4112 in FIG. 41 will be described next with reference to FIG. 43.

With regard to an image having a high mean density, a better result is often obtained by handling it considering that a white foreground (having a relatively lower density) is drawn on a black background (having a relatively high density). The multivalued image inverting unit 4112 temporarily inverts such an image to obtain an image having a black (high-density portion) foreground is drawn on a white (low-density portion) background. With this operation, the image having the white (low-density portion) foreground drawn on the black (high-density portion) background is inverted into the image having the black (high-density) foreground drawn on the white (low-density portion) background, thereby preventing white (low-density) areas which should be continuous from being separated from each other upon smoothing/magnifying processing to be subsequently performed.

Figure 42A:
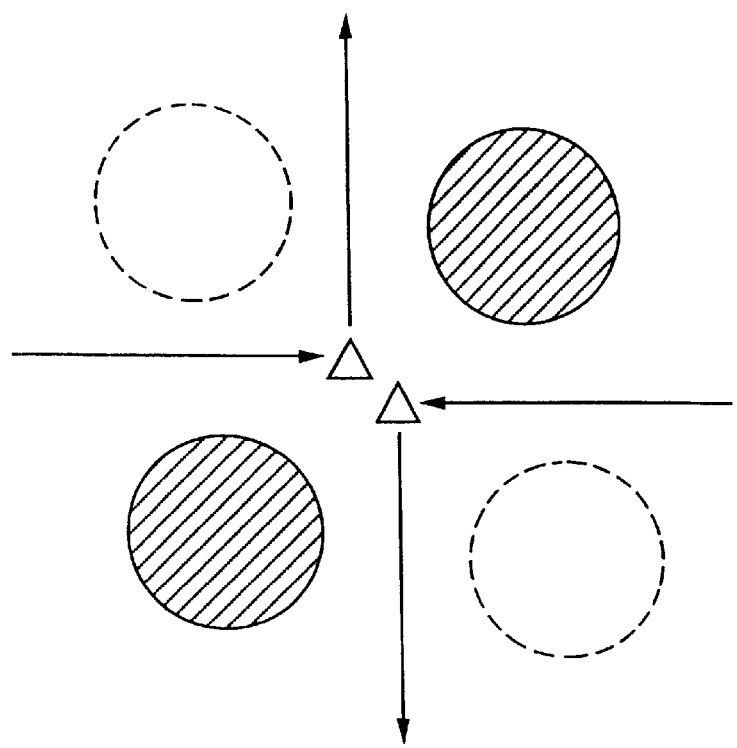
FIGS. 42A to 42C are views for explaining a problem.
Figure 42B:
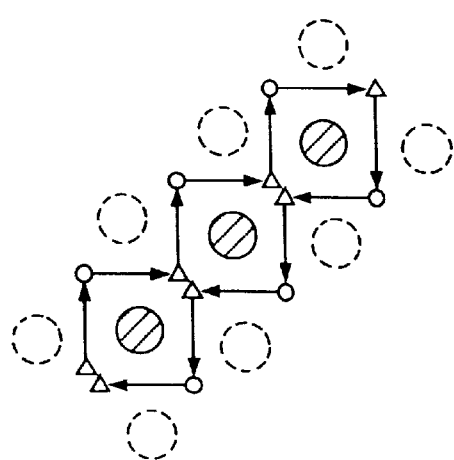
Figure 42C:
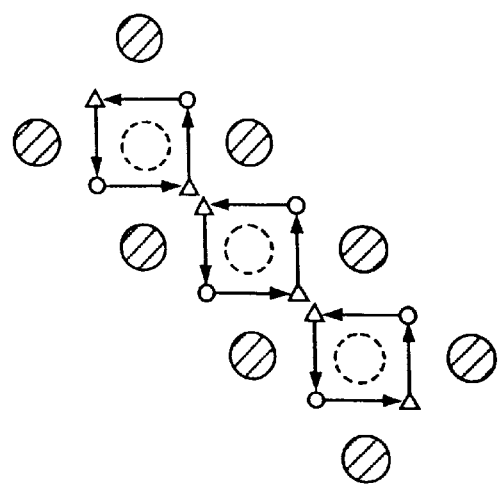

For example, black pixels which are continuous in an oblique direction, like those shown in FIG. 42A, are not handled as independent points but are handled as part of a continuous shape constituted by the black pixels, and smoothing/magnifying processing is performed. For this reason, for example, as shown in FIG. 42B, an oblique black line having a width corresponding to one pixel can maintain its shape as a line of an original image even after smoothing/magnifying processing, as shown in FIG. 42B. If, however, white pixels are obliquely continuous with each other on a black background, as shown in FIG. 42C, since adjacent black pixels are handled as a continuous portion, the white pixels are separated from each other and regarded as independent white points. For this reason, the shape constituted by the white pixels as a white line cannot be maintained after smoothing/magnifying processing.

As described above, if a portion where pixels are arranged such that diagonally positioned pixels have the same color and adjacent pixels have different colors, i.e., a portion where pixels are arranged in a checkered pattern, is processed as a portion where black pixels are continuous, white pixels which should be continuous are separated from each other upon smoothing/magnifying processing. For this reason, an original image may be lost upon smoothing/magnifying processing. The apparatus of this embodiment can solve such a problem.

Figure 43:
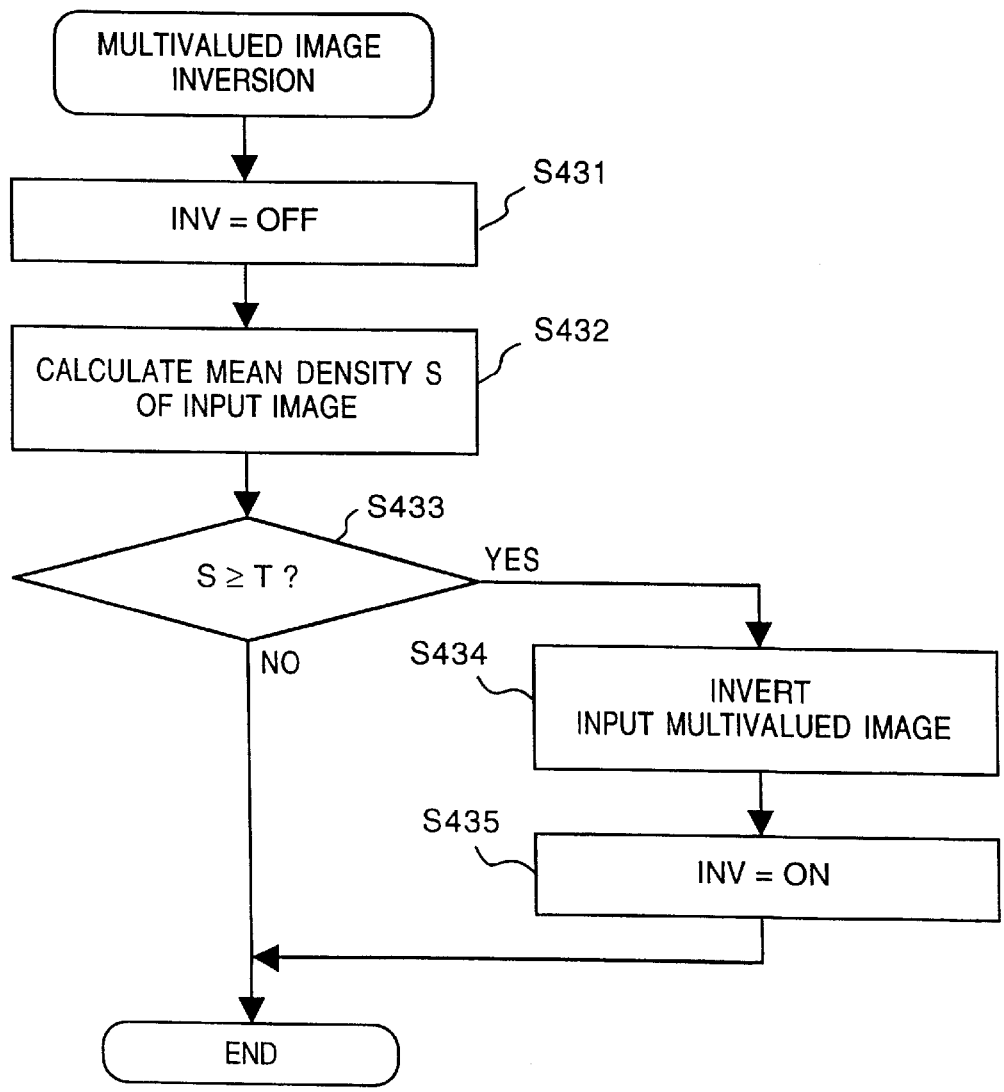
FIG. 43 is a flowchart showing processing in a multivalued image inverting unit in the seventh embodiment.

In step S431 of FIG. 43, an inversion flag INV is turned off. In step S432, a mean density S of an input image is calculated. For example, letting f be the input image (a size n in the main scanning direction; a size m in the subscanning direction; a maximum density L) and f(x,y) be the density value at coordinates (x,y), then the mean density S can be given by the following equation:

$$S = \{\Sigma x \Sigma y f(x,y)\}/(n \times m) \quad (6)$$

(where $x=0, 1, \ldots, n-1; y=0, 1, \ldots, m-1$)

In step S433, the mean density S obtained in step S432 is compared with a given threshold T. If the mean density S equal to or higher than the threshold T, the flow advances to step S434 to invert the input multivalued image P20. If an inverted multivalued image is represented by f', then the inverted image is generated as follows:

$$f'(x,y) = L - f(x,y) \quad (7)$$

In step S435, the inversion flag INV is turned on. If it is determined in step S433 that the mean density S is lower than the threshold T, the input image P20 is output without any modification.

Equidensity Curve Smoothing/Magnifying Processing

The equidensity curve smoothing/magnifying unit 4113 in FIG. 41 receives the multivalued image P21 output from the multivalued image inverting unit 4112, generates a raster scanning type binary image data group corresponding to the respective density levels, and extracts contour-shaped vector data from each binary image. This data is an equidensity curve serving as the contour of an area having a uniform density. Since this equidensity curve is vector data, it not only represents a contour line but also allows to discriminate which side of the equidensity curve is a black area, i.e., which side has a density higher than the density indicated by the equidensity curve. These contour vectors are smoothed/magnified. The equidensity curve vector data P22 having undergone such smoothing/magnifying processing is output.

Figure 44:
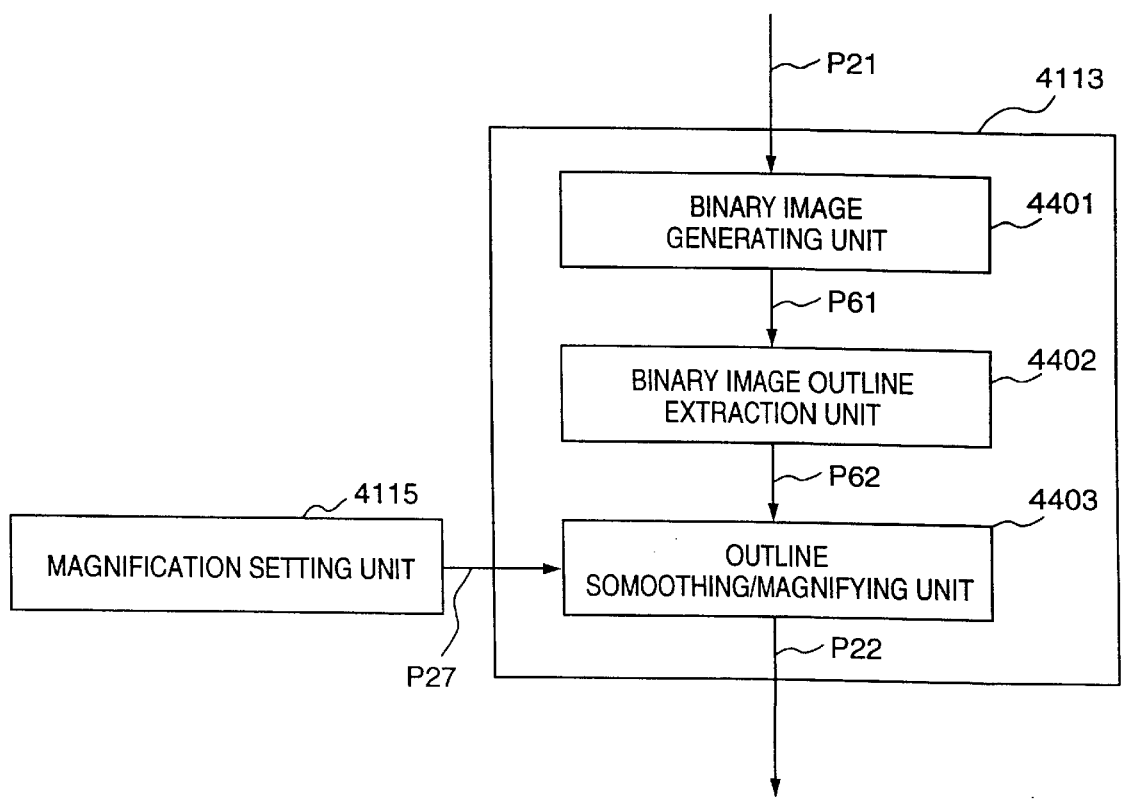
FIG. 44 is a block diagram showing an equidensity curve smoothing/magnifying unit in the seventh embodiment.

FIG. 44 shows the detailed arrangement of the equidensity curve smoothing/magnifying unit 4113 in FIG. 41. Reference numeral 4401 denotes a binary image generating unit for generating a raster scanning type binary image data group P61 corresponding to the respective density levels from the multivalued image data P21 output from the multivalued image inverting unit 4112; 4402, a binary image outline extraction unit for extracting contour-shaped vector data from the entire raster scanning type binary image data group P41 generated by the binary image generating unit 4401, and generating a binary image outline vector data group P62; and 4403, an outline smoothing/magnifying unit for receiving the binary image outline vector data group P62 extracted by the binary image outline extraction unit 4402 and the magnification P27 set by the magnification setting unit 4115, performing smoothing/magnifying processing for the binary image outline vector group P62 in the vector data form, and outputting the smoothed/magnified binary image outline vector data group P22. The equidensity curve smoothing/magnifying unit 4113 generates a binary image for each density level, extracts contour-shaped vectors from the image, and smoothes/magnifies the extracted outline vectors. This processing is equivalent to extracting equidensity curve vector data from a multivalued image, and smoothing/magnifying the data.

Figure 45:
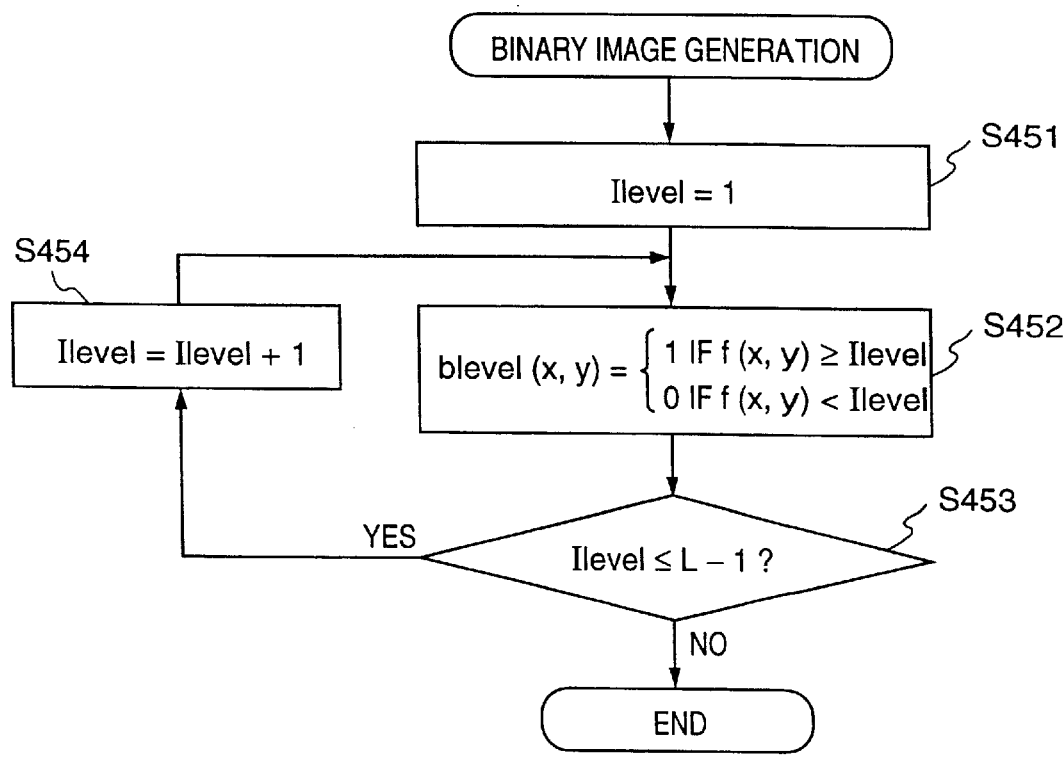
FIG. 45 is a flowchart for explaining generation of binary images in the seventh embodiment.

FIG. 45 shows the flow of processing in the binary image generating unit 4401. A binary image is generated for each gradation level by using the digital multivalued image data P21 input in the raster scanning form in accordance with the flow of processing in FIG. 45. Let f be the input multivalued image (a size n in the main scanning direction; a size m in the subscanning direction), and f(x,y) be the pixel value at coordinates x and y in the main scanning and subscanning directions. The number of gradation levels of the multivalued image is represented by L. The number L of gradation levels of a multivalued image consisting of 8-bit pixels is 256.

In step S451, a variable Ilevel representing the current gradation level is set to "1". In step S452, a binary image blevel (a size n in the main scanning direction; a size m in the subscanning direction) is generated such that 1 (black pixel) is set if f(x,y)≧Ilevel, and 0 (white pixel) is set if f(x,y)<Ilevel. If it is determined in step S453 that Ilevel is equal to or lower than (L−1), the flow advances to step S454 to add "1" to Ilevel. The flow then returns to step S452. If Ilevel is higher than (L−1), this processing is terminated. The binary image group P61 corresponding to the respective gradation levels in FIG. 44 is output in accordance with this flow of processing.

The binary image outline extraction unit 4402 and the outline smoothing/magnifying unit 4403 in FIG. 44 can be realized by the technique disclosed in Japanese Patent Laid-Open No. 5-174140. More specifically, the binary image outline extraction unit 4402 receives the binary image group P61 generated by the binary image generating unit 4401, and extracts a binary image outline vector data group (coarse contour vectors), i.e., the multivalued image equidensity curve vector data P62. The outline smoothing/magnifying unit 4403 generates outline vectors by smoothly magnifying the extracted equidensity curve vector data P62 at a desired (arbitrary) magnification designated by the magnification P27 in the form of the outline vector expression, and outputs the smoothed/magnified equidensity curve outline vector data P22.

Multivalued Image Reproduction

Figure 46:
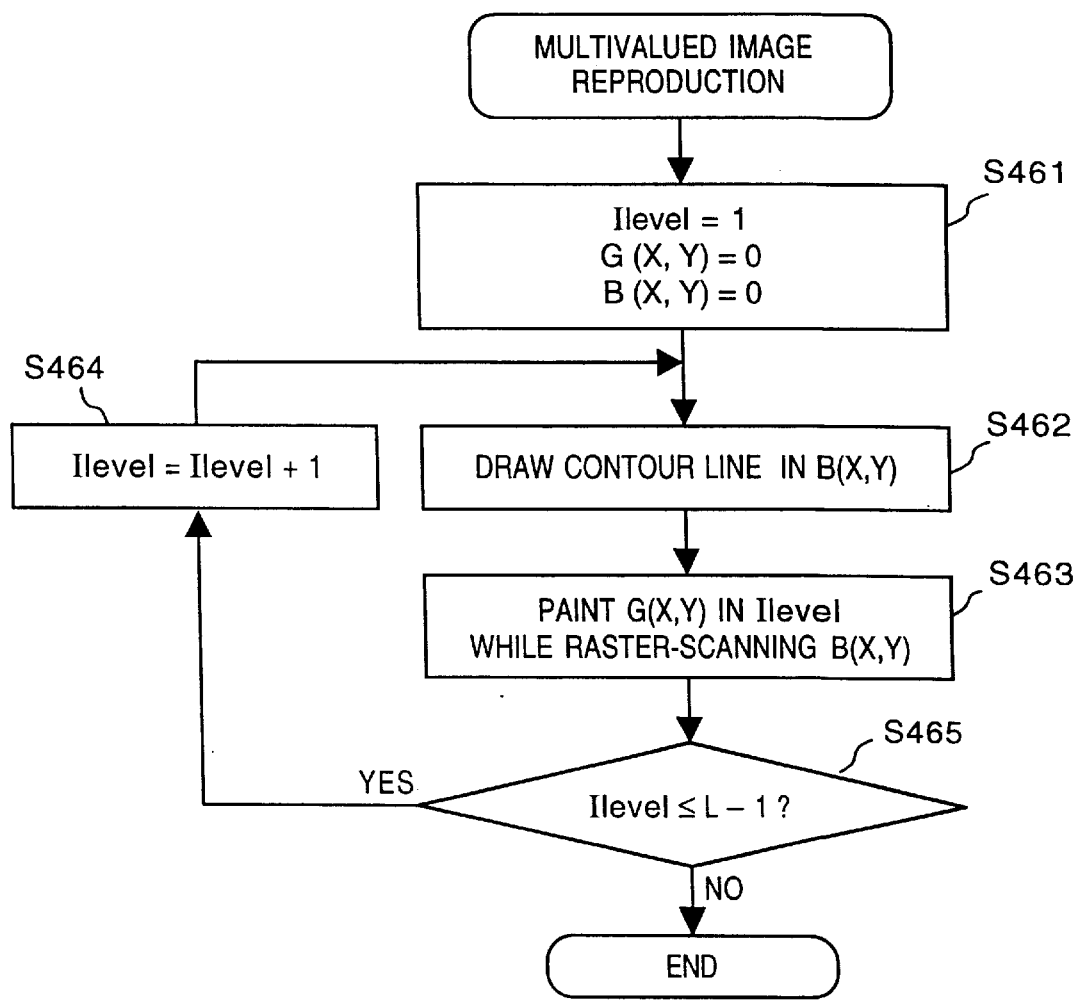
FIG. 46 is a flowchart for explaining generation of a multivalued image in the seventh embodiment.

The multivalued image reproduction unit 4114 in FIG. 41 will be described next. This unit can be constituted by using the device disclosed in, e.g., Japanese Patent Laid-Open No. 5-20467 previously proposed by the assignee of the present application. FIG. 46 shows the flow of processing in this unit. First of all, in step S461, a variable Ilevel representing a density level is set to "1", and a binary image buffer B and a multivalued image buffer G (a size X in the main scanning direction; a size Y in the subscanning direction) are initialized. In step S462, an equidensity curve corresponding to the density value indicated by Ilevel is drawn in the binary image buffer B. In step S462, a multivalued image is reproduced by using the drawn equidensity curve. More specifically, the binary image buffer B is raster-scanned. When the scanning line intersects the equidensity curve an odd number of times, painting in the multivalued image buffer G is started in the density value indicated by Ilevel from the same coordinates as those in the binary image buffer B. When the scanning line intersects an even number of times, painting is stopped at the same coordinates as those in the binary image buffer B. In raster-scanning the binary image B, pixels (black pixels) which intersect the equidensity curve are changed into white pixels. With this operation, the binary image buffer is initialized while being raster-scanned. Therefore, the binary image buffer B need not be initialized every time processing in a given density level is performed.

As described above, only an equidensity curve corresponding to a given density level is drawn into a binary image, and a multivalued image is reproduced by using this image. Therefore, a multivalued image can be reproduced at a higher speed than that in reproduction of a multivalued image after the entire area enclosed with an equidensity curve drawn into a binary image is painted.

Density Smoothing Processing

Figure 47:
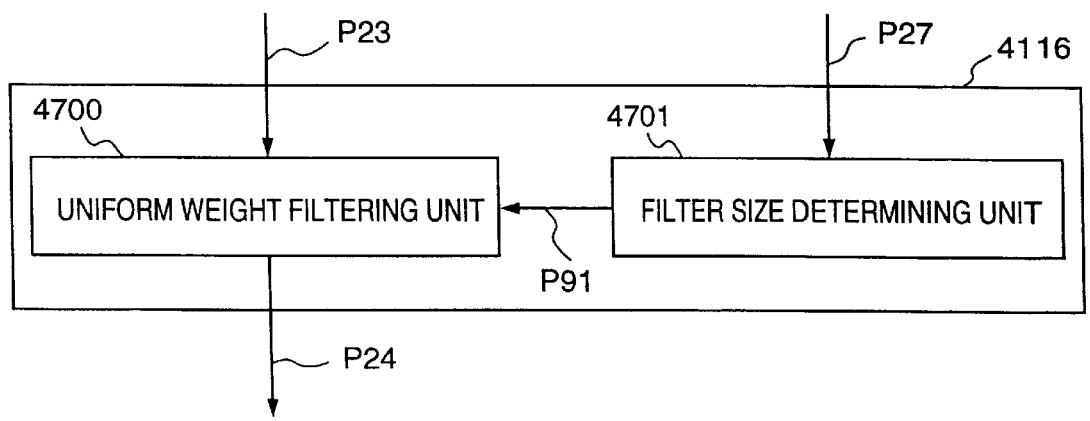
FIG. 47 is a block diagram showing a density smoothing unit in the seventh embodiment.

FIG. 47 shows the arrangement of the density smoothing unit 4116 in FIG. 41. The density smoothing unit 4116 is constituted by a uniform weight filtering unit 4700 and a filter size determining unit 4701. The filter size determining unit 4701 receives the magnification P27 obtained from the magnification setting unit 4115 in FIG. 41, and outputs a filter size P91. The uniform weight filtering unit 4700 receives the output image P23 from the multivalued image reproduction unit 4114 in FIG. 41 and the filter size P91 output from the filter size determining unit 4701, and outputs the multivalued image P24 having finally undergone density smoothing processing. The uniform weight filtering unit 4700 is a known technique described in, e.g., Tamura, "Introduction to Computer Image Processing" Souken Shuppan, and generally used to remove noise. An outline of this processing is the same as that in the first embodiment. A filter size is determined by the same method as in other embodiments.

More specifically, filtering processing is performed by using a uniform filter like the one shown in FIG. 9 which is determined in accordance with a magnification according to equation (3) in the first embodiment to smooth densities. FIG. 10 schematically shows this density smoothing processing.

Re-inversion of Image

Figure 48:
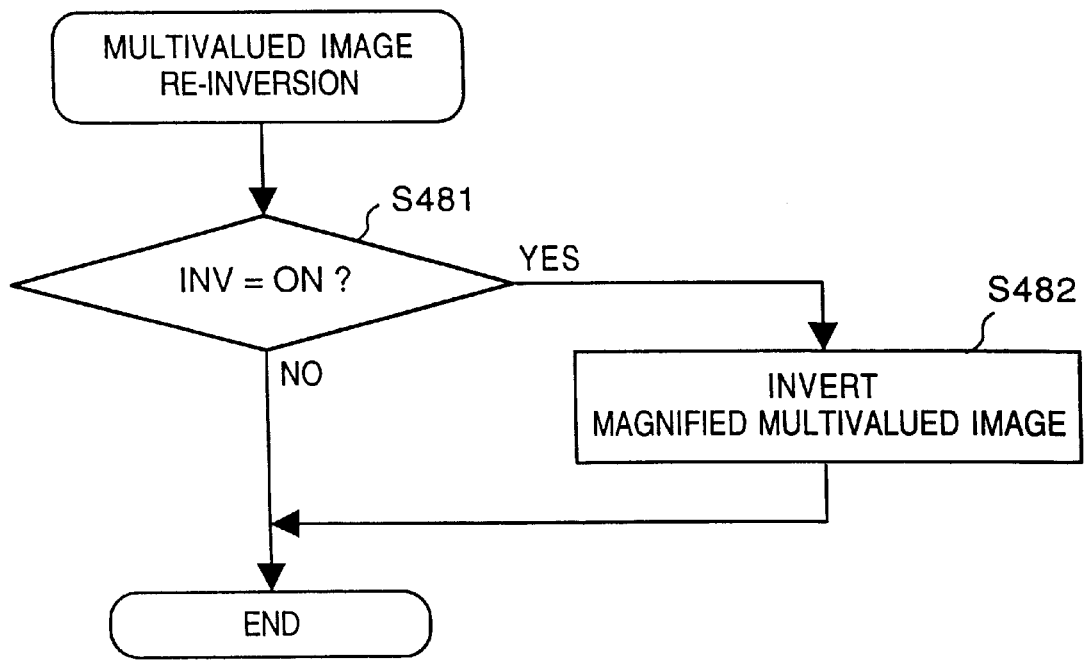
FIG. 48 is a flowchart showing processing in a multivalued image re-inverting unit in the seventh embodiment.

FIG. 48 shows the flow of processing in the multivalued image re-inverting unit 4117 in FIG. 41. The multivalued image re-inverting unit 4117 receives the inversion flag INV set by the multivalued image inverting unit 4112 and the multivalued image P24 density-smoothed by the density smoothing unit 4116. FIG. 48 is a flowchart showing a procedure for processing performed by the multivalued image re-inverting unit 4117.

In step S481, it is checked whether the input inversion flag INV is turned on or off. If the flag is turned on, i.e., the input image is inverted before processing, the flow advances to step S482 to re-invert and output the density-smoothed multivalued image P24. Letting F be a density-smoothed image P25 (a size N in the main scanning direction; a size M in the subscanning direction; a maximum density L), and F(x,y) be the density at coordinates (x,y), then an inverted image F' is given by $$F'(x,y)=L-F(x,y) \qquad (8)$$

(where $x=0, 1, \ldots, N-1$; $y=0, 1, \ldots, M-1$)

If the flag is turned off, the density-smoothed multivalued image P25 is output without any modification.

In this manner, an input multivalued image can be magnified/smoothed and output.

As described above, in performing multivalued image magnifying processing of smoothing/magnifying an equidensity curve shape and performing density smoothing, an input image is temporarily inverted depending on the characteristics of the image, i.e., whether its mean density is higher than a predetermined threshold. With this operation, even an image having white pixels coupled to each other in an oblique direction can be magnified/smoothed faithfully with respect to the original image. Therefore, a high-quality multivalued image smoothed in a desired manner can be obtained from any multivalued image.

In this embodiment, since an equidensity curve is smoothed while the black pixels of a binary image corresponding to each density level are considered as continuous pixels, an image having a density equal to or higher than a predetermined threshold is inverted. Assume that contour vector extraction and smoothing are performed while the white pixels of a binary image corresponding to each gradation level are regarded as continuous pixels, i.e., obliquely arranged black pixels are separated from each other by white areas. In this case, a criterion for determining inversion is reversed to invert the density of an input multivalued image when its mean density is lower than a predetermine threshold, thereby obtaining the same effect as that in the above embodiment.

First Modification

In the seventh embodiment, in the multivalued image inverting unit 4112 in FIG. 41, i.e., in step S432 in the flow of processing in FIG. 43, the mean density S of the input multivalued image P20 is obtained by using the densities of all the pixels of the input multivalued image (equation (6)). However, such an arrangement need not always be used. More specifically, an input image may be thinned out, and the mean density (S') of the resultant image may be used. Letting c (c≧1) be the thinning ratio, then $$S'=c^2\{\Sigma x \Sigma y f(x,y)\}/(n \times m) \qquad (9)$$

(where $x=0, c, 2c, \ldots, c \times [n/c]-1$; $y=0, c, \ldots, c \times [m/c]-1$; $[a]$ represents chopping of $a$.)

The time required to obtain a mean density by thinning out an input image is shorter than that required to obtain a mean density using all pixels.

Second Modification

Figure 49:
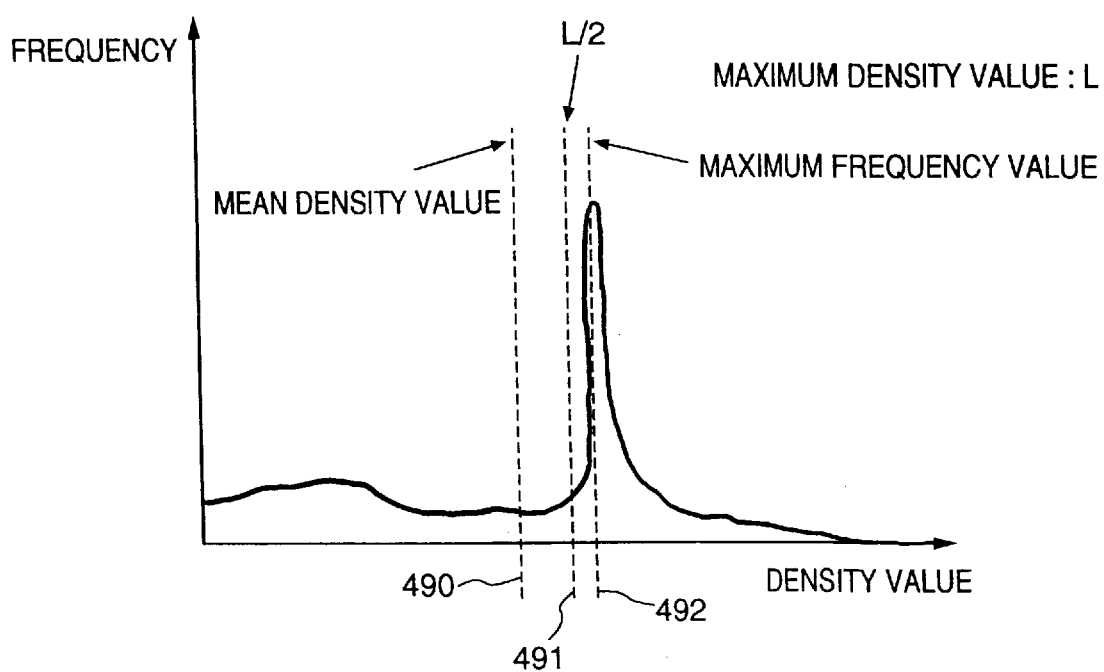
FIG. 49 is a graph for explaining a modification of the seventh embodiment.

In this embodiment, the multivalued image inverting unit 4112 in FIG. 41 uses a mean density as a criterion for inversion. However, the present invention is not limited to this. For example, in an image exhibiting a density distribution (the ordinate: frequency; the abscissa: density) like the one shown in FIG. 49, a dotted line 490 indicates a mean density. If the mean density of input image densities is used as a criterion S in step S433 in FIG. 43, and threshold T=L/2 (indicated by a dotted line 491 in FIG. 49; L=maximum density value), then S<T. Processing is therefore performed without inverting this input image. If, however, the density with the maximum frequency (a dotted line 492 in FIG. 49) is given as an image density S used as a criterion in step S432, and threshold T=L/2, then S>T in step S433. Inversion processing is therefore performed with respect to the input image.

As a criterion for determining inversion processing, therefore, a value in which even the state of a density distribution is reflected can be used instead of a simple mean value, and the characteristics of an input image can be determined more accurately, thereby obtaining a better magnification result.

In addition to a maximum frequency, a statistical value such as a median can be used as a criterion in the multivalued image inverting unit 4112.

Figure 54:
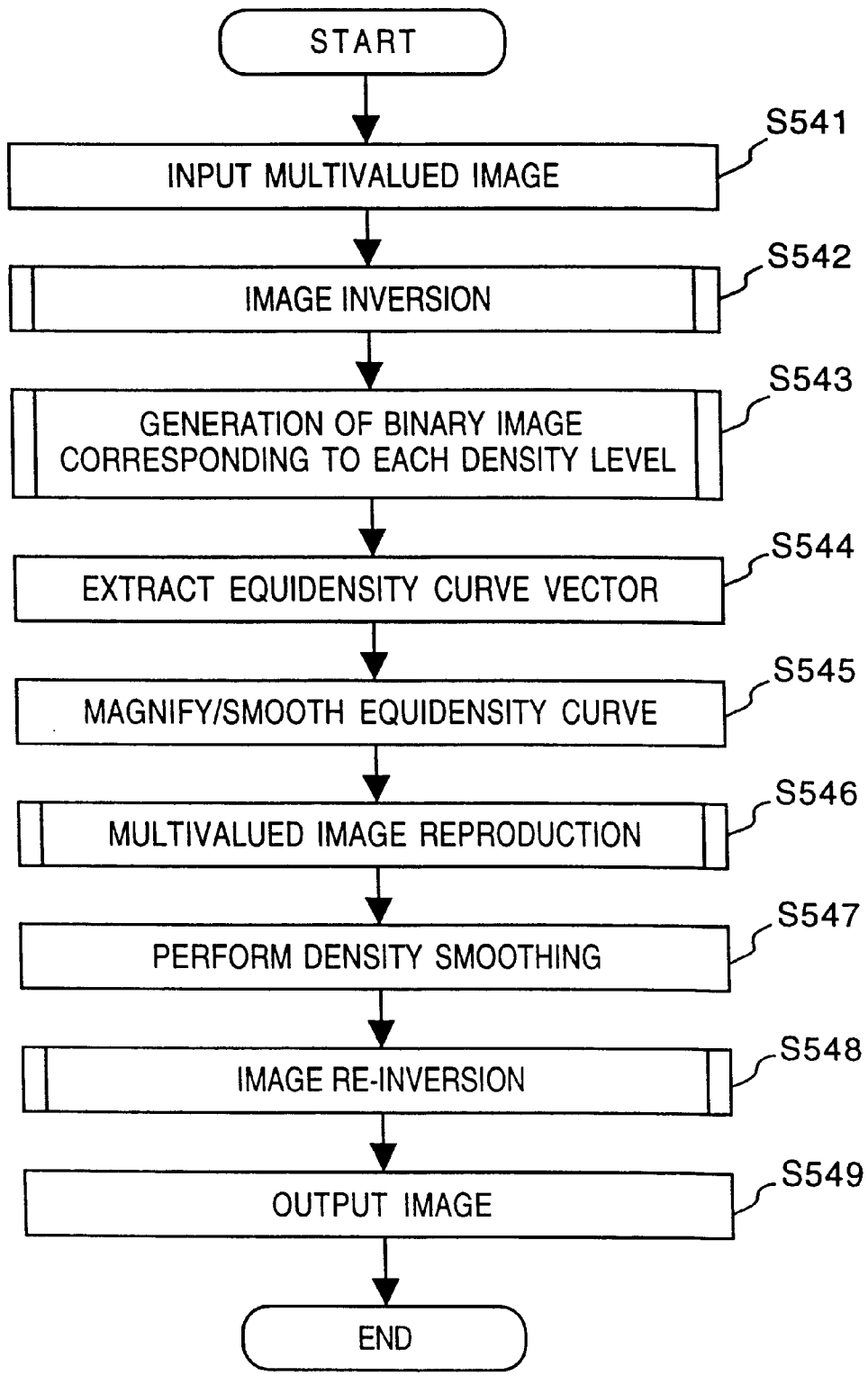
FIG. 54 is a flowchart showing programs for realizing the seventh embodiment.

FIG. 54 is a flowchart showing programs to be executed by the central processing unit 26 in FIG. 2 to realize the seventh embodiment.

In step S541, a multivalued image is input through the input device 21. In step S542, the image is inverted as needed. This procedure is the same as that shown in FIG. 43. In step S543, a binary image is generated from the multivalued image for each density level. This procedure is the same as that shown in FIG. 45. In step S544, outline vectors, i.e., equidensity curve vectors, are extracted from each binary image. In step S545, the extracted equidensity curve vectors are magnified/smoothed. The processing in steps S544 and S545 is performed by the technique disclosed in Japanese Patent Laid-Open No. 5-174140.

In step S546, a multivalued image is reproduced in accordance with the procedure shown in FIG. 46. The image is density-smoothed. Thereafter, the image is inverted in step S548 in accordance with the procedure shown in FIG. 48.

Finally, in step S549, the image is output.

Eighth Embodiment

Figure 50:
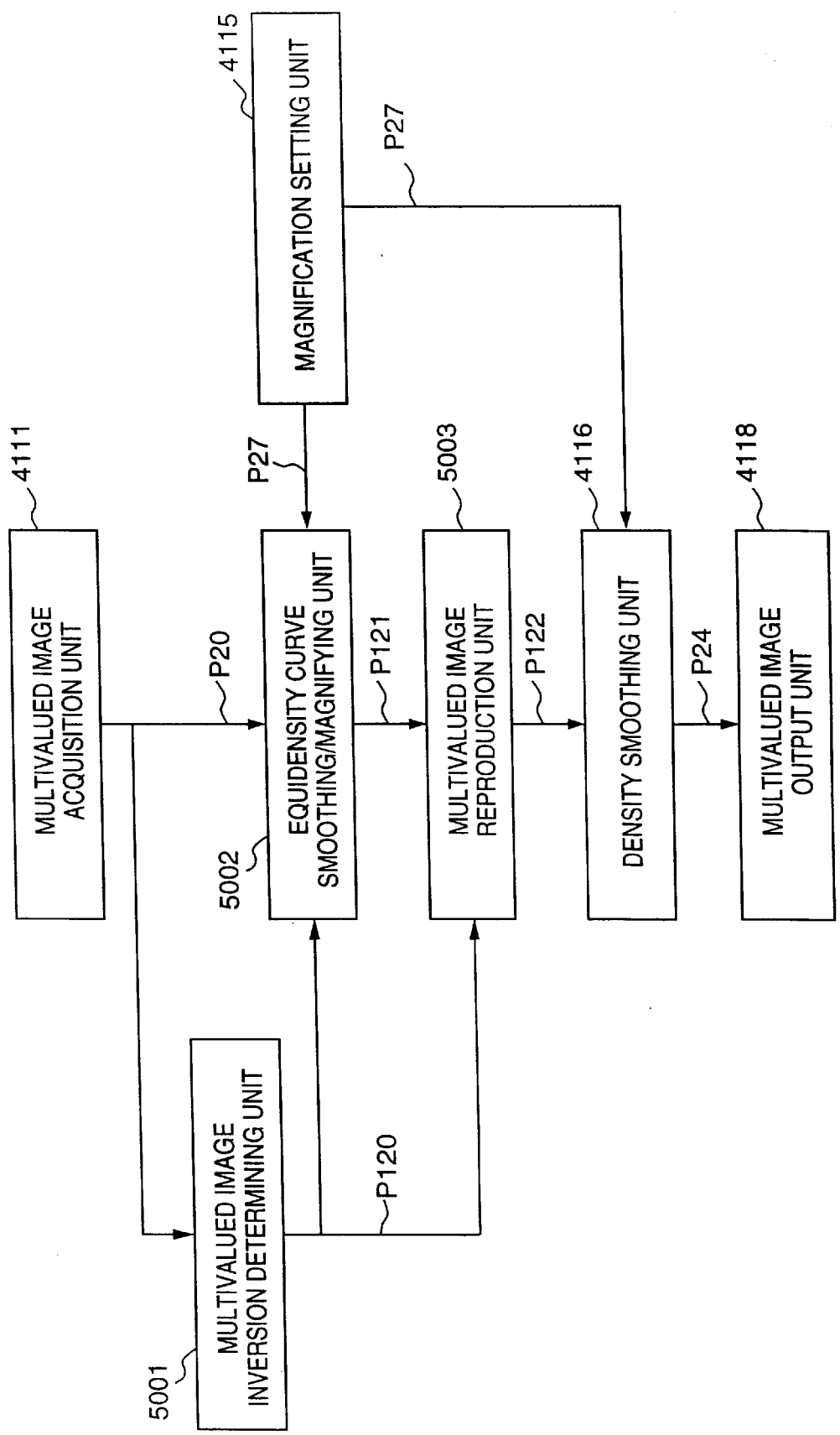
FIG. 50 is a block diagram showing the arrangement of the eighth embodiment.

In the seventh embodiment, an input image is output after being inverted by the multivalued image inverting unit 4112, or without any modification, by using some criterion. With this operation, the apparatus can handle any multivalued images. However, another arrangement may be used. FIG. 50 shows such an arrangement. More specifically, a multivalued image inversion determining unit 5001 only determines on the basis of the characteristics of an input image whether to invert the image, and an equidensity curve smoothing/magnifying unit 5002 changes the rule of generating a binary image (step S452 in FIG. 45). With this arrangement, the same effect as that obtained by inverting an input multivalued image can be obtained.

Figure 51:
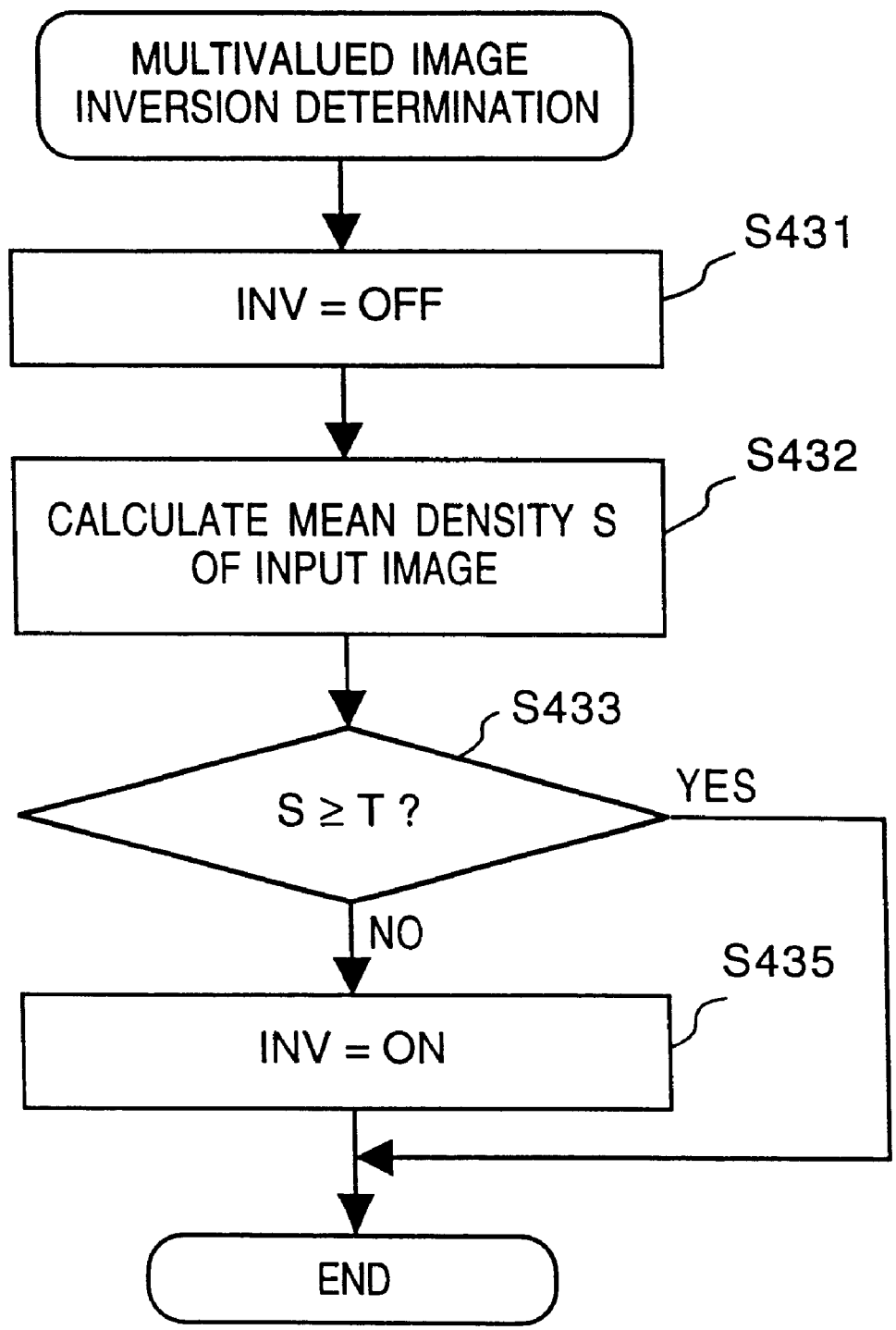
FIG. 51 is a flowchart showing multivalued image inversion determining processing in the eight embodiment.
Figure 52:
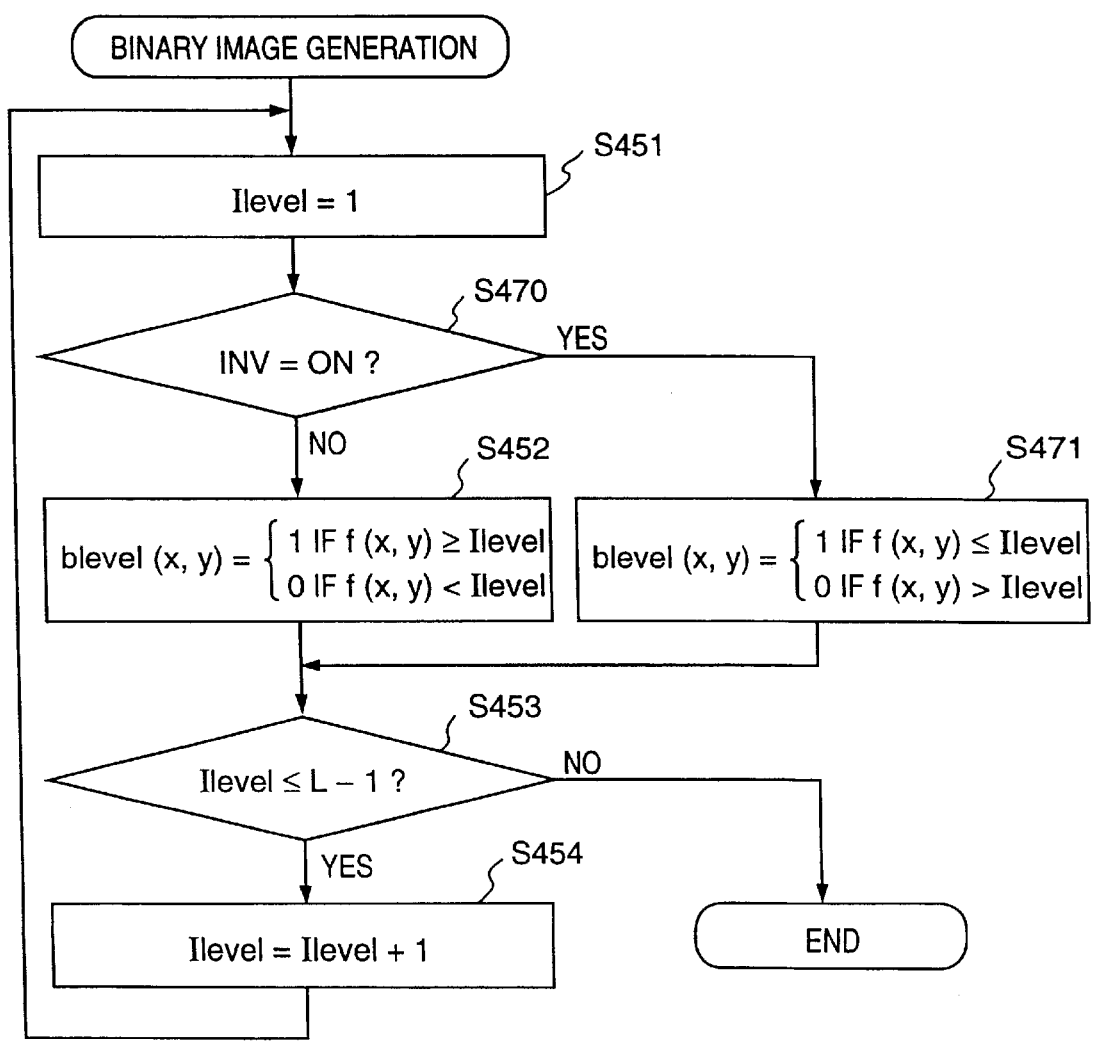
FIG. 52 is a flowchart showing a binary image generating operation in the eighth embodiment.

FIG. 51 shows the procedure for processing performed by the multivalued image inversion determining unit 5001 in this case. FIG. 52 is a flowchart showing a binary image generating operation performed by the equidensity curve smoothing/magnifying unit 5002.

FIG. 51 shows a procedure from which step S434 in FIG. 43 is omitted. In this procedure, if a mean density S of an input image is higher than T=L/2, an inversion flag INV is turned on.

In the processing shown in FIG. 52, binary images corresponding to the respective density levels are generated while binary images are inverted in accordance with the flag INV. More specifically, if the flag INV is turned off, a pixel having a density higher than a target density value is set to "1" in step S452. If, however, the inversion flag INV is turned on, a pixel having a density lower than the target density level is set to "1" in step S471. With this operation, while binary images are produced, inverted images can be generated as needed.

Figure 53:
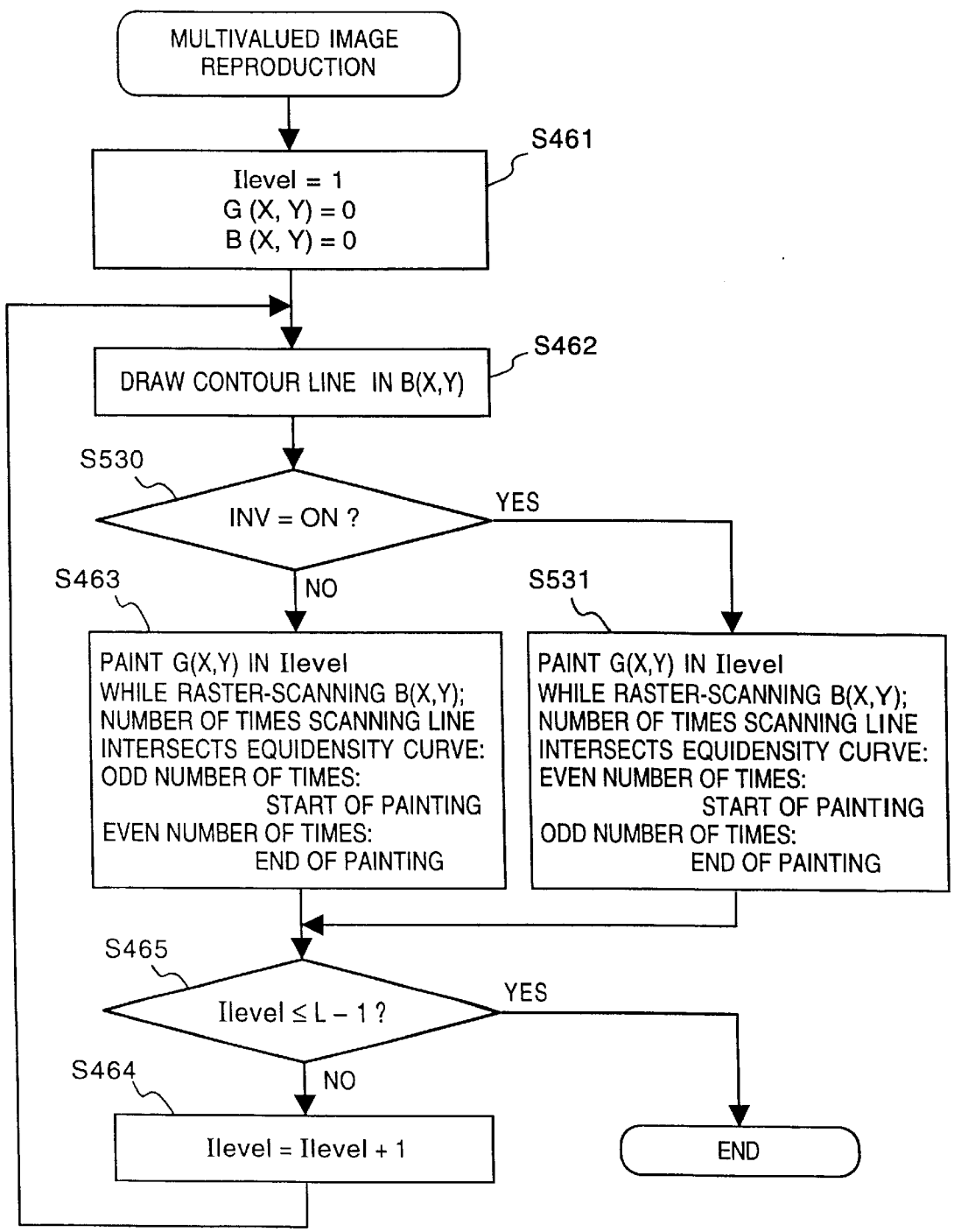
FIG. 53 is a flowchart for explaining multivalued image reproduction processing in the eighth embodiment.

In accordance with this operation, a multivalued image reproduction unit 5003 for reproducing a multivalued image from equidensity curve vectors restores inverted images while reproducing images. FIG. 53 is a flowchart showing this processing.

Referring to FIG. 53, the contour line of a binary image corresponding to a target gradation is drawn in a binary image buffer B (step S462). While the binary image buffer B is scanned, writing of a pixel represented by a variable Ilevel is started/stopped from/at a position in a multivalued image buffer G which corresponds to the buffer B which is being scanned, every time the contour line intersects the scanning line. Similar to the procedure in FIG. 46, a condition for starting/stopping a writing operation is set such that when the inversion flag INV is OFF, no pixel is written when scanning is started, a writing operation is started when the contour line intersects the scanning line an odd number of times, and the writing operation is stopped when the contour line intersects the scanning line an even number of times (step S463).

When the inversion flag INV is ON, a writing operation is started from the start of a scanning operation. When the contour line intersects the scanning line an odd number of times, the writing operation is stopped. When the contour line intersects the scanning line an even number of times, a writing operation is started (step S531). With this operation, an image can be inverted as needed at the same time a multivalued image is reproduced.

With these operations, an increase in processing speed and a reduction in memory capacity can be attained.

The apparatus of this embodiment can also applied to a video printer for converting data from a TV set into multivalued image data, and outputting an image output on the basis of the converted multivalued image data.

Figure 55:
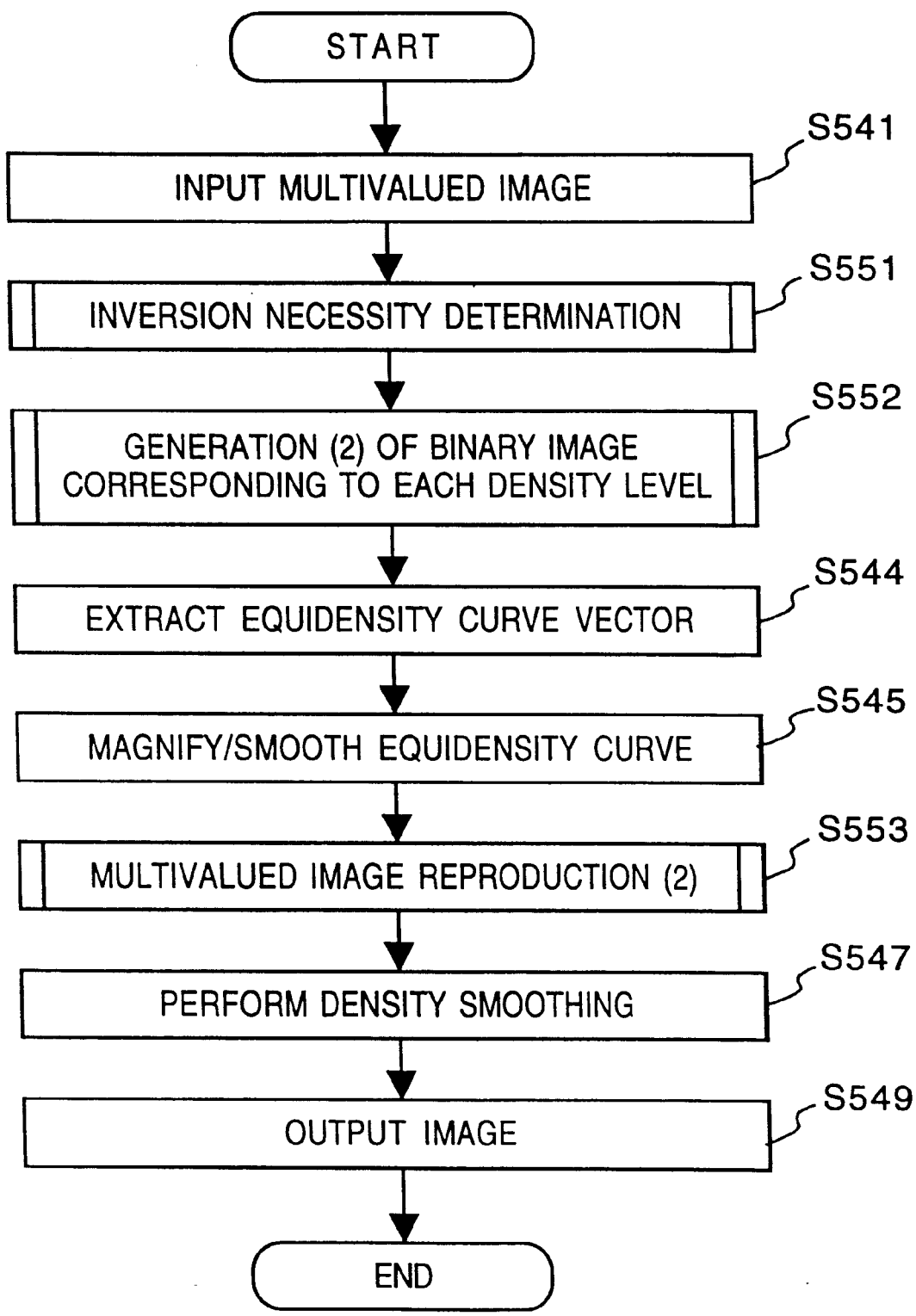
FIG. 55 is a flowchart showing programs for realizing the eighth embodiment.
Figure 56:
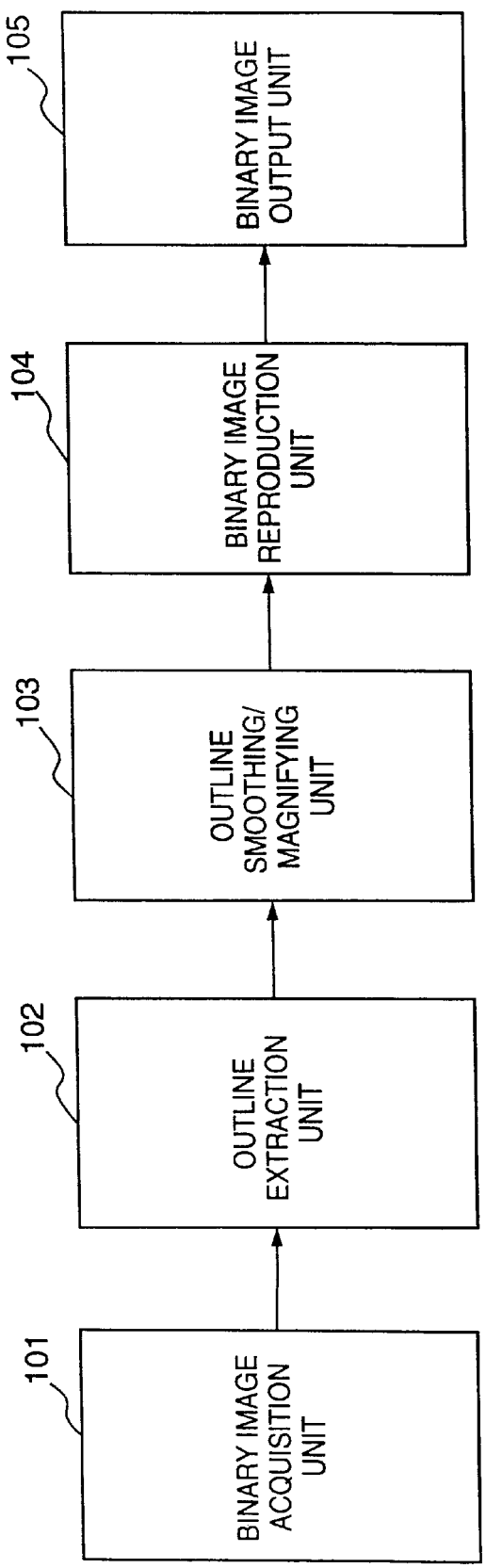
FIG. 56 is a block diagram showing the overall arrangement of an apparatus previously proposed by the assignee of the present application.
Figure 57B:
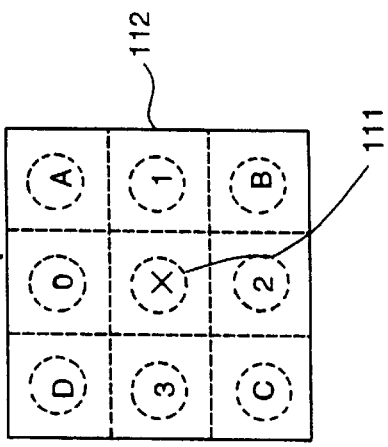
FIG. 57 is a view showing a scanning direction in extracting contour vectors from a binary image in a technique previously proposed by the assignee of the present application.
Figure 57A:
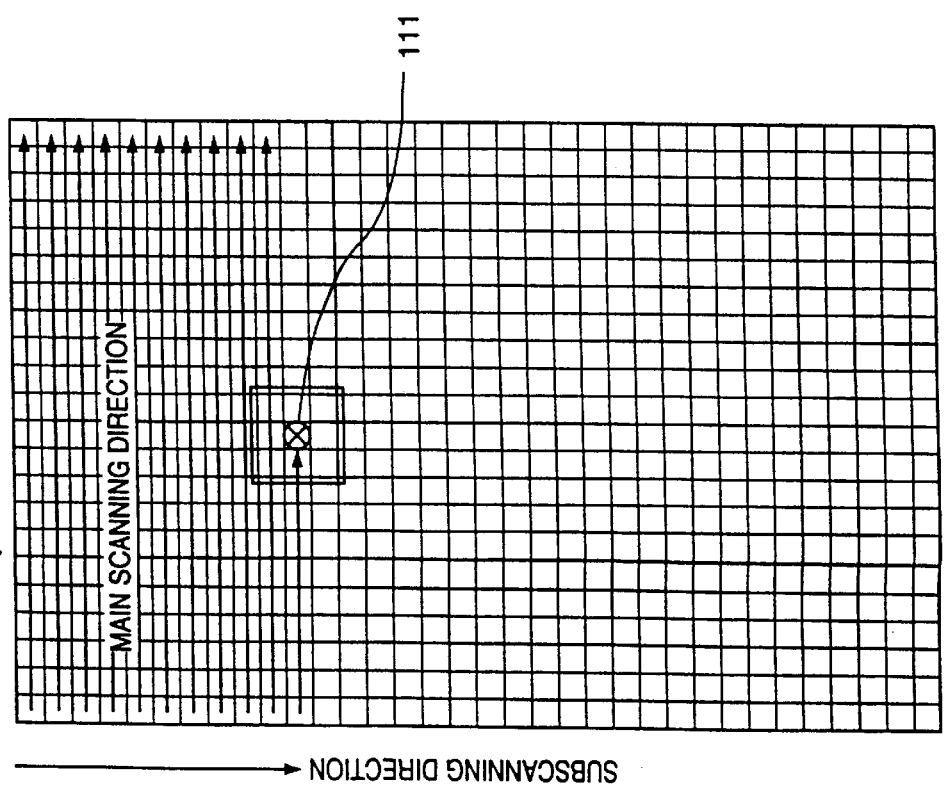
Figure 58A:
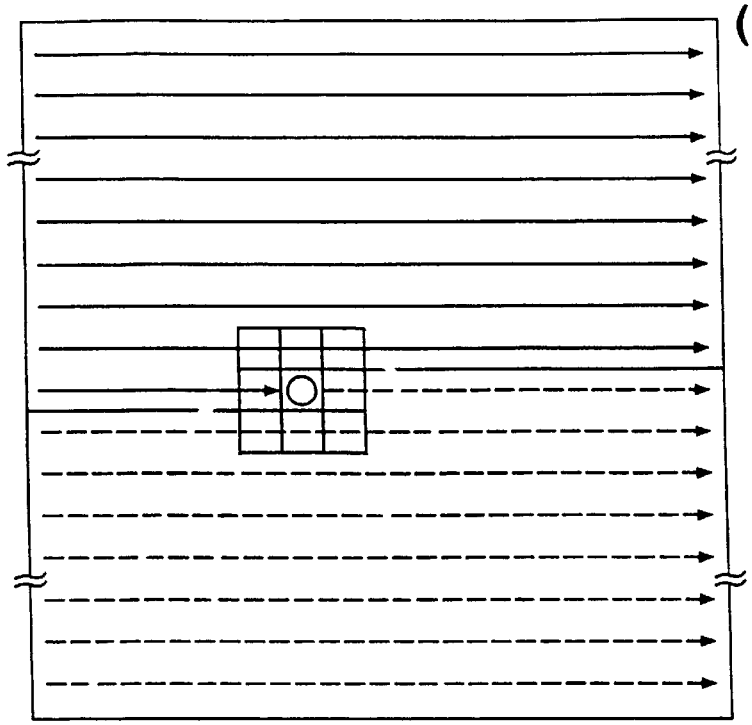
FIG. 58 us a view for explaining the principle of a previously proposed technique of extracting contour vectors.
Figure 58B:
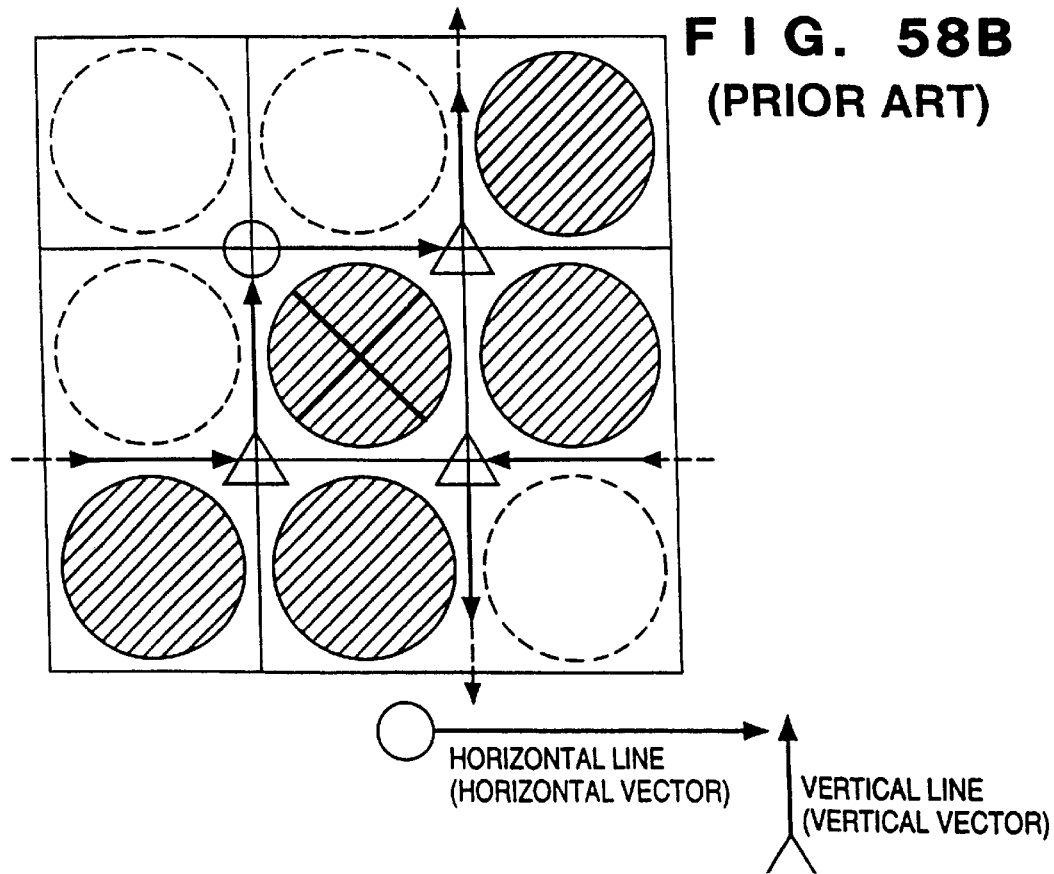
Figure 59:
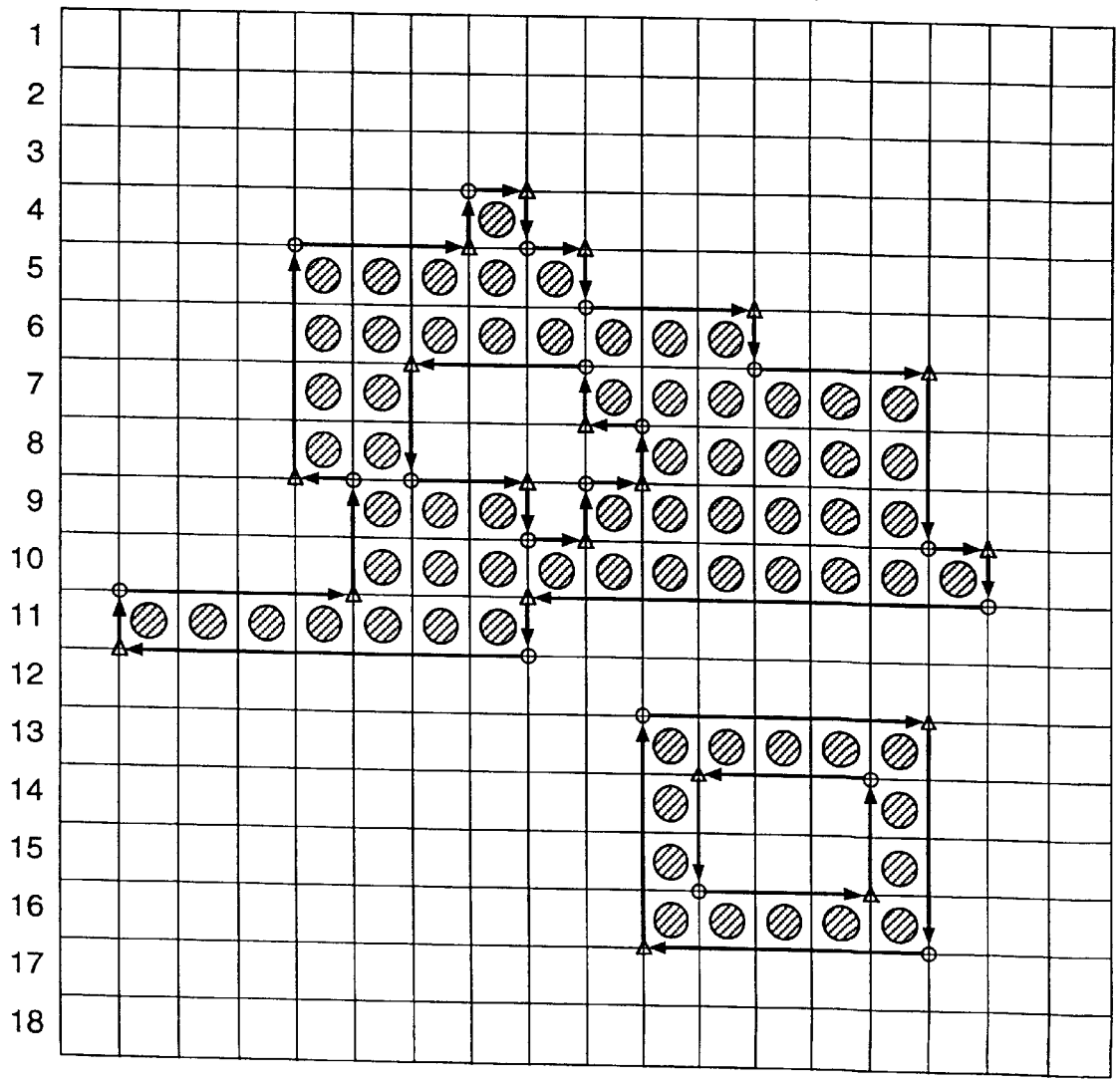
FIG. 59 is a view showing the relationship between a binary image and contour vectors in the previously proposed technique.
Figure 60:
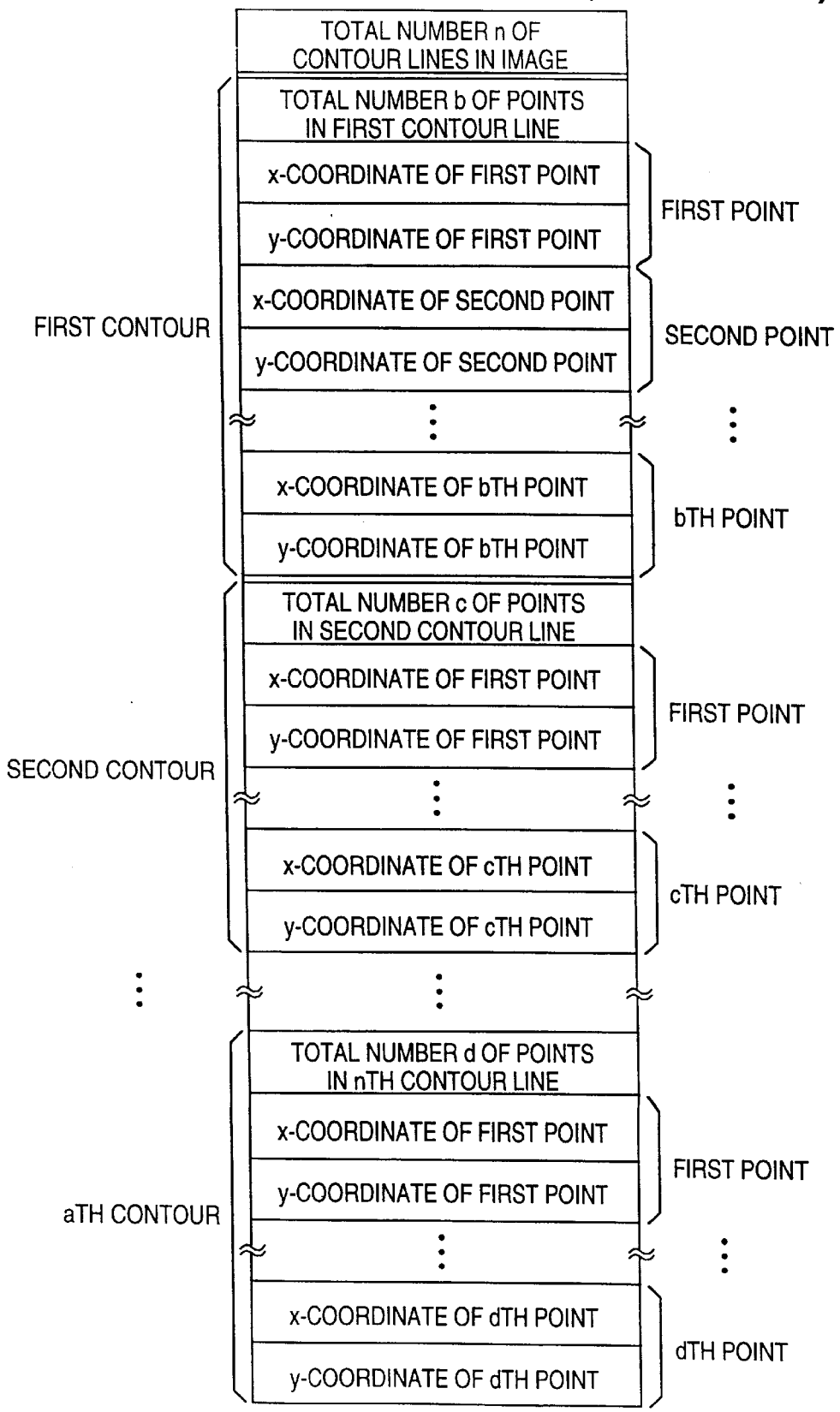
FIG. 60 is a view showing the format of extracted contour vector data in the previously proposed technique.
Figure 61:
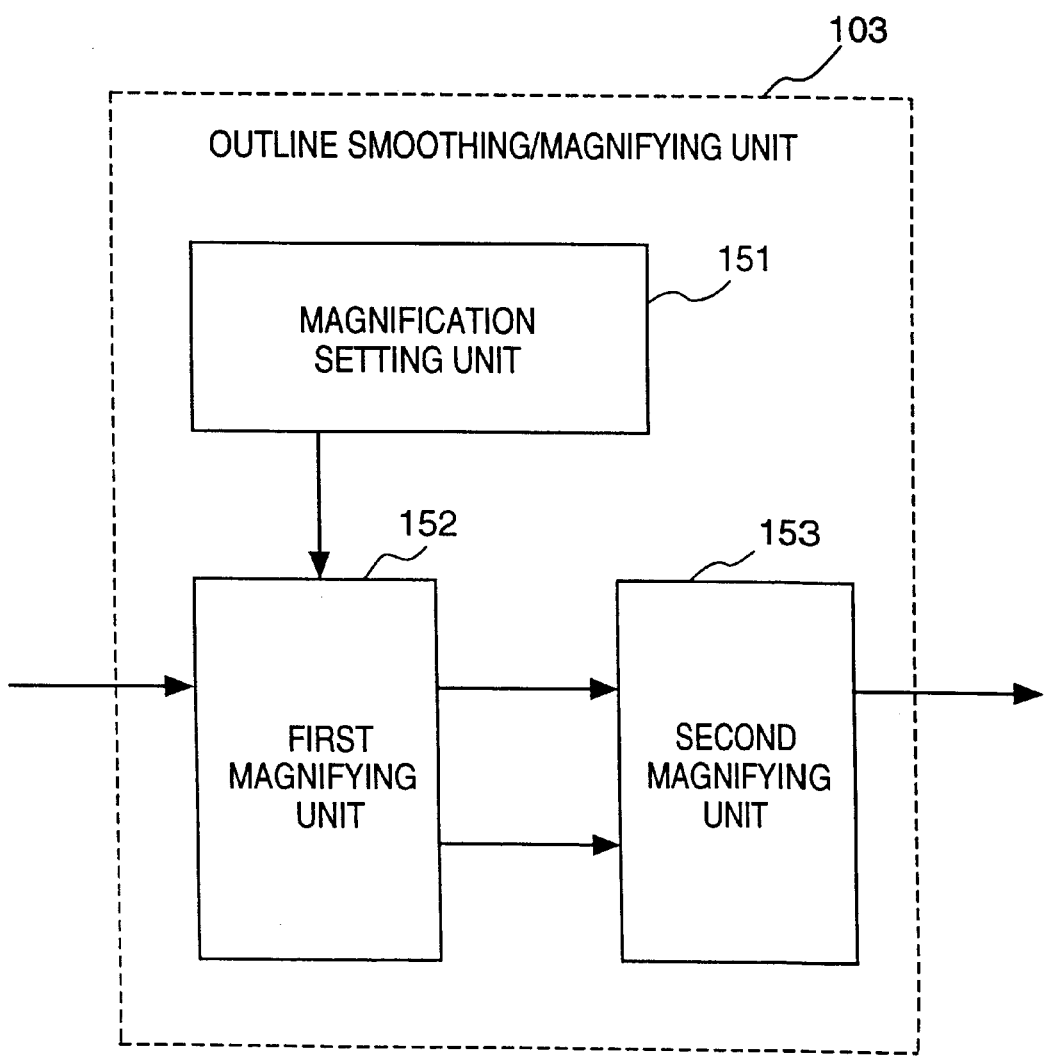
FIG. 61 is a block diagram showing the arrangement of a smoothing/magnifying unit in the previously proposed technique.
Figure 62:
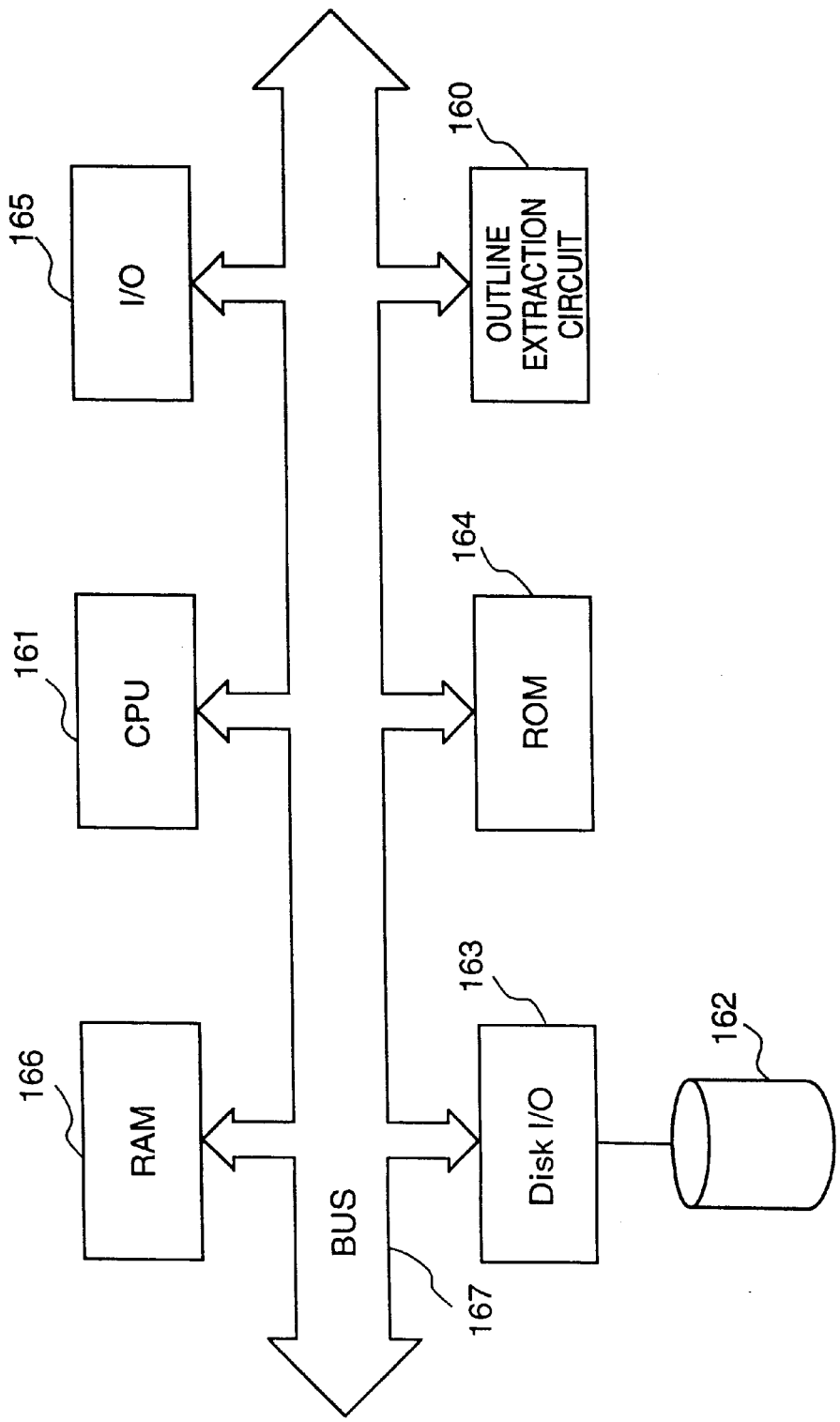
FIG. 62 is a block diagram showing the detailed arrangement of the previously proposed apparatus.
Figure 63:
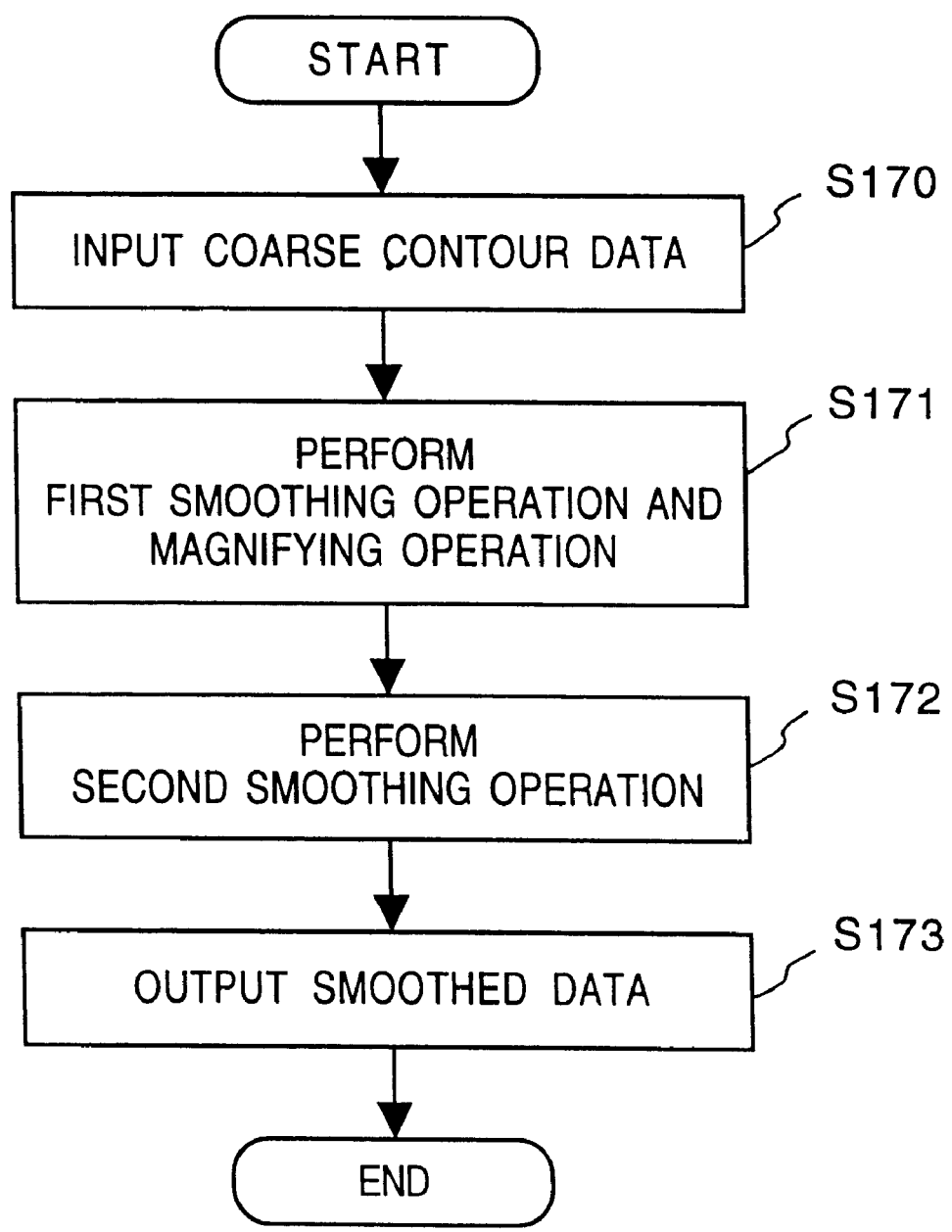
FIG. 63 is a flowchart showing the flow of processing in the previously proposed technique.
Figure 64:
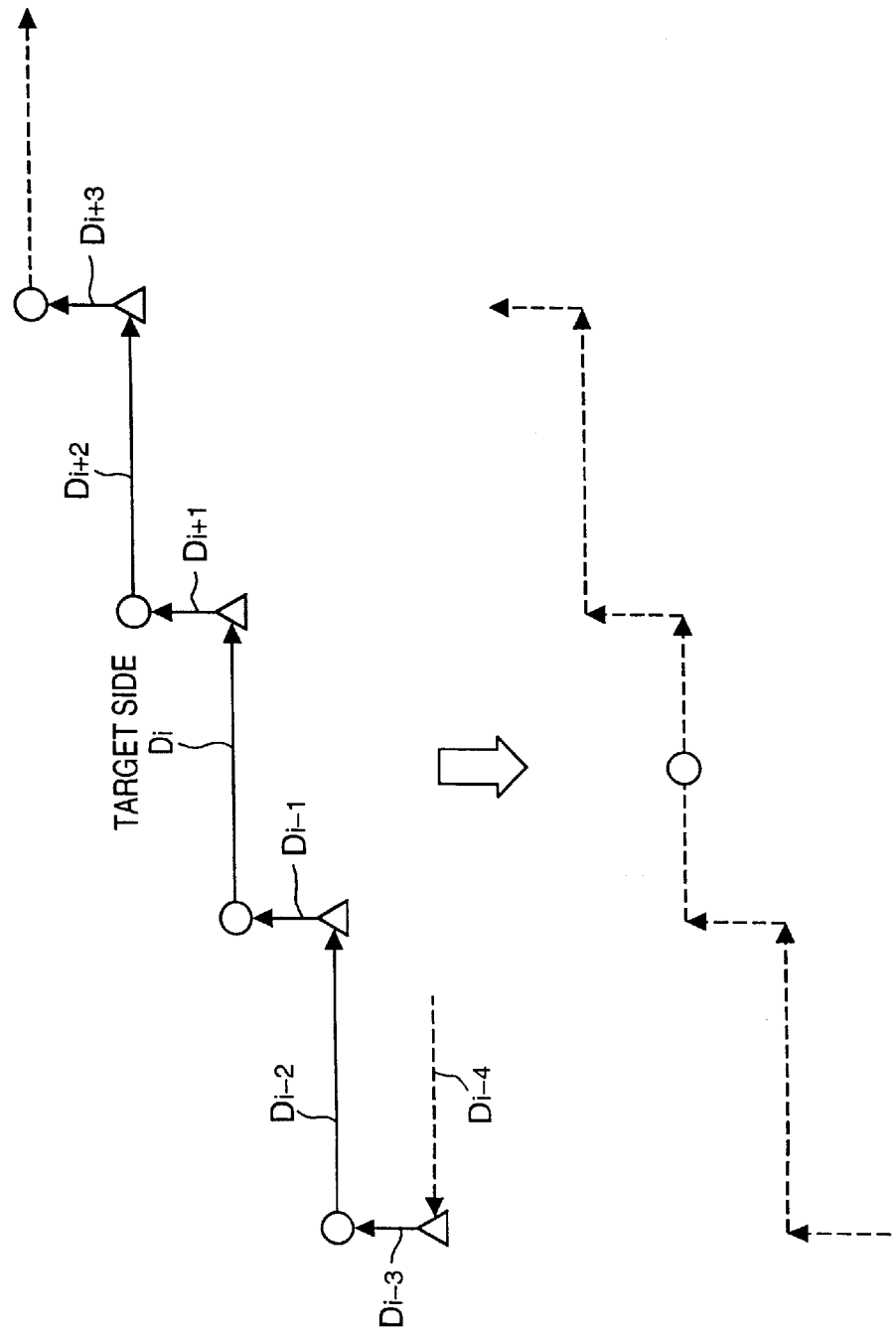
FIG. 64 is a view showing an outline of a first smoothing operation in the previously proposed technique.
Figure 66:
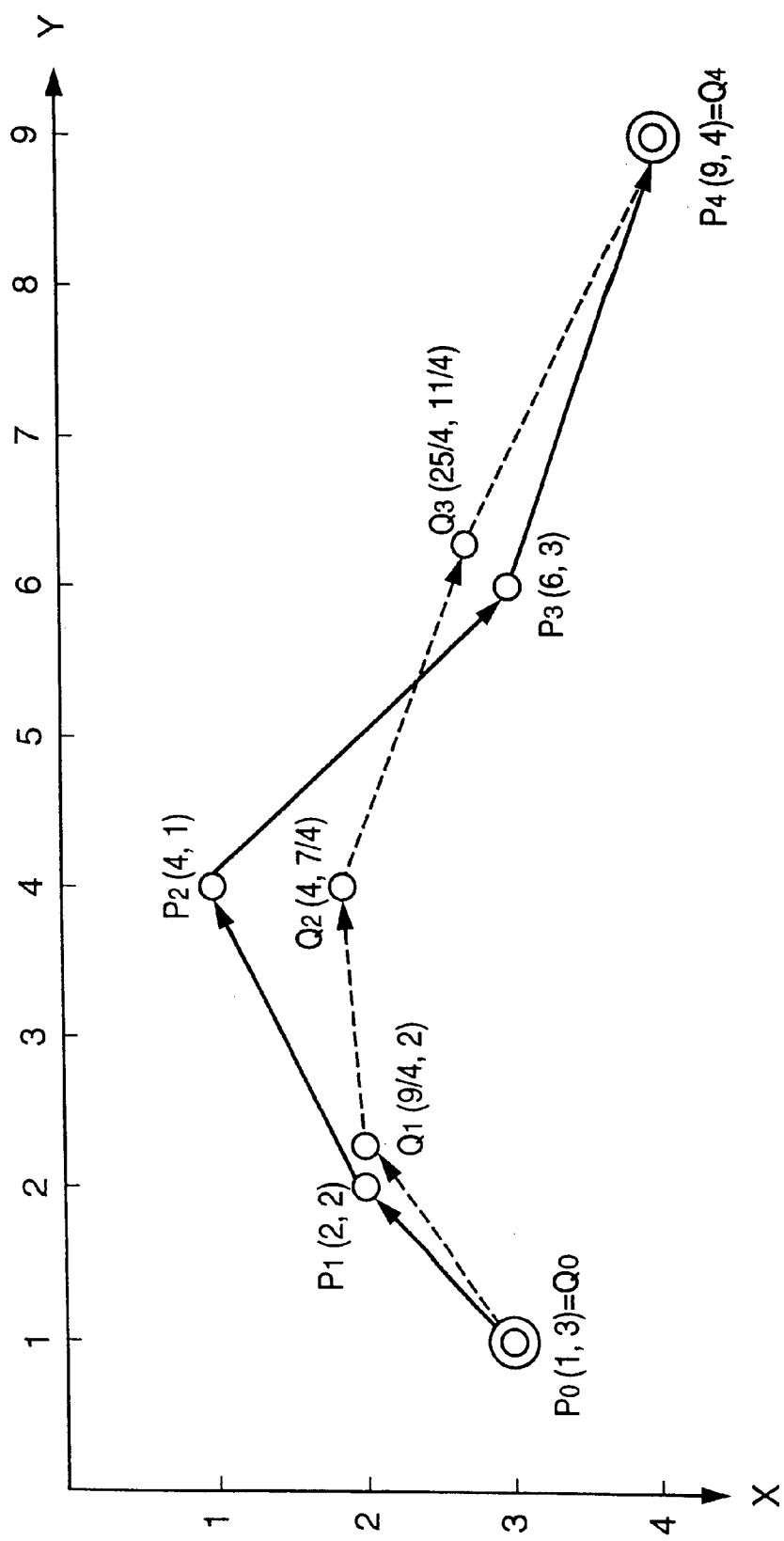
FIG. 66 is a graph showing an outline of a second smoothing operation in the previously proposed technique.

FIG. 55 is a flowchart showing programs executed by the central processing unit 26 in FIG. 2 to realize the apparatus of the eighth embodiment. The same step numbers in FIG. 55 denote the same operations as in FIG. 54, and a description thereof will be omitted.

In step S55, whether to invert an input image is determined in accordance with the procedure in FIG. 51.

In step S552, a binary image corresponding to each density level is generated while being inverted or not inverted in accordance with the determination result in FIG. 51. FIG. 52 shows this procedure.

In step S553, an image is reproduced in accordance with the determination result in step S551 according to the procedure in FIG. 53. That is, a multivalued image is generated in such a manner that an inverted binary image is re-inverted.

Note that the programs shown in the flowcharts in the first to eighth embodiments can be supplied to the system in FIG. 2 via the external memory unit 27 in FIG. 2, e.g., a removable medium such as a floppy disk, an optical disk, or an magneto-optical disk. These programs are executed by the CPU to realize the apparatuses of the first to eighth embodiments.

As has been described above, the image processing apparatus and method of the present invention can obtain a magnified multivalued image magnified/smoothed faithfully with respect to an original image.

Other Embodiments

The present invention can be applied to a system constituted by a plurality of devices (e.g., host computer, interface, reader, printer) or to an apparatus comprising a signal device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment/ embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment/embodiments are realized by executing the program codes which are read by a computer, the present invention includes a case where an OS (Operating System) or the like working on the computer performs a part or entire processes in accordance with designations of the program codes and realize functions according to the above embodiment/embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment/embodiments.

Figure 67:
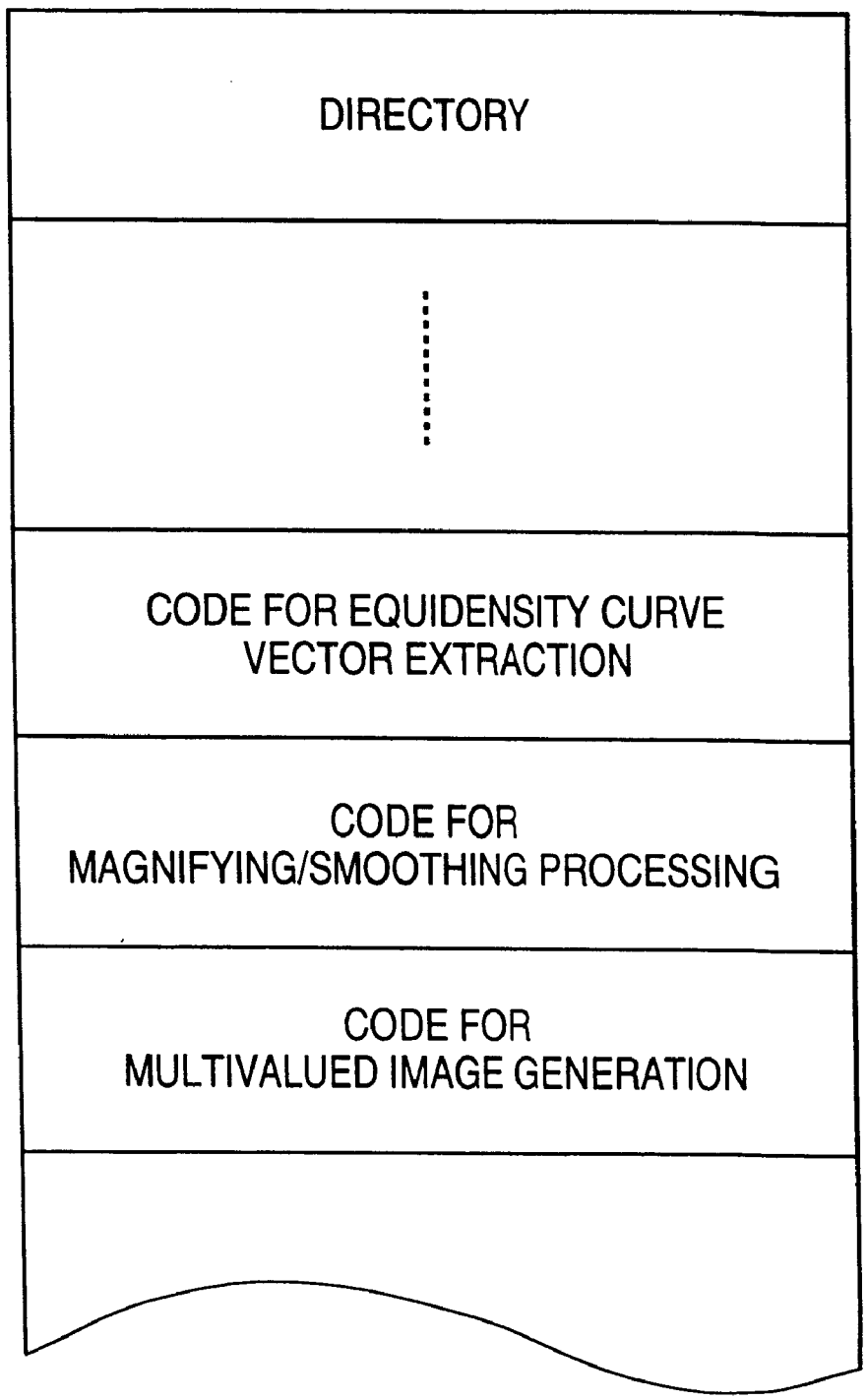
FIG. 67 is a view showing the memory map for programs for realizing an image processing method of the present invention.

In a case where the present invention is applied to the aforesaid storage medium, the storage medium stores program codes corresponding to the flowchart/flowcharts described in the embodiment/embodiments. Briefly, the storage medium stores each module shown as an example of a memory map in FIG. 67. More specifically, program codes which correspond to an equidensity curve vector extraction module, a magnifying/smoothing module, an a multivalued image generating module, at least, are to be stored in the storage medium.

The present invention is not limited to the above embodiments and various changes and modifications can be made within the spirit and scope of the present invention. Therefore, to apprise the public of the scope of the present invention the following claims are made.

What is claimed is:

1. An image processing apparatus for executing magnification processing for a multivalued image, comprising:
    a generator, arranged to generate a plurality of binary images corresponding to respective density levels of a multivalued image;
    an outline extractor, arranged to extract a plurality of sets of outline vectors, from the respective plurality of binary images generated by said generator, each of the plurality of sets of outline vectors representing an outline of each respective plurality of binary images;
    a magnifier, arranged to magnify the plurality of sets of outline vectors extracted by said outline extractor in accordance with a designated magnification;
    a smoother, arranged to smooth the plurality of sets of outline vectors magnified by said magnifier;
    a multivalued image reproducer, arranged to reproduce a multivalued image on the basis of the plurality of sets of outline vectors magnified by said magnifier; and
    an interpolator, arranged to perform pixel value interpolation for the multivalued image reproduced by said multivalued image reproducer.

2. The apparatus according to claim 1, wherein said outline extractor includes a binary image generator, arranged to generate binary images each of which corresponds to the multivalued image at each density level, and to extract outline vectors from each of the binary images generated by said binary image generator as the outline vectors for each density level of the multivalued image.

3. The apparatus according to claim 2, wherein said magnifier includes an outline smoother, arranged to smooth outline vectors extracted by said outline extractor before magnification.

4. The apparatus according to claim 1, wherein said image reproducer includes a binary image reproduction generator, arranged to generate binary image data corresponding to each density level on the basis of outline vectors corresponding to each density level, and said image reproducer determines whether all pixels of a binary image reproduced by said binary image reproduction generator are white pixels, and does not reproduce the density level corresponding to the binary image if it is determined that all the pixels of the binary image are white pixels.

5. The apparatus according to claim 1, wherein said image reproducer determines whether all pixels of a binary image reproduced by said binary image reproduction generator are white pixels, and neglects the binary image if all the pixels are white pixels.

6. The apparatus according to claim 1, wherein said density smoother includes a weighted mean calculator, arranged to calculate a weighted mean of densities of a target pixel and pixels adjacent to the target pixel, and to update the density of the target pixel with the calculated weighted mean.

7. The apparatus according to claim 6, wherein said weighted mean calculator calculates a weighted mean by using adjacent pixels corresponding in number to a magnification.

8. The apparatus according to claim 6, wherein said weighted mean calculator calculates a weighted mean by weighting pixels more heavily as the pixels separate from the target pixel.

9. The apparatus according to claim 1, further comprising a first multivalued image generator, arranged to decrease the number of density levels of the multivalued image, and an interpolator, arranged to generate a second multivalued image by removing a component of the first multivalued image from the multivalued image, and interpolating pixels for the second multivalued image, and wherein said image reproducer reproduces a multivalued image by synthesizing the first multivalued image magnified by said magnifier and the second multivalued image interpolated by said interpolator.

10. The apparatus according to claim 1, further comprising a discriminator, arranged to determine a density level which is not included in the multivalued image, and wherein said outline extractor extracts no outline vector with respect to the density level which is not included in the multivalued image, and said image reproducer neglects the density level which is not included in the multivalued image.

11. The apparatus according to claim 1, wherein said outline extractor extracts outline vectors for a density level of an inverted image of the multivalued image when the multivalued image has a predetermined density characteristic, and said image reproducer reproduces a re-inverted multivalued image on the basis of the outline vectors of the inverted image extracted by said image extractor.

12. The apparatus according to claim 11, wherein the predetermined density characteristic is that a mean density of pixels included in a multivalued image is higher than a threshold.

13. The apparatus according to claim 11, wherein the predetermined density characteristic is that a density of most pixels included in the multivalued image is higher than a predetermined threshold.

14. The apparatus according to claim 1, further comprising a multivalued image outputter, arranged to output a multivalued image smoothed by said density smoother.

15. An apparatus according to claim 14, wherein said multivalued image outputter includes a printer.

16. An apparatus according to claim 14, wherein said multivalued image outputter includes a display unit.

17. The apparatus according to claim 1, wherein said interpolator performs pixel value interpolation for the multivalued image in accordance with the designated magnification.

18. The apparatus according to claim 17, wherein said interpolator performs pixel value interpolation for the multivalued image by using a filter having a size which is decided in accordance with the designated magnification.

19. The apparatus according to claim 1, wherein said density smoother enlarges the size of the area in accordance with the designated magnification.

20. The apparatus according to claim 1, further comprising a selector, arranged to select the type of the multivalued image, wherein said outline extractor extracts the outline vectors corresponding to each density level of the multivalued image when the first type is selected, and said outline extractor extracts the outline vectors corresponding to density levels at intervals of a predetermined number of density levels when the second type is selected.

21. The apparatus according to claim 2 further comprising a selector, arranged to select the type of the multivalued image, wherein said binary image generator generates the binary images corresponding to each density level of the multivalued image when the first type is selected, and said binary image generator generates the binary images corresponding to density levels at intervals of a predetermined number of density levels when the second type is selected.

22. An image processing method of executing magnifying processing for a multivalued image, comprising the steps of:

generating a plurality of binary images corresponding to respective density levels of a multivalued image;

extracting a plurality of sets of outline vectors, from the binary respective plurality of binary images generated in said generating step, each of the plurality of sets of outline vectors representing an outline of each respective plurality of binary images;

magnifying the plurality of sets of outline vectors extracted in said extracting step in accordance with a designated magnification;

smoothing the plurality of sets of outline vectors magnified in said magnifying step;

reproducing a multivalued image on the basis of the plurality of sets of outline vectors magnified in said magnifying step; and performing pixel value interpolation for the multivalued image reproduced in said reproducing step.

23. The method according to claim 22, wherein said extracting step includes a binary image generation step of generating binary images each of which corresponds to the multivalued image at each density level, and outline vectors of each of the binary images generated in said binary image generation step are extracted in said extracting step.

24. The method according to claim 23, wherein said magnifying step includes an outline smoothing step of smoothing outline vectors extracted in said extracting step before magnification.

25. The method according to claim 22, wherein said reproducing step includes a binary image reproduction step of generating binary image data corresponding to each density level on the basis of outline vectors corresponding to each density level and, in said reproducing step, it is determined whether all pixels of a binary image reproduced in said binary image reproduction step are white pixels, and pixels having density level corresponding to the binary image are not reproduced if it is determined that all the pixels of the binary image are white pixels.

26. The method according to claim 22, wherein, in said reproducing step, it is determined whether all pixels of a binary image reproduced by said binary image reproduction step are white pixels, and the binary image is neglected if all the pixels are white pixels.

27. The method according to claim 22, wherein said density smoothing step includes a weighted mean calculation step of calculating a weighted mean of densities of a target pixel and pixels adjacent to the target pixel, and the density of the target pixel is updated with the calculated weighted mean.

28. The method according to claim 22, wherein the weighted mean calculation step includes calculating a weighted mean by using adjacent pixels corresponding in number to a magnification.

29. The method according to claim 22, wherein the weighted mean calculation step includes calculating a weighted mean by weighting pixels more heavily as the pixels separate from the target pixel.

30. The method according to claim 22, further comprising a step of generating a first multivalued image by decreasing the number of density levels of the multivalued image, and an interpolation step of generating a second multivalued image by removing a component of the first multivalued image from the multivalued image, and interpolating pixels for the second multivalued image, and wherein a multivalued image is reproduced in said reproducing step by synthesizing the first multivalued image magnified in said magnifying step and the second multivalued image interpolated in said interpolation step.

31. The method according to claim 22, further comprising a step of determining a density level which is not included in the multivalued image, and wherein, in said extracting step, no outline vector is extracted with respect to the density level which is not included in the multivalued image, and the density level which is not included in the multivalued image is neglected in said reproducing step.

32. The method according to claim 22, wherein, in said extracting step, outline vectors for each density level of an inverted image of the multivalued image are extracted when the multivalued image has a predetermined density characteristic, and in said reproducing step, a re-inverted multivalued image is reproduced when the outline vectors of the inverted image are extracted in said extracting step.

33. The method according to claim 32, wherein the predetermined density characteristic is that a mean density of pixels included in a multivalued image is higher than a threshold.

34. The method according to claim 32, wherein the predetermined density characteristic is that a density of most pixels included in the multivalued image is higher than a predetermined threshold.

35. The method according to claim 22, further comprising a multivalued image output step of outputting a multivalued image reproduced in said reproduction step.

36. The method according to claim 22, wherein, in said density smoothing step, the size of the area in accordance with the designated magnification.

37. The method according to claim 22 further comprising a selecting step of selecting a type of the multivalued image, wherein, in said extracting step, the outline vectors are extracted corresponding to each density level of the multivalued image when the first type is selected, and the outline vectors are extracted corresponding to density levels at intervals of a predetermined number of density levels when the second type is selected.

38. The method according to claim 22 further comprising a selecting step of selecting a type of the multivalued image, wherein, in said binary image generating step, the binary images are generated corresponding to each density level of the multivalued image when the first type is selected, and the binary images are generated corresponding to density levels at intervals of a predetermined number of density levels when the second type is selected.

39. The method according to claim 22, wherein said pixel value interpolation is performed for the multivalued image in accordance with the designated magnification.

40. The method according to claim 39, wherein said pixel value interpolation is performed for the multivalued image by using a filter having a size which is decided in accordance with the designated magnification.

41. A computer readable memory storing a program for executing magnifying processing for a multivalued image, comprising a code for performing the steps of:
generating a plurality of binary images corresponding to the respective density levels of a multivalued image;
extracting a plurality of sets of outline vectors, from the respective plurality of binary images generated in said generating step, each of the plurality of sets of outline vectors representing an outline of each respective plurality of binary images;
magnifying the plurality of sets of outline vectors extracted in said extracting step in accordance with a designated magnification;
smoothing the plurality of sets of outline vectors magnified by said magnifier;
reproducing a multivalued image on the basis of the plurality of sets of outline vectors magnified in said magnifying step; and
performing pixel value interpolation for the multivalued image reproduced in said reproducing step.

42. The memory according to claim 41, wherein said extracting step includes a binary image generation step of generating binary images each of which corresponds to the multivalued image at each density level, and outline vectors of each of the binary images generated in said binary image generation step are extracted in said extracting step.

43. The memory according to claim 41, wherein said reproducing step includes a binary image reproduction step of generating binary image data corresponding to each density level on the basis of outline vectors corresponding to each density level and, in said reproducing step, it is determined whether all pixels of a binary image reproduced in said binary image reproduction step are white pixels, and pixels having density level corresponding to the binary image are not reproduced if it is determined that all the pixels of the binary image are white pixels.

44. The memory according to claim 41, wherein in said reproducing step, it is determined whether all pixels of a binary image reproduced by said binary image reproduction step are white pixels, and the binary image is neglected if all the pixels are white pixels.

45. The memory according to claim 41, wherein said density smoothing step includes a weighted mean calculation step of calculating a weighted mean of densities of a target pixel and the density of the target pixel is updated with the calculated weighted mean.

46. The apparatus according to claim 45, wherein, in said weighted mean calculation step, a weighted mean is calculated by using adjacent pixels corresponding in number to a magnification.

47. The apparatus according to claim 45, wherein, in said weighted mean calculation step, a weighted mean is calculated by weighting pixels more heavily as the pixels separate from the target pixel.

48. The memory according to claim 41, further comprising a step of generating a first multivalued image by decreasing the number of density levels of the multivalued image, and an interpolation step of generating a second multivalued image by removing a component of the first multivalued image from the multivalued image, and interpolating pixels for the second multivalued image, and wherein a multivalued image is reproduced in said reproducing step by synthesizing the first multivalued image magnified in said magnifying step and the second multivalued image interpolated in said interpolation step.

49. The memory according to claim 41, further comprising a step of determining a density level which is not included in the multivalued image, and wherein, in said extraction step, no outline vector is extracted with respect to the density level which is not included in the multivalued image, and the density level which is not included in the multivalued image is neglected in said reproducing step.

50. The memory according to claim 41, wherein, in said extracting step, outline vectors for each density level of an inverted image of the multivalued image are extracted when the multivalued image has a predetermined density characteristic, and in said reproducing step, a re-inverted multivalued image is reproduced when the outline vectors of the inverted image are extracted in said extracting step.

51. The memory according to claim 41, further comprising a multivalued image output step of outputting a multivalued image reproduced in said reproduction step.

52. The memory according to claim 41, wherein, in said density smoothing step, the size of the area is enlarged in accordance with the designated magnification.

53. The memory according to claim 41 further comprising a selecting step of selecting a type of the multivalued image, wherein, in said extracting step, the outline vectors are extracted corresponding to each density level of the multivalued image when the first type is selected, and the outline vectors are extracted corresponding to density levels at intervals of a predetermined number of density levels when the second type is selected.

54. The memory according to claim 41 further comprising a selecting step of selecting a type of the multivalued image, wherein, in said binary image generating step, the binary images are generated corresponding to each density level of the multivalued image when the first type is selected and the binary images are generated corresponding to density levels at intervals of a predetermined number of density levels when the second type is selected.

55. The memory according to claim 42, wherein said magnifying step includes an outline smoothing step of smoothing outline vectors extracted in said extracting step before magnification.

56. A computer readable memory according to claim 41, wherein said pixel value interpolation is performed for the multivalued image in accordance with the designated magnification.

57. A computer readable memory according to claim 56, wherein said pixel value interpolation is performed for the multivalued image by using a filter having a size which is decided in accordance with the designated magnification.

* * * * *

UNITED STATES PATENT AND TRADEMARK OFFICE
CERTIFICATE OF CORRECTION

PATENT NO.     : 6,289,136 B1
DATED          : September 11, 2001
INVENTOR(S)    : Takahiro Oshino et al.

It is certified that error appears in the above-identified patent and that said Letters Patent is hereby corrected as shown below:

Title page,
Item [56], References Cited, FOREIGN PATENT DOCUMENTS,
"5174140" should read -- 5-174140 -- and
"4157578" should read -- 4-157578 --.

Column 4,
Line 43, "($X_{i-1}$, $Y_{i-1}$)" should read -- ($X_{T-1}$, $Y_{T-1}$) --.

Column 8,
Line 50, "us" should read -- is --.

Column 16,
Line 2, "the" (first occurrence) should be deleted.

Column 21,
Line 9, "moire" should read -- moiré --.

Column 24,
Line 36, "gradations." should read -- gradation. --.

Column 28,
Line 48, "not" should read -- no --.

Column 31,
Line 15, "return" should read -- returns --.

Column 33,
Line 22, "equal" should read -- is equal --.

Column 36,
Line 26, "predetermine" should read -- predetermined --.

Column 38,
Line 26, "applied" should read -- be applied --.

UNITED STATES PATENT AND TRADEMARK OFFICE
CERTIFICATE OF CORRECTION

PATENT NO. : 6,289,136 B1
DATED : September 11, 2001
INVENTOR(S) : Takahiro Oshino et al.

It is certified that error appears in the above-identified patent and that said Letters Patent is hereby corrected as shown below:

<u>Column 39,</u>
Line 18, "realize" should read -- realizes --; and
Line 37, "an" should read -- and --.

<u>Column 42,</u>
Line 66, "area in" should read -- area is in --.

Signed and Sealed this

Ninth Day of July, 2002

Attest:

JAMES E. ROGAN
Attesting Officer  *Director of the United States Patent and Trademark Office*